US012689394B2

(12) United States Patent
Gao

(10) Patent No.: US 12,689,394 B2
(45) Date of Patent: Jul. 21, 2026

(54) WIRELESS COMMUNICATION SYSTEM AND ELECTRONIC DEVICE

(71) Applicant: Huawei Technologies Co., Ltd., Shenzhen (CN)

(72) Inventor: Peng Gao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 293 days.

(21) Appl. No.: 18/590,534

(22) Filed: Feb. 28, 2024

(65) Prior Publication Data

US 2024/0204807 A1 Jun. 20, 2024

Related U.S. Application Data

(63) Continuation of application No. PCT/CN2021/115845, filed on Aug. 31, 2021.

(51) Int. Cl.
H04B 1/00 (2006.01)
H04B 1/04 (2006.01)
H04W 64/00 (2009.01)

(52) U.S. Cl.
CPC ......... *H04B 1/0057* (2013.01); *H04B 1/0053* (2013.01); *H04B 1/0064* (2013.01); *H04B 1/0075* (2013.01); *H04B 1/04* (2013.01)

(58) Field of Classification Search
CPC ...... H04B 1/0075; H04B 1/0064; H04B 1/04; H04B 1/0053; H04B 1/0057;

(Continued)

(56) References Cited

U.S. PATENT DOCUMENTS 5,945,949 A * 8/1999 Yun ........................ G01S 13/878
455/456.5
6,812,824 B1 * 11/2004 Goldinger .............. G06Q 30/06
340/8.1

(Continued)

OTHER PUBLICATIONS

IEEE Std 802.11ad-2012. "IEEE Standard for Information technology—Telecommunications and information exchange between systems Local and metropolitan area networks—Specific requirements. Part 11: Wireless LAN Medium Access Control (MAC) and Physical Layer (PHY) Specifications. Amendment 3: Enhancements for Very High Throughput in the 60 GHz Band". Dec. 28, 2012, total 628 pages.

*Primary Examiner* — Raj Jain
(74) *Attorney, Agent, or Firm* — Slater Matsil, LLP

(57) ABSTRACT

Embodiments of this application provide a wireless communication system and an electronic device. A first high-frequency integrated circuit in the wireless communication system includes a high-frequency control unit, a first diplexer, and a second diplexer. An intermediate-frequency integrated circuit includes an intermediate-frequency control unit, a third diplexer, and a fourth diplexer. A control signal is transmitted between the high-frequency control unit and the intermediate-frequency control unit. The control signal includes an instruction data signal and an echo clock signal. A phase of the instruction data signal is synchronized with a phase of the echo clock signal, and a frequency of the instruction data signal and a frequency of the echo clock signal are in a co-frequency relationship or a frequency multiplication relationship.

20 Claims, 24 Drawing Sheets

(58) Field of Classification Search
  CPC ... G01S 5/0009; H04W 64/00; H05K 1/0237;
  H05K 1/0243
  See application file for complete search history.

(56) References Cited

U.S. PATENT DOCUMENTS

| | | | |
|---|---|---|---|
| 2005/0100076 A1* | 5/2005 | Gazdzinski .......... | H04B 1/7176 |
| | | | 375/242 |
| 2016/0359607 A1* | 12/2016 | Bojer .................... | H04L 5/1461 |
| 2017/0085005 A1* | 3/2017 | Aue ......................... | H04B 1/40 |
| 2018/0358992 A1* | 12/2018 | Fernando ............. | H04B 1/0057 |
| 2019/0097662 A1* | 3/2019 | Hornbuckle ............. | H04B 1/10 |
| 2023/0291466 A1* | 9/2023 | Blatt ........................ | H04B 7/19 |
| 2024/0204807 A1* | 6/2024 | Gao ....................... | H04B 1/0075 |
| 2024/0275343 A1* | 8/2024 | Lo ........................... | H03F 1/565 |
| 2024/0357733 A1* | 10/2024 | Biglarbegian ............ | H01P 3/08 |

* cited by examiner

150

Electronic device 100

WIRELESS COMMUNICATION SYSTEM AND ELECTRONIC DEVICE

CROSS-REFERENCE TO RELATED APPLICATIONS

This application is a continuation of International Application No. PCT/CN2021/115845, filed on Aug. 31, 2021, the disclosure of which is hereby incorporated by reference in its entirety.

TECHNICAL FIELD

This application relates to the field of wireless communication technologies, and in particular, to a wireless communication system and an electronic device.

BACKGROUND

In high-frequency band communication, for example, in a 5G NR (new radio) or a next-generation Wi-Fi communication standard, a high-frequency band (FR2, frequency range 2) is introduced into a communication system, so that more abundant spectrum resources are obtained for the communication system, and a communication capability requirement for a higher throughput rate can be supported.

FIG. 1 is a schematic diagram of a structure of a typical 5G NR communication system. As shown in FIG. 1, a signal link of the communication system mainly includes three chips: a high-frequency integrated circuit (HFIC), an intermediate-frequency integrated circuit (IFIC), and a baseband integrated circuit (BBIC). The communication system further includes an antenna array (ANT-array) coupled to the high-frequency integrated circuit HFIC. The antenna array ANT-array includes a plurality of antenna elements, for example, an antenna element ANT1, an antenna element ANT2, and an antenna element ANT3.

However, a signal needs to be transmitted between an existing high-frequency integrated circuit and intermediate-frequency integrated circuit through a plurality of hardware lines, and the plurality of hardware lines occupy a large quantity of hardware cabling resources. For an electronic device having a small size such as a mobile phone, hardware cabling resources are limited. In addition, on some 5G high-frequency devices, a high-frequency integrated circuit and an intermediate-frequency integrated circuit are far away from each other on hardware, and are even disposed on different circuit boards. Therefore, a customized flat cable is needed for connection. Excessive hardware lines limit design of the flat cable and a hardware connector. Based on this, reducing hardware lines between a high-frequency integrated circuit and an intermediate-frequency integrated circuit is a problem that needs to be urgently resolved currently.

SUMMARY

Embodiments of this application provide a wireless communication system and an electronic device, to resolve a problem that there are a large quantity of hardware lines for transmission between a high-frequency integrated circuit and an intermediate-frequency integrated circuit.

To achieve the foregoing objective, the following technical solutions are applied to this application.

According to a first aspect, a wireless communication system is provided. The wireless communication system includes a first high-frequency integrated circuit, an intermediate-frequency integrated circuit, and an antenna array, and the first high-frequency integrated circuit is coupled between the antenna array and the intermediate-frequency integrated circuit. The first high-frequency integrated circuit includes a first high-frequency transceiver, a second high-frequency transceiver, a high-frequency phase-locked loop, a high-frequency control unit, a first diplexer, and a second diplexer. The first high-frequency transceiver is coupled to the first diplexer, and the second high-frequency transceiver is coupled to the second diplexer. The high-frequency phase-locked loop is separately coupled to the first high-frequency transceiver and the second high-frequency transceiver, and the high-frequency control unit is separately coupled to the first diplexer and the second diplexer. The intermediate-frequency integrated circuit includes a first intermediate-frequency transceiver, a second intermediate-frequency transceiver, an intermediate-frequency phase-locked loop, an intermediate-frequency control unit, a third diplexer, and a fourth diplexer. The first intermediate-frequency transceiver is coupled to the third diplexer, and the second intermediate-frequency transceiver is coupled to the fourth diplexer. The intermediate-frequency phase-locked loop is separately coupled to the first intermediate-frequency transceiver and the second intermediate-frequency transceiver, and the intermediate-frequency control unit is separately coupled to the third diplexer and the fourth diplexer. The first diplexer is coupled to the third diplexer, and the second diplexer is coupled to the fourth diplexer. A control signal is transmitted between the high-frequency control unit and the intermediate-frequency control unit. The control signal includes an instruction data signal and an echo clock signal. A phase of the instruction data signal is synchronized with a phase of the echo clock signal, and a frequency of the instruction data signal and a frequency of the echo clock signal are in a co-frequency relationship or a frequency multiplication relationship. The echo clock signal is transmitted between the high-frequency control unit and the intermediate-frequency control unit via the first diplexer and the third diplexer, and the instruction data signal is transmitted between the high-frequency control unit and the intermediate-frequency control unit via the second diplexer and the fourth diplexer. In this application, "phase synchronization" is not accurate synchronization in a strict sense, and the phase of the instruction data signal and the phase of the echo clock signal may also have a specific deviation within an acceptable deviation range. The acceptable deviation range may be, for example, a deviation caused by engineering implementation recognized by a person skilled in the art. Similarly, "co-frequency or frequency multiplication" is not strictly accurate co-frequency or frequency multiplication. When the frequency of the instruction data signal and the frequency of the echo clock signal are co-frequency or frequency multiplication, there may alternatively be a specific deviation within an acceptable deviation range.

The first high-frequency integrated circuit includes the first diplexer, and the first diplexer is separately coupled to the first high-frequency transceiver and the high-frequency control unit. The intermediate-frequency integrated circuit includes the third diplexer, and the third diplexer is separately coupled to the first intermediate-frequency transceiver and the intermediate-frequency control unit. The first diplexer and the third diplexer may be coupled through one hardware line, and the first high-frequency transceiver and the first intermediate-frequency transceiver may be configured to transmit a first communication signal. Therefore, the first communication signal may be transmitted between the first high-frequency transceiver and the first intermediate-frequency transceiver through the one hardware line. In addition, the echo clock signal may be transmitted between the high-frequency control unit and the intermediate-frequency control unit through the hardware line. Similarly, the first high-frequency integrated circuit further includes the second diplexer, and the second diplexer is coupled to the second high-frequency transceiver and the high-frequency control unit. The intermediate-frequency integrated circuit further includes the fourth diplexer, and the fourth diplexer is coupled to the second intermediate-frequency transceiver and the intermediate-frequency control unit. The second diplexer and the fourth diplexer may be coupled through one hardware line, and the second high-frequency transceiver and the second intermediate-frequency transceiver may be configured to transmit a second communication signal. Therefore, the second communication signal may be transmitted between the second high-frequency transceiver and the second intermediate-frequency transceiver through the one hardware line. In addition, the instruction data signal may be transmitted between the high-frequency control unit and the intermediate-frequency control unit through the hardware line. Based on this, in this application, the first communication signal and the echo clock signal may be transmitted between the first high-frequency integrated circuit and the intermediate-frequency integrated circuit through one hardware line, and the second communication signal and the instruction data signal may be transmitted between the first high-frequency integrated circuit and the intermediate-frequency integrated circuit through one hardware line. In other words, in this application, two hardware lines are needed between the first high-frequency integrated circuit and the intermediate-frequency integrated circuit to implement transmission of the first communication signal, the second communication signal, the echo clock signal, and the instruction data signal. In comparison with that the first communication signal between the first high-frequency transceiver and the first intermediate-frequency transceiver is transmitted through one hardware line, and the second communication signal between the second high-frequency transceiver and the second intermediate-frequency transceiver is transmitted through one hardware line, the echo clock signal and the instruction data signal between the high-frequency control unit and the intermediate-frequency control unit are transmitted through one hardware line respectively. In other words, four hardware lines are needed between the first high-frequency integrated circuit and the intermediate-frequency integrated circuit to respectively transmit the first communication signal, the second communication signal, the echo clock signal, and the instruction data signal. Therefore, in this application, a quantity of hardware lines can be reduced, and hardware cabling resources can be reduced.

The phase of the instruction data signal is synchronized with the phase of the echo clock signal, and the frequency of the instruction data signal and the frequency of the echo clock signal are in the co-frequency relationship or the frequency multiplication relationship. Therefore, compared with two signals without the foregoing relationship, the instruction data signal and the echo clock signal do not interfere with each other, and harmonic distortion generated by the instruction data signal and harmonic distortion generated by the echo clock signal are the same, so that interference to the first high-frequency integrated circuit and the intermediate-frequency integrated circuit is the same. In this way, anti-interference design difficulty of the wireless communication system can be reduced. In addition, in comparison with a signal that is of another system and that is subject to an additional limitation, for example, a local-frequency signal whose frequency changes with that of a radio frequency carrier signal, selection of the echo clock signal is more flexible, so that a control signal can stably work in a more optimized frequency range. In this way, design difficulty of the wireless communication system can be reduced.

In a possible implementation, the instruction data signal is sent out on a rising edge and/or a falling edge of the echo clock signal. The instruction data signal is sent out on the rising edge and/or the falling edge of the echo clock signal. Therefore, the phase of the instruction data signal is synchronized with the phase of the echo clock signal.

In a possible implementation, the intermediate-frequency control unit transmits the echo clock signal to the high-frequency control unit via the third diplexer and the first diplexer. In other words, the echo clock signal is transmitted by the intermediate-frequency control unit to the high-frequency control unit. The echo clock signal is usually generated by a primary controller of an upper-layer system, and the primary controller is usually integrated in a baseband integrated circuit or an intermediate-frequency integrated circuit. Therefore, the echo clock signal is transmitted by the intermediate-frequency control unit to the high-frequency control unit, so that the echo clock signal is used as an echo clock signal of the high-frequency control unit.

In a possible implementation, the first diplexer is further coupled to the high-frequency phase-locked loop. The intermediate-frequency control unit further transmits the echo clock signal to the high-frequency phase-locked loop via the third diplexer and the first diplexer, to provide a first reference clock signal for the high-frequency phase-locked loop. After the intermediate-frequency control unit transmits the echo clock signal to the first diplexer through the third diplexer, the first diplexer may transmit the echo clock signal to the high-frequency control unit, so that the echo clock signal is used as the echo clock signal of the high-frequency control unit. In addition, the first diplexer may transmit the echo clock signal to the high-frequency phase-locked loop, so that the echo clock signal is multiplexed as a first reference clock signal of the high-frequency phase-locked loop. Therefore, a high-frequency pin for receiving the first reference clock signal does not need to be disposed in the first high-frequency integrated circuit, and a hardware line coupled to the high-frequency pin does not need to be disposed. In this way, a quantity of hardware lines coupled to the first high-frequency integrated circuit is further reduced, and the first high-frequency integrated circuit can be provided with various needed signals through at least two hardware lines.

In a possible implementation, the intermediate-frequency integrated circuit further includes an intermediate-frequency pin, and the intermediate-frequency pin is configured to a second reference clock signal. The second reference clock signal may be received by using the intermediate-frequency pin, and is configured to provide a reference clock signal for the intermediate-frequency integrated circuit.

In a possible implementation, the intermediate-frequency pin is coupled to the intermediate-frequency phase-locked loop, and the second reference clock signal received by the intermediate-frequency pin is used to provide the second reference clock signal for the intermediate-frequency phase-locked loop. In other words, a reference clock signal of the intermediate-frequency phase-locked loop may be provided by the second reference clock signal received by the intermediate-frequency pin.

5

In a possible implementation, the echo clock signal transmitted by the intermediate-frequency control unit is generated based on the second reference clock signal received by the intermediate-frequency pin. The echo clock signal may be generated based on the second reference clock signal received by the intermediate-frequency pin, and is provided for the intermediate-frequency integrated circuit and the high-frequency integrated circuit.

In a possible implementation, the intermediate-frequency integrated circuit further includes a synchronizer, and the synchronizer is configured to synchronize the instruction data signal and the echo clock signal. The synchronizer is coupled to the third diplexer, the fourth diplexer, and the intermediate-frequency control unit. The echo clock signal is transmitted between the high-frequency control unit and the intermediate-frequency control unit via the first diplexer, the third diplexer, and the synchronizer, and the instruction data signal is transmitted between the high-frequency control unit and the intermediate-frequency control unit via the second diplexer, the fourth diplexer, and the synchronizer. Signal quality of the echo clock signal can be improved by using the synchronizer.

In a possible implementation, the first communication signal is transmitted between the first high-frequency transceiver and the first intermediate-frequency transceiver via the first diplexer and the third diplexer. The second communication signal is transmitted between the second high-frequency transceiver and the second intermediate-frequency transceiver via the second diplexer and the fourth diplexer. In this way, the first communication signal may be provided for the first high-frequency transceiver and the first intermediate-frequency transceiver, and the second communication signal may be provided for the second high-frequency transceiver and the second intermediate-frequency transceiver.

In a possible implementation, the wireless communication system further includes a second high-frequency integrated circuit. The second high-frequency integrated circuit includes the first high-frequency transceiver, the second high-frequency transceiver, the high-frequency phase-locked loop, the high-frequency control unit, the first diplexer, and the second diplexer. The third diplexer is separately coupled to the first diplexer of the first high-frequency integrated circuit and the first diplexer of the second high-frequency integrated circuit, and the fourth diplexer is separately coupled to the second diplexer of the first high-frequency integrated circuit and the second diplexer of the second high-frequency integrated circuit. Because the third diplexer is separately coupled to the first diplexer of the first high-frequency integrated circuit and the first diplexer of the second high-frequency integrated circuit, and the fourth diplexer is separately coupled to the second diplexer of the first high-frequency integrated circuit and the second diplexer of the second high-frequency integrated circuit, the intermediate-frequency integrated circuit may simultaneously communicate with the first high-frequency integrated circuit and the second high-frequency integrated circuit. In this way, the first high-frequency integrated circuit and the second high-frequency integrated circuit may work simultaneously. In addition, because each high-frequency integrated circuit is coupled to an antenna array, a large-scale antenna array can be implemented.

In a possible implementation, both the first high-frequency integrated circuit and the second high-frequency integrated circuit include at least one addressing pin. The addressing pin is configured to receive a high electrical level or a low electrical level, to distinguish between a chip code of the first high-frequency integrated circuit and a chip code of the second high-frequency integrated circuit. When a specific control signal is generated in the intermediate-frequency integrated circuit, a chip number of a target high-frequency integrated circuit corresponding to the control signal is embedded into the instruction data signal. When the control signal is simultaneously sent to a plurality of high-frequency integrated circuits, high-frequency controllers of the high-frequency integrated circuits parse the instruction data signal, and extracts carried target chip number information from the instruction data signal. When an extracted target chip number is consistent with chip number code of the current chip, it is considered that the instruction data signal is sent to the current high-frequency integrated circuit. When the extracted target chip number is not consistent with the chip number code of the current chip, it may be considered that the instruction data signal is sent to another high-frequency integrated circuit, and the current high-frequency integrated circuit may ignore the instruction data signal.

In a possible implementation, the wireless communication system further includes a second high-frequency integrated circuit, a first multi-way switch, and a second multi-way switch. The second high-frequency integrated circuit includes the first high-frequency transceiver, the second high-frequency transceiver, the high-frequency phase-locked loop, the high-frequency control unit, the first diplexer, and the second diplexer. The third diplexer is separately coupled to the first diplexer of the first high-frequency integrated circuit and the first diplexer of the second high-frequency integrated circuit via the first multi-way switch. The first multi-way switch is configured to control the third diplexer to be conducted with the first diplexer of the first high-frequency integrated circuit or the first diplexer of the second high-frequency integrated circuit. The fourth diplexer is separately coupled to the second diplexer of the first high-frequency integrated circuit and the second diplexer of the second high-frequency integrated circuit via the second multi-way switch. The second multi-way switch is configured to control the fourth diplexer to be conducted with the second diplexer of the first high-frequency integrated circuit or the second diplexer of the second high-frequency integrated circuit. Herein, one intermediate-frequency integrated circuit may work with a plurality of high-frequency integrated circuits such as the first high-frequency integrated circuit and the second high-frequency integrated circuit to integrate a plurality of antenna arrays, and the first multi-way switch and the second multi-way switch are used to control the intermediate-frequency integrated circuit to communicate with the first high-frequency integrated circuit or the second high-frequency integrated circuit.

In a possible implementation, the first diplexer includes a high-pass filter and a low-pass filter, and both the high-pass filter and the low-pass filter include a first end and a second end. The first end of the high-pass filter is coupled to the first high-frequency transceiver, and the first end of the low-pass filter is coupled to the high-frequency control unit. Both the second end of the high-pass filter and the second end of the low-pass filter are further coupled to a combination port of the third diplexer. The high-pass filter allows a signal whose frequency is greater than a first frequency to pass, and the low-pass filter allows a signal whose frequency is less than a second frequency to pass. The first frequency is greater than the second frequency. Because of frequency selection features of the high-pass filter and the low-pass filter, only an intermediate-frequency communication signal can pass through the high-pass filter, and the control signal (where the control signal includes the instruction data signal and the echo clock signals) is blocked. In contrast, only the control signal can pass through the low-pass filter, and the intermediate-frequency communication signal is blocked.

In a possible implementation, a range of the first frequency is 7 GHz to 15 GHz. A frequency band of a communication signal is usually 7 GHz to 15 GHz. Therefore, from a perspective of a spectrum, the intermediate-frequency communication signal can pass through the high-pass filter.

In a possible implementation, the first diplexer includes a band-pass filter and a low-pass filter, and both the band-pass filter and the low-pass filter include a first end and a second end. The first end of the band-pass filter is coupled to the first high-frequency transceiver, and the first end of the low-pass filter is coupled to the high-frequency control unit. Both the second end of the band-pass filter and the second end of the low-pass filter are further coupled to a combination port of the third diplexer. The band-pass filter allows a signal whose frequency is greater than a third frequency and less than a fourth frequency to pass, and the low-pass filter allows a signal whose frequency is less than the second frequency to pass. The third frequency and the fourth frequency are greater than the second frequency. Herein, in addition to filtering out the control signal, the band-pass filter may further filter out harmonic distortion generated by the first intermediate-frequency transceiver and the second intermediate-frequency transceiver, to avoid interference caused by the harmonic distortion to out-of-band communication. In addition, the low-pass filter has a same technical effect as the foregoing low-pass filter. Refer to the foregoing descriptions. Details are not described herein again.

In a possible implementation, a range of a center frequency of the band-pass filter is 7 GHz to 15 GHz, and a range of a bandwidth of the band-pass filter is 0.5 GHz to 5 GHz. The third frequency and the fourth frequency may be obtained based on the center frequency of the band-pass filter and the bandwidth of the band-pass filter.

In a possible implementation, a range of the second frequency is 100 MHz to 500 MHz. A frequency band of a control signal is usually 100 MHz to 500 MHz. Therefore, from the perspective of a spectrum, a low-frequency control signal such as the instruction data signal and the echo clock signal may pass through the low-pass filter.

In a possible implementation, a frequency of the instruction data signal and/or the echo clock signal is one of 245.76 Mbps, 307.2 Mbps, and 491.52 Mbps. When the frequency of the instruction data signal and/or the frequency of the echo clock signal are/is one of 245.76 Mbps, 307.2 Mbps, and 491.52 Mbps, for a 5G NR system, a related clock frequency defined in a protocol may be directly used to reduce difficulty of the wireless communication system.

In a possible implementation, the wireless communication system further includes a hardware line. The first diplexer and the third diplexer are coupled through one hardware line, and the second diplexer and the fourth diplexer are coupled through one hardware line. The hardware line is a cable or a cable disposed in a circuit board.

According to a second aspect, a wireless communication system is provided. The wireless communication system includes a first high-frequency integrated circuit, an intermediate-frequency integrated circuit, and an antenna array, and the first high-frequency integrated circuit is coupled between the antenna array and the intermediate-frequency integrated circuit. The first high-frequency integrated circuit includes a first high-frequency transceiver, a second high-frequency transceiver, a high-frequency phase-locked loop, and a high-frequency control unit. The high-frequency phase-locked loop is separately coupled to the first high-frequency transceiver and the second high-frequency transceiver. The intermediate-frequency integrated circuit includes a first intermediate-frequency transceiver, a second intermediate-frequency transceiver, an intermediate-frequency phase-locked loop, and an intermediate-frequency control unit. The intermediate-frequency phase-locked loop is separately coupled to the first intermediate-frequency transceiver and the second intermediate-frequency transceiver. A control signal is transmitted between the high-frequency control unit and the intermediate-frequency control unit. The control signal includes an instruction data signal and an echo clock signal. The instruction data signal is transmitted between the high-frequency control unit and the intermediate-frequency control unit through a first hardware line, and the echo clock signal is transmitted through a second hardware line. The intermediate-frequency control unit further transmits the echo clock signal to the high-frequency phase-locked loop through the second hardware line, to provide a first reference clock signal for the high-frequency phase-locked loop. Because the intermediate-frequency control unit further transmits the echo clock signal to the high-frequency phase-locked loop through the second hardware line, to provide the first reference clock signal for the high-frequency phase-locked loop, no separate hardware line is needed to provide the first reference clock signal for the high-frequency phase-locked loop. In comparison with the first reference clock signal passing through one separate hardware line, one hardware line may be reduced in the wireless communication system provided in this application.

It should be understood that the wireless communication system in the second aspect may further have another possible implementation. For details, refer to features in various possible implementations of the first aspect. Details are not described herein again.

According to a third aspect, a high-frequency integrated circuit is provided. The high-frequency integrated circuit includes a first high-frequency transceiver, a second high-frequency transceiver, a high-frequency phase-locked loop, a high-frequency control unit, a first diplexer, and a second diplexer. The first high-frequency transceiver is coupled to the first diplexer, and the second high-frequency transceiver is coupled to the second diplexer. The high-frequency phase-locked loop is separately coupled to the first high-frequency transceiver and the second high-frequency transceiver, and the high-frequency control unit is separately coupled to the first diplexer and the second diplexer. An echo clock signal is transmitted between the high-frequency control unit and the first diplexer, and an instruction data signal is transmitted between the high-frequency control unit and the second diplexer. A phase of the instruction data signal is synchronized with a phase of the echo clock signal, and a frequency of the instruction data signal and a frequency of the echo clock signal are in a co-frequency relationship or a frequency multiplication relationship. The first diplexer is separately coupled to the first high-frequency transceiver and the high-frequency control unit, so that a first communication signal can be transmitted between the first diplexer and the first high-frequency transceiver by using one pin (that is, one combination port) of the first diplexer, and the echo clock signal can be transmitted between the first diplexer and the high-frequency control unit simultaneously. Therefore, in comparison with that the first communication signal is transmitted to the first high-frequency transceiver by using one pin and the echo clock signal is transmitted to the high-frequency control unit by using one pin, one pin is reduced in this application. Similarly, the second diplexer is separately coupled to the second high-frequency transceiver and the high-frequency control unit, so that a second communication signal can be transmitted between the second diplexer and the second high-frequency transceiver by using one pin (that is, one combination port) of the second diplexer, and the instruction data signal can be transmitted between the second diplexer and the high-frequency control unit simultaneously. Therefore, in comparison with that the second communication signal is transmitted to the second high-frequency transceiver by using one pin and the instruction data signal is transmitted to the high-frequency control unit by using one pin, one pin can be further reduced in this application.

According to a fourth aspect, an intermediate-frequency integrated circuit is provided. The intermediate-frequency integrated circuit includes a first intermediate-frequency transceiver, a second intermediate-frequency transceiver, an intermediate-frequency phase-locked loop, an intermediate-frequency control unit, a third diplexer, and a fourth diplexer. The first intermediate-frequency transceiver is coupled to the third diplexer, and the second intermediate-frequency transceiver is coupled to the fourth diplexer. The intermediate-frequency phase-locked loop is separately coupled to the first intermediate-frequency transceiver and the second intermediate-frequency transceiver, and the inter-mediate-frequency control unit is separately coupled to the third diplexer and the fourth diplexer. An echo clock signal is transmitted between the intermediate-frequency control unit and the third diplexer, and an instruction data signal is transmitted between the intermediate-frequency control unit and the fourth diplexer. A phase of the instruction data signal is synchronized with a phase of the echo clock signal, and a frequency of the instruction data signal and a frequency of the echo clock signal are in a co-frequency relationship or a frequency multiplication relationship. The intermediate-fre-quency integrated circuit provided in the fourth aspect has a same technical effect as the high-frequency integrated circuit provided in the third aspect. For details, refer to related descriptions of the third aspect. Details are not described herein again.

It should be understood that the high-frequency integrated circuit and the intermediate-frequency integrated circuit in the third aspect and the fourth aspect may further have other possible implementations. For details, refer to features in various possible implementations of the first aspect. Details are not described herein again.

According to a fifth aspect, an electronic device is pro-vided. The electronic device includes a circuit board and the wireless communication system according to the first aspect and the second aspect. The electronic device has a same technical effect as the foregoing wireless communication system. Therefore, refer to the foregoing descriptions. Details are not described herein again.

Figure 1:
FIG. 1 is a schematic diagram of a structure of a typical 5G NR communication system.
Figure 1:
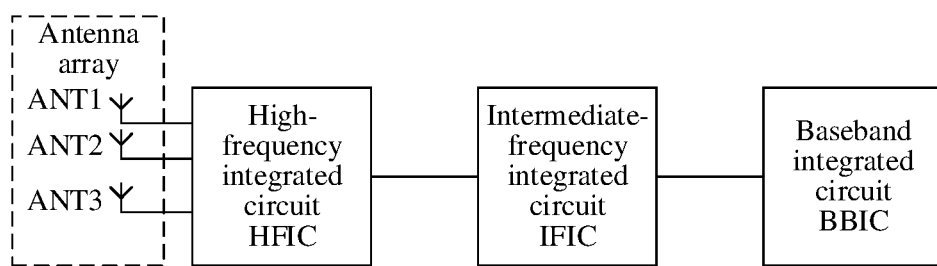

Reference numerals: 10—first diplexer; 20—second diplexer; 30—third diplexer; 40—fourth diplexer; 50—high-frequency pin; 51—intermediate-frequency pin; 100—electronic device; 110—processor; 120—external memory interface; 121—internal memory; 130—USB interface; 140—charging management module; 141—power management module; 142—battery; 150—wireless communication system; 170—audio module; 180—sensor module; 190—button; 191—motor; 192—indicator; 193—camera; 194—display; and 195—SIM card interface.

DETAILED DESCRIPTION OF ILLUSTRATIVE EMBODIMENTS

The following describes the technical solutions in embodiments of this application with reference to the accompanying drawings in embodiments of this application. It is clear that the described embodiments are merely a part rather than all of embodiments of this application.

The following terms "first", "second" and the like are merely intended for ease of description, and shall not be understood as an indication or implication of relative importance or implicit indication of a quantity of indicated technical features. Therefore, a feature limited by "first", "second", or the like may explicitly or implicitly include one or more features. In the descriptions of this application, unless otherwise stated, "a plurality of" means two or more than two.

In embodiments of this application, unless otherwise specified and limited, the term "coupling" may be direct coupling, or may be indirect coupling by using an intermediate medium.

In embodiments of this application, words such as "example" or "for example" are for representing giving an example, an illustration, or a description. Any embodiment or design scheme described as an "example" or "for example" in embodiments of this application should not be explained as being more preferred or having more advantages than another embodiment or design scheme. Exactly, use of the word "example", "for example" or the like is intended to present a relative concept in a specific manner.

In embodiments of this application, the term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects.

Embodiments of this application provide an electronic device. The electronic device may be user equipment or electronic devices of different types, for example, a mobile phone, a tablet (pad), a personal digital assistant (PDA), a television, an intelligent wearable product (for example, a smart watch or a smart band), a virtual reality (VR) electronic device, an augmented reality (AR) electronic device, a small rechargeable household appliance (for example, a soy milk maker or a robotic vacuum cleaner), an unmanned aerial vehicle, a radar, aerospace devices, and an in-vehicle device. The electronic device may also be a network device such as a base station. A specific form of the electronic device is not specifically limited in embodiments of this application.

Figure 2:
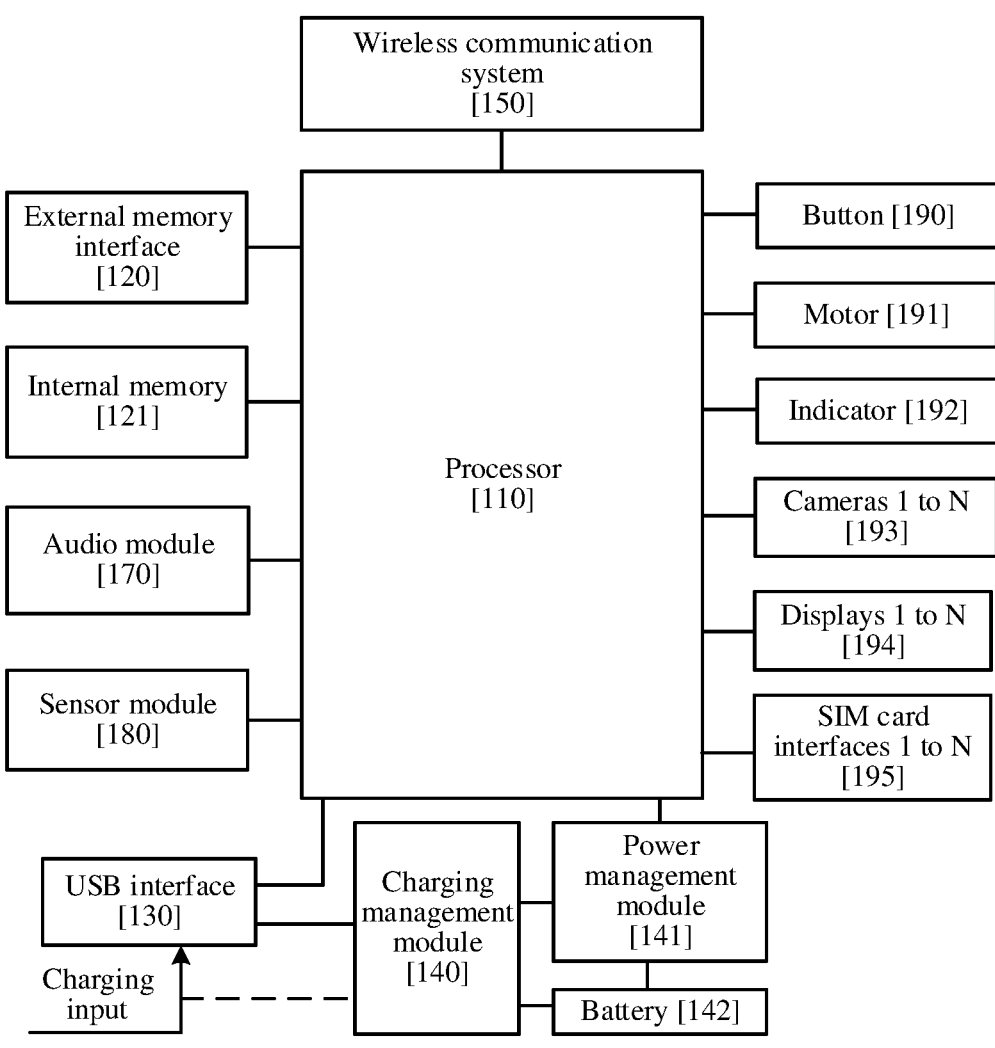
FIG. 2 is a schematic diagram of a structure of an electronic device according to an embodiment of this appli-cation.

FIG. 2 is a schematic diagram of a structure of an electronic device according to an example of an embodiment of this application. As shown in FIG. 2, an electronic device 100 includes a processor 110, an external memory interface 120, an internal memory 121, a universal serial bus (USB) interface 130, a charging management module 140, a power management module 141, a battery 142, a wireless communication system 150, an audio module 170, a sensor module 180, a button 190, a motor 191, an indicator 192, a camera 193, a display 194, a subscriber identification module (SIM) card interface 195, and the like.

It may be understood that the structure shown in this embodiment of this application does not constitute a specific limitation on the electronic device 100. In some other embodiments of this application, the electronic device 100 may include more or fewer components than those shown in the figure, some components may be combined, some components may be split, or different component arrangements may be used. The components shown in the figure may be implemented by hardware, software, or a combination of software and hardware.

The processor 110 may include one or more processing units. For example, the processor 110 may include an application processor (AP), a central processing unit (CPU), a modem processor, a graphics processing unit (GPU), an image signal processor (ISP), a controller, a video codec, a digital signal processor (DSP), a baseband processor, and/or a neural-network processing unit (NPU). A memory may be further disposed in the processor 110, and is configured to store instructions and data.

In some examples, the processor 110 may include one or more interfaces, for example, may be the universal serial bus (USB) interface 130.

The external memory interface 120 may be configured to connect to an external storage card, for example, a Micro SD card, to extend a storage capability of the electronic device 100. The internal memory 121 may be configured to store computer-executable program code, and the executable program code includes instructions.

The charging management module 140 is configured to receive a charging input from a charger. The charger may be a wireless charger or a wired charger.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, a wireless communication module 160, and the like. The power management module 141 may be further configured to monitor parameters such as a battery capacity, a battery cycle count, and a battery health status (electric leakage or impedance).

The sensor module 180 includes a pressure sensor, a gyroscope sensor, a barometer sensor, a magnetic sensor, or the like. The button 190 includes a power button, a volume button, and the like. The motor 191 may generate a vibration prompt. The indicator 192 may be an indicator light, and may be configured to indicate a charging status and a power change, or may be configured to indicate a message, a missed call, a notification, and the like. The SIM card interface 195 is configured to connect to a SIM card.

The electronic device 100 may implement a display function by using the GPU, the display 194, the application processor, and the like.

The electronic device 100 may implement a photographing function by using the ISP, the camera 193, the video codec, the GPU, the display 194, the application processor, and the like.

The electronic device 100 may implement an audio function by using the audio module 170, a speaker, a receiver, a microphone, a headset jack, the application processor, and the like.

A communication function of the electronic device 100 may be implemented by using the wireless communication system 150, the modem processor, the baseband processor, and the like.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (which is not limited to the loudspeaker, the receiver, and the like), or displays an image or a video by using the display 194.

On this basis, the electronic device 100 may further include a circuit board, and the circuit board may be, for example, a printed circuit board (PCB) or a flexible circuit (FPC) board. In addition, some chips or electronic components such as the processor 110 and the internal memory 121 in the electronic device 100 may be disposed on the PCB.

The following describes the wireless communication system 150 in the electronic device 100.

In an optional embodiment, as shown in FIG. 1, the wireless communication system 150 includes a high-frequency integrated circuit HFIC, an intermediate-frequency integrated circuit IFIC, and a baseband integrated circuit BBIC. The wireless communication system 150 may further include an antenna array ANT-array coupled to the high-frequency integrated circuit HFIC. The antenna array ANT-array includes a plurality of antenna elements, for example, an antenna element ANT1, an antenna element ANT2, and an antenna element ANT3.

The following separately describes functions and structures of the high-frequency integrated circuit HFIC, the intermediate-frequency integrated circuit IFIC, and the baseband integrated circuit BBIC.

First, the function and structure of the high-frequency integrated circuit HFIC are described by using an example.

The high-frequency integrated circuit HFIC is mainly configured to implement operations such as amplification and phase shifting of a high-frequency band signal, and conversion of a signal between a high frequency and an intermediate frequency.

Figure 3:
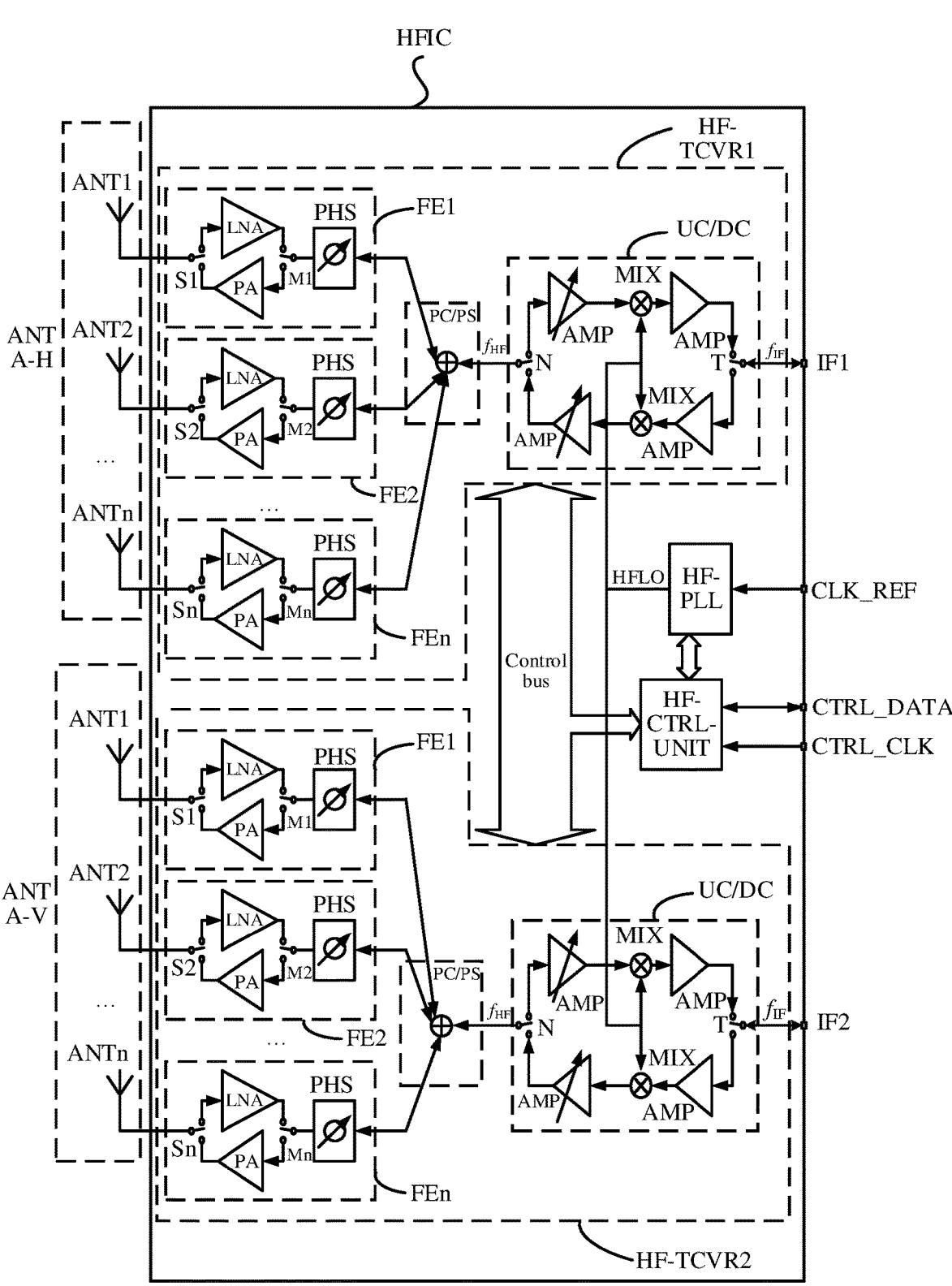
FIG. 3 is a schematic diagram of a structure of a high-frequency integrated circuit according to an embodiment of this application.

FIG. 3 is a schematic diagram of a structure of a high-frequency integrated circuit HFIC used in a phased array technology according to an example of this application. In the phased array system, an antenna array ANT-array including a plurality of antenna elements ANTs is coupled to the high-frequency integrated circuit HFIC. FIG. 3 shows two antenna arrays ANT-arrays (ANT-As): an antenna array ANT array-H (ANT A-H) and an antenna array ANT array-V (ANT A-V). Each antenna array ANT-array includes a plurality of independent antenna elements ANTs, for example, an antenna element ANT1, an antenna element ANT2, . . . , and an antenna element ANTn.

Still refer to FIG. 3. The high-frequency integrated circuit HFIC mainly includes a high-frequency transceiver (HF-TCVR), a high-frequency phase-locked loop (HF-PLL), a high-frequency control unit (HF-CTRL-UNIT), and the like.

High-Frequency Transceiver HF-TCVR

The high-frequency transceiver HF-TCVR is mainly configured to complete signal path amplification, frequency conversion, phase shifting, and the like. In a wireless communication system, a plurality of antenna elements ANTs form one antenna array ANT-array. The high-frequency transceiver HF-TCVR implements beamforming by adjusting relative phase characteristics between signals received and transmitted by the antenna elements ANTs, to obtain effect of enhancing an antenna gain in a specific direction. In other words, stronger transmit power and better receiving sensitivity performance in the specific direction can be implemented.

The high-frequency transceiver HF-TCVR shown in FIG. 3 is integrated with n high-frequency transceiver front-end (FE) units. Each antenna array ANT-array includes n independent antenna elements ANTs, and the n antenna elements ANTs are coupled to the n front-end units FEs in a one-to-one correspondence. It should be noted that this application includes but is not limited to coupling one antenna element ANT to one front-end unit FE. For example, one front-end unit FE may alternatively be coupled to a plurality of antenna elements ANTs. This application is not limited to a combination manner of the front-end unit FE and the antenna element ANT.

Circuit composition of the front-end units FEs in the high-frequency transceiver HF-TCVR is the same. The front-end unit FE mainly includes a low-noise amplifier (LNA) for receiving a signal and a power amplifier (PA) for transmitting a signal. The front-end unit FE further includes a phase shifter (PHS), and both the low-noise amplifier LNA and the power amplifier PA are coupled to the phase shifter PHS. A proper phase shift parameter is configured for a phase shifter PHS of each front-end unit FE. In this case, an equivalent antenna gain in a specific spatial direction can be improved by spatially combining signals received or transmitted by the plurality of antenna elements ANTs.

Still refer to FIG. 3. The high-frequency transceiver HF-TCVR further includes a power combiner (PC) and a down-converter (DC). The plurality of front-end units FEs are all coupled to the power combiner PC, and the power combiner PC is coupled to the down-converter DC. It should be noted that, in a receiving direction, the power combiner PC may be referred to as a power combiner PC, and in a transmitting direction, the power combiner PC may also be referred to as a power splitter (PS). In the receiving direction, the down-converter DC may be referred to as a down-converter DC, and in the transmitting direction, the down-converter DC may also be referred to as an up-converter (UC).

The down-converter DC includes a variable gain amplifier (AMP), a mixer MIX), and a fixed gain amplifier AMP. The mixer MIX is separately coupled to the variable gain amplifier AMP and the fixed gain amplifier AMP. An amplifier with an arrow in FIG. 3 indicates the variable gain amplifier AMP.

In the receiving direction, after a signal received by each antenna element ANT is amplified by the low-noise amplifier LNA, a phase shifting operation is performed on the signal by the phase shifter PHS. The equivalent antenna gain in the specific direction is improved by configuring the phase shift parameter for each phase shifter PHS. Received signals obtained through phase shift processing are combined into one channel of signals via the power combiner (PC). The combined signals are transferred from a high frequency $f_{HF}$ to a low frequency $f_{HF}$ via the down-converter (DC) and then sent to an intermediate-frequency integrated circuit IFIC for further processing.

In the transmitting direction, an intermediate-frequency signal sent from the intermediate-frequency integrated circuit IFIC is converted to the high-frequency $f_{HF}$ via the up-converter (UC). The signal is divided into n channels of signals by the power splitter PS, and then the signals are sent to each front-end unit FE in parallel. In each front-end unit FE, the phase shift operation is first performed on a transmitted signal by the phase shifter PHS. Similar to the receiving direction, a phase shift operation in the transmitting direction may also enhance an antenna gain in a specific direction, to implement beamforming. The phase-shifted transmitted signal is amplified to rated power by the power amplifier PA and then radiated to space by the antenna element ANT.

It should be understood that, a 5G NR high-frequency communication system is a time division duplex (TDD) system, and receiving and transmitting operations do not occur at the same time. Therefore, a signal port of the high-frequency transceiver HF-TCVR may be multiplexed in receiving and transmitting operations, and each port uses a switch to implement switching between a transmitting channel and a receiving channel. For example, refer to FIG. 3. A switch S (for example, switches S1, S2, . . . , and Sn), a switch M (for example, switches M1, M2, . . . , and Mn), a switch N, and a switch T may be used to implement switching between a transmitting channel and a receiving channel.

It should be noted that, in FIG. 3, an example in which the high-frequency integrated circuit HFIC integrates two high-frequency transceivers HF-TCVRs is used for description. The two high-frequency transceivers HF-TCVRs are a first high-frequency transceiver HF-TCVR1 and a second high-frequency transceiver HF-TCVR2. The high-frequency integrated circuit HFIC1 includes the first high-frequency transceiver HF-TCVR1 and the second high-frequency transceiver HF-TCVR2. Therefore, the wireless communication system 150 includes an antenna array ANT-array coupled to the first high-frequency transceiver HF-TCVR1 and an antenna array ANT-array coupled to the second high-frequency transceiver HF-TCVR2. In some examples, an antenna array ANT-array includes a horizontally polarized antenna array ANT A-H and a vertically polarized antenna array ANT A-V. The first high-frequency transceiver HF-TCVR1 is coupled to the horizontally polarized antenna array ANT A-H, and the second high-frequency transceiver HF-TCVR2 is coupled to the vertically polarized antenna array ANT A-V. In this case, the first high-frequency transceiver HF-TCVR1 and the second high-frequency transceiver HF-TCVR2 may support communication of a dual-polarized antenna.

It may be understood that the high-frequency integrated circuit HFIC provided in this application includes but is not limited to two high-frequency transceivers HF-TCVRs, and may further integrate more high-frequency transceivers HF-TCVRs. For the 5G NR high-frequency communication system, a communication standard requires support for at least dual-polarized antenna array receiving and transmitting. Therefore, the high-frequency integrated circuit HFIC needs to integrate at least two high-frequency transceiver HF-TCVR channels.

High-Frequency Phase-Locked Loop HF-PLL

The high-frequency phase-locked loop HF-PLL is configured to: generate a high-frequency local oscillator (HFLO) signal, and implement spectrum shifting of the signal by performing a frequency conversion operation via the down-converter DC or the up-converter UC.

Figure 4:
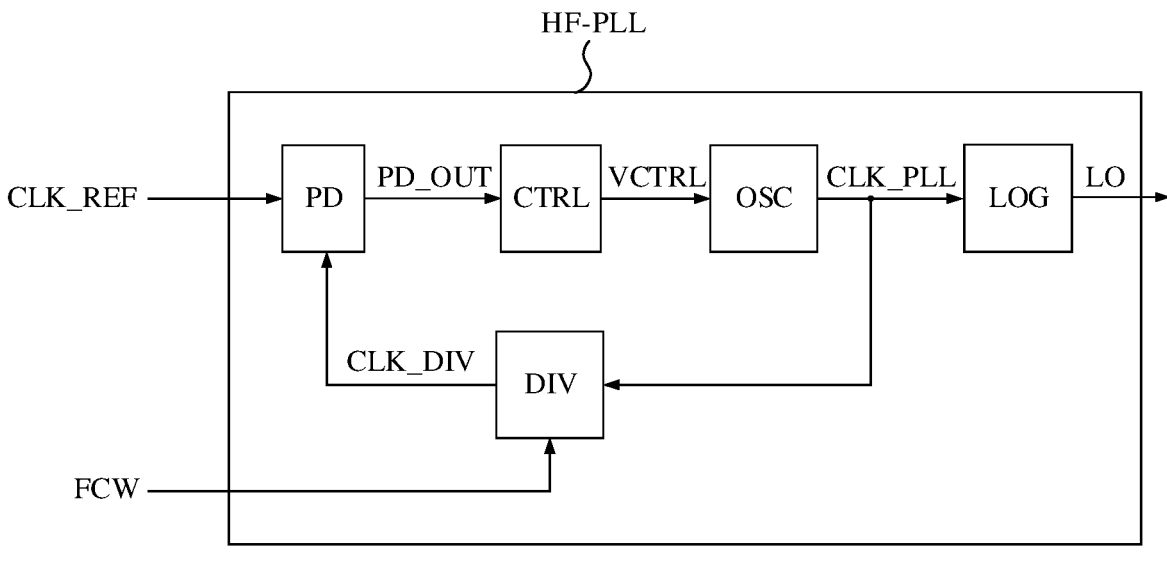
FIG. 4 is a schematic diagram of a structure of a high-frequency phase-locked loop according to an embodiment of this application.

FIG. 4 is a schematic diagram of a structure of a high-frequency phase-locked loop HF-PLL according to an example of this application. As shown in FIG. 4, the high-frequency phase-locked loop HF-PLL mainly includes the following components: a controlled oscillator (OSC), a feedback divider (DIV), a phase detector (PD), a controller CTRL, and a local oscillator generator (LOG).

The controlled oscillator OSC is configured to output CLK_PLL. A frequency of CLK_PLL output by the controlled oscillator OSC is controlled by an input signal VCTRL of the controlled oscillator OSC. It is assumed that the frequency of the output CLK_PLL is $f_{CLK\_PLL}$ and a value of a control signal VCTRL is $V_{CTRL}$.

$$f_{CLK\_PLL} = K_{OSC} \cdot V_{CTRL}$$

In the foregoing formula, $K_{OSC}$ is a conversion gain of the controlled oscillator OSC, and indicates a relationship between the control signal VCTRL of the controlled oscillator and an output frequency of the control signal VCTRL.

The feedback divider DIV is configured to perform frequency division processing on an output signal of the controlled oscillator OSC to generate a feedback signal CLK_DIV whose frequency is close to a frequency of an input reference clock signal CLK_REF. A frequency division ratio of the feedback divider DIV is controlled by a control signal FCW. Assuming that a value of the control signal FCW is $N_{FCW}$, a frequency of the feedback signal CLK_DIV is:

$$f_{CLK\_DIV} = \frac{f_{CLK\_PLL}}{N_{FCW}}$$

The phase detector PD is configured to: compare a phase difference between the feedback signal CLK_DIV and the reference clock signal CLK_REF, and output an output signal PD_OUT related to the phase difference between the two signals. Assuming that phases of the feedback signal CLK_DIV and the reference clock CLK_REF are $\varphi_{CLK\_DIV}$ and $\varphi_{CLK\_REF}$, a value of the signal PD_OUT output by the phase detector PD is:

$$V_{PD\_OUT} = K_{PD} \cdot (\varphi_{CLK\_REF} - \varphi_{CLK\_DIV})$$

In the foregoing formula, $K_{PD}$ is a conversion gain of the phase detector PD.

The controller CTRL is configured to process the output signal PD_OUT of the phase detector PD, and generate the control signal VCTRL of the controlled oscillator OSC. A behavior of the controller CTRL determines key characteristics of the high-frequency phase-locked loop HF-PLL, such as loop bandwidth and dynamic response characteristics.

A function of the local oscillator generator LOG is to perform further frequency division or frequency multiplication processing on the output CLK_PLL of the controlled oscillator OSC, to obtain a local oscillator (LO) signal needed by the high-frequency transceiver HF-TCVR. Assuming that a frequency division ratio of the local oscillator generator LOG is $N_{LO}$, a frequency of the output signal of the local oscillator generator LOG is:

$$f_{LO} = \frac{f_{CLK\_PLL}}{N_{LO}}$$

Based on the foregoing descriptions of each key component in the high-frequency phase-locked loop HF-PLL, it can be known that the high-frequency phase-locked loop HF-PLL is a negative feedback system. Frequency and phase synchronization between the output local oscillator signal LO and the input reference clock CLK_REF is implemented by using a negative feedback mechanism. Under the negative feedback mechanism, a frequency of the local oscillator signal LO output by the high-frequency phase-locked loop HF-PLL can be locked as follows:

$$f_{LO} = N_{FCW} \cdot f_{CLK\_REF}$$

It should be noted that implementations of the controlled oscillator OSC, the feedback divider DIV, the phase detector PD, the controller CTRL, and the local oscillator generator LOG in the high-frequency phase-locked loop HF-PLL are not limited in this application. In addition, the high-frequency phase-locked loop HF-PLL provided in this application includes but is not limited to the structure shown in FIG. 4.

High-Frequency Control Unit HF-CTRL-UNIT

The high-frequency control unit HF-CTRL-UNIT is mainly configured to: receive, by using a high-frequency integrated circuit control pin, instructions delivered by an upper-layer system, and parse the instructions into a specific format, to control working states of circuit modules such as the high-frequency transceiver HF-TCVR and the high-frequency phase-locked loop HF-PLL. Alternatively, A function of the high-frequency control unit HF-CTRL-UNIT is to read, based on instructions delivered by an upper-layer system, working states of the high-frequency transceiver HF-TCVR and the high-frequency phase-locked loop HF-PLL, and report the states to the upper-layer system by using a high-frequency integrated circuit control pin.

Content of a control signal (which may also be referred to as a control instruction) is generated by a primary controller of an upper-layer system. For example, content of the control instruction is generated by the upper-layer system. The primary controller may be integrated in a baseband integrated circuit BBIC, or may be integrated in an intermediate-frequency integrated circuit IFIC. A controller in the BBIC or IFIC only packages the content into a specified format and then transmits the content. In some examples, it may be considered that the primary controller is integrated into the intermediate-frequency integrated circuit IFIC. In other words, the control instruction is sent from the intermediate-frequency integrated circuit IFIC to the high-frequency integrated circuit HFIC. If a higher-layer system needs to deliver instructions to the high-frequency integrated circuit HFIC, the higher-layer system may deliver the control instruction to a control unit IF-CTRL-UNIT in the intermediate-frequency integrated circuit IFIC. After being processed by the control unit IF-CTRL-UNIT of the intermediate-frequency integrated circuit IFIC, the control instruction is delivered to the high-frequency integrated circuit HFIC.

The high-frequency integrated circuit control pin is usually designed as a serial interface. To be specific, binary code of instruction information is sent to the high-frequency integrated circuit HFIC bit by bit in a serial manner. The high-frequency integrated circuit control pin includes an instruction data pin CTRL-DATA and an echo clock pin CTRL-CLK. In the control unit HF-CTRL-UNIT of the high-frequency integrated circuit HFIC, after serial instructions are parsed, useful control information is extracted, and the instructions are sent to each functional module through an internal control bus (CTRL BUS) inside the high-frequency integrated circuit HFIC.

Next, the function and structure of the intermediate-frequency integrated circuit IFIC are described by using an example.

The intermediate-frequency integrated circuit IFIC is configured to: complete spectrum shifting of a signal between an intermediate frequency and a baseband, and implement functions such as signal amplification, and digital-to-analog/analog-to-digital conversion.

Figure 5:
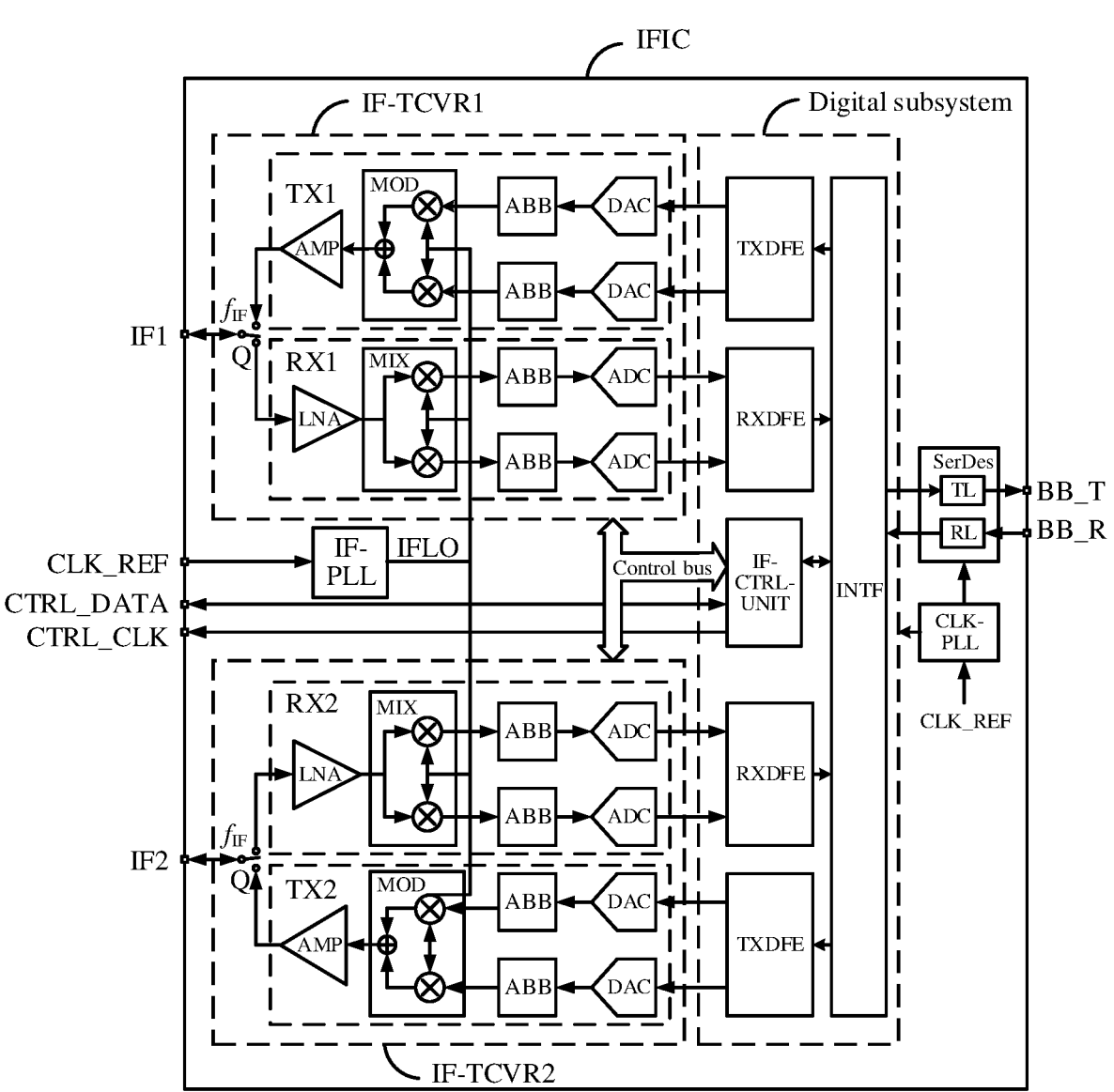
FIG. 5 is a schematic diagram of a structure of an intermediate-frequency integrated circuit according to an embodiment of this application.

FIG. 5 is a schematic diagram of a structure of an intermediate-frequency integrated circuit IFIC used in a 5G NR high-frequency communication system according to an example of this application. The intermediate-frequency integrated circuit IFIC shown in FIG. 5 is an intermediate-frequency integrated circuit of a digital baseband interface. To be specific, signals transmitted between the intermediate-frequency integrated circuit and a baseband integrated circuit are in a digital signal format, and communicate with each other through a SerDes interface. This type of intermediate-frequency integrated circuit IFIC mainly includes the following modules: an intermediate-frequency transceiver (IF-TCVR), an intermediate-frequency phase-locked loop (IF-PLL), and a digital subsystem.

Intermediate-Frequency Transceiver IF-TCVR

The intermediate-frequency transceiver IF-TCVR is mainly configured to complete operations such as type conversion and amplification of a signal. Each intermediate-frequency transceiver IF-TCVR integrates one transmitter (TX) and one receiver (RX). The receiver and the transmitter are used to receive and transmit signals. The 5G NR high-frequency communication system is a time division duplex TDD system, and transmitting and receiving are not performed at the same time. Therefore, intermediate-frequency ports of the transmitter TX and the receiver RX may be selected via a switch Q.

In a receiving direction, a signal is processed by the high-frequency integrated circuit HFIC and then sent to the intermediate-frequency integrated circuit IFIC. The receiver RX of the intermediate-frequency integrated circuit IFIC amplifies the signal and transfers the signal to a baseband through a mixer MIX. An analog baseband processor (ABB) performs low-pass filtering on the signal, to suppress out-of-band interference or noise and avoid that aliasing of analog-to-digital converter (ADC) sampling deteriorates a signal-to-noise ratio. In addition, the ABB usually provides a specific adjustable gain to adjust an amplitude value of an analog baseband signal, to obtain signal strength expected by an ADC input end. An analog baseband signal output by the ABB is converted into a digital signal by the ADC, and then sent to a receive digital front-end RXDFE of the digital subsystem for further processing. After the processing, the signal is sent to the baseband integrated circuit BBIC through the SerDes interface.

In the transmitting direction, baseband data is sent to the intermediate-frequency integrated circuit IFIC through the SerDes interface. After being preprocessed by a transmit digital front-end TXDFE, the baseband data is converted into an analog baseband signal by using the digital-to-analog converter (DAC). The analog baseband signal first filters out, by using the ABB, an image signal substituted by digital-to-analog conversion, and suppresses quantization noise substituted by the digital baseband signal and the DAC. A filtered analog baseband signal is transferred to the intermediate-frequency band through a radio frequency modulator (MOD). After power adjustment is performed by an amplifier AMP, the signal is output to the high-frequency integrated circuit HFIC at a specific power.

It should be noted that, an example in which two intermediate-frequency transceivers are integrated, that is, a first intermediate-frequency transceiver IF-TCVR1 and a second intermediate-frequency transceiver IF-TCVR2, is used for illustration of the intermediate-frequency integrated circuit IFIC shown in FIG. 5. In the 5G NR communication system, the communication standard requires support for at least dual-polarized antenna receiving and transmitting. Therefore, the intermediate-frequency integrated circuit IFIC needs to support at least two intermediate-frequency transceivers IF-TCVRs. It may be understood that the intermediate-frequency integrated circuit IFIC provided in this application includes but is not limited to two intermediate-frequency transceivers IF-TCVRs. For a more complex application scenario, the intermediate-frequency integrated circuit IFIC may integrate more intermediate-frequency transceiver IF-TCVR channels.

Intermediate-Frequency Phase-Locked Loop IF-PLL

The intermediate-frequency phase-locked loop IF-PLL is configured to provide an intermediate-frequency local oscillator (IFLO) signal for the intermediate-frequency transceiver IF-TCVR, to implement spectrum shifting operation of the signal.

In some examples, a structure of the intermediate-frequency phase-locked loop IF-PLL is basically the same as the structure of the high-frequency phase-locked loop HF-PLL, except that output frequencies are different. Refer to the descriptions of the structure of the high-frequency phase-locked loop HF-PLL. Details are not described herein again.

Digital Subsystem

The digital subsystem of the intermediate-frequency integrated circuit IFIC mainly includes a digital front-end (DFE), an interface module INTF, and an intermediate-frequency control unit IF-CTRL-UNIT.

The digital front-end DFE includes the receive digital front-end RXDFE and the transmit digital front-end TXDFE, and the digital front-ends work with the receiver RX and the transmitter TX respectively.

The receive digital front-end RXDFE is configured to: receive a digital baseband signal output by the analog-to-digital converter ADC, perform sampling rate conversion on data through digital signal processing, or compensate for an error introduced by a non-ideal characteristic of a receiver channel. The transmit digital front-end TXDFE is configured to: preprocess a transmit signal, adjust a sampling rate of the signal by using a digital signal processing method, predistort data, or compensate for an error introduced by a non-ideal characteristic of a transmitter channel.

Each receiver RX channel and each transmitter TX channel have a corresponding receive digital front-end RXDFE and a corresponding transmit digital front-end TXDFE.

Herein, for the interface module INTF, the intermediate-frequency integrated circuit IFIC shown in FIG. 5 is used as an example. The intermediate-frequency integrated circuit IFIC shown in FIG. 5 uses a digital baseband interface. To be specific, a SerDes interface circuit needs to be used to implement transmission of data and instructions between the intermediate-frequency integrated circuit IFIC and the baseband integrated circuit BBIC. Paired SerDes interface circuits are integrated in the intermediate-frequency integrated circuit IFIC and the baseband integrated circuit BBIC.

In the receiving direction, the digital baseband signal is processed by the receive digital front-end RXDFE and then sent to the interface module INTF for encoding, packaging, and the like. Data that passes through the interface module INTF improves transmission reliability, but also increases transmission overhead. The processed data is sent to a SerDes transmitter (TL). After parallel-to-serial conversion, the processed data is sent to the baseband integrated circuit BBIC in a form of serial data. On a baseband integrated circuit BBIC side, one SerDes receiver (RL) corresponding to the intermediate-frequency integrated circuit IFIC is provided to receive the serial data from the intermediate-frequency integrated circuit IFIC and convert the serial data into a parallel signal. An interface module INTF is also integrated on the baseband integrated circuit BBIC side. The INTF is configured to: perform unpacking, decoding, and the like on the received data, remove the transmission overhead, obtain actual valid data, and then send the data to the baseband processor for processing. In the transmitting direction, transmission of a digital signal is similar to that in the receiving direction. The only difference is that the data is transmitted from the baseband integrated circuit BBIC to the intermediate-frequency integrated circuit IFIC.

In addition, for the intermediate-frequency control unit IF-CTRL-UNIT, the intermediate-frequency control unit IF-CTRL-UNIT is configured to: receive instructions from an upper-layer system, parse the instructions, and then send the instructions to each functional module of the intermediate-frequency integrated circuit IFIC through a control bus, or further translate the instructions into a serial instruction format, and send the serial instructions to the high-frequency integrated circuit HFIC through a serial control interface.

The upper-layer system is usually integrated in the baseband integrated circuit BBIC. Instructions sent to the intermediate-frequency integrated circuit IFIC or transferred to the high-frequency integrated circuit HFIC by using the intermediate-frequency integrated circuit IFIC, is generated by using the baseband integrated circuit BBIC and a software system running on the baseband integrated circuit BBIC. Instructions generated by a baseband signal are interleaved with baseband data into a specific format by using the interface module INTF, and are sent from the baseband signal to the intermediate-frequency integrated circuit IFIC by using the SerDes module.

Next, the function and structure of the baseband integrated circuit BBIC are described by using an example.

The baseband integrated circuit BBIC is mainly configured to implement conversion between information and a physical signal. In the receiving direction, the baseband processor performs demodulation, decoding and the like on a baseband signal from the intermediate-frequency integrated circuit IFIC, and useful information is extracted from the signal. In the transmitting direction, the information is loaded to a waveform signal in a specific format through baseband processing, such as coding and modulation, and then sent to the intermediate-frequency integrated circuit IFIC.

In the wireless communication system 150, a radio frequency transceiver, that is, the high-frequency transceiver HF-TCVR and the intermediate-frequency transceiver IF-TCVR, uses a super-heterodyne structure, and implements spectrum shifting of a signal between a high-frequency antenna end and a baseband by performing two frequency conversion operations. In other words, conversion between a baseband signal and a high-frequency signal is implemented by two times of spectrum shifting, and the two times of spectrum shifting are implemented in the intermediate-frequency integrated circuit IFIC and the high-frequency integrated circuit HFIC respectively.

Figure 6:
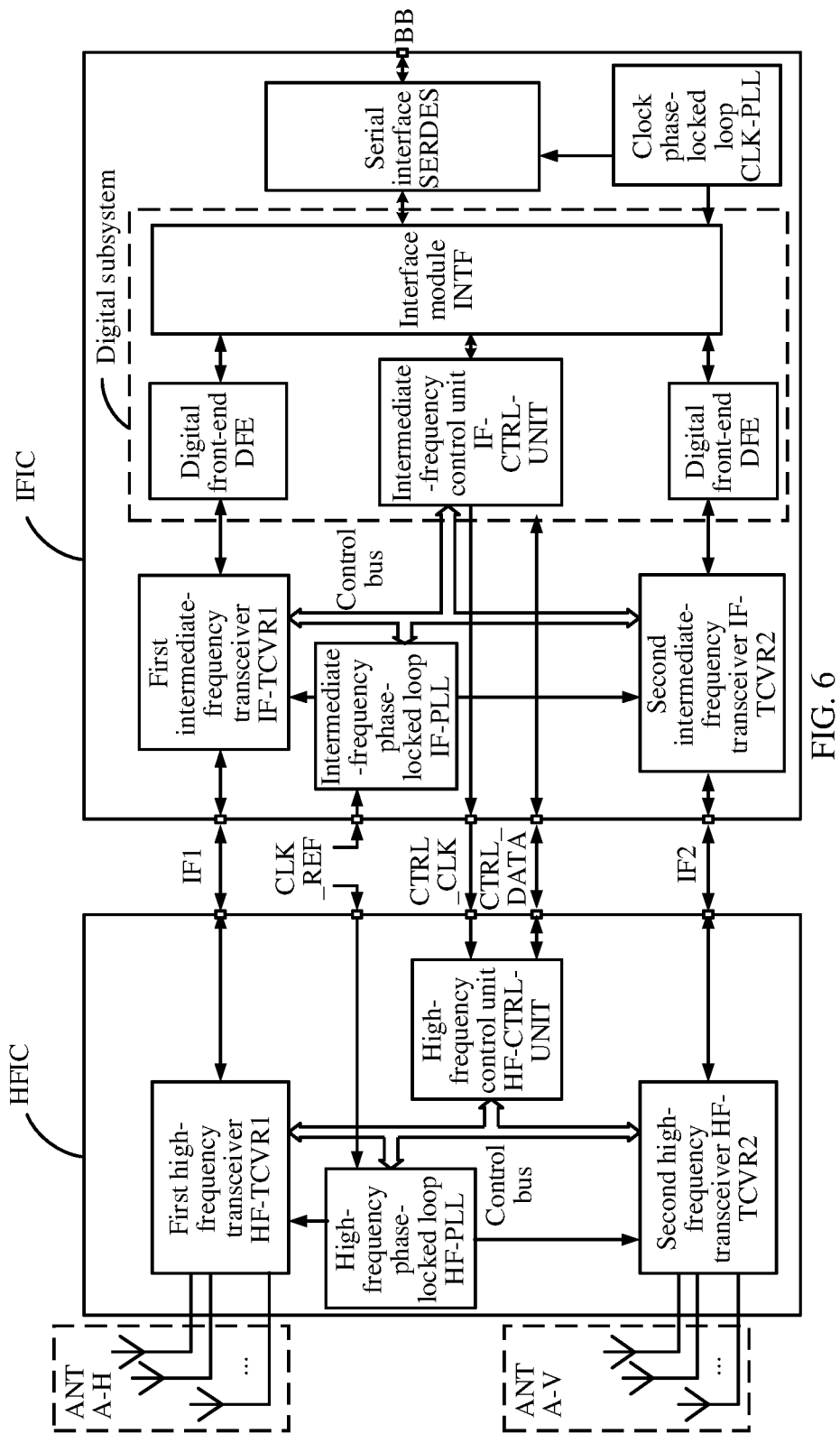
FIG. 6 is a schematic diagram of a structure of a wireless communication system according to an embodiment of this application.

It can be learned from the structures of the high-frequency integrated circuit HFIC and the intermediate-frequency integrated circuit IFIC that, as shown in FIG. 6, a signal is transmitted between the high-frequency integrated circuit HFIC and the intermediate-frequency integrated circuit IFIC by using a first signal pin IF1, a second signal pin IF2, and a control pin. The control pin includes an instruction data pin CTRL_DATA and an echo clock pin CTRL_CLK. In addition, the high-frequency integrated circuit HFIC and the intermediate-frequency integrated circuit IFIC each have a reference clock pin CLK_REF.

It should be noted that, an intermediate-frequency signal transmitted between the high-frequency integrated circuit HFIC and the intermediate-frequency integrated circuit IFIC is transmitted through the first signal pin IF1 and the second signal pin IF2. The 5G NR high-frequency communication system is a TDD system, and receiving and transmitting are not performed at the same time. Therefore, receiving and transmitting may be performed through one same hardware line. The high-frequency integrated circuit HFIC and the intermediate-frequency integrated circuit IFIC switch between reception and transmission functions through switches. In the wireless communication system 150, the intermediate-frequency integrated circuit IFIC and the high-frequency integrated circuit HFIC each have two transceiver channels, so that the first signal pin IF1 and the second signal pin IF2 of the high-frequency integrated circuit HFIC and the intermediate-frequency integrated circuit IFIC are coupled through one hardware line respectively.

The first signal pin IF1 of the high-frequency integrated circuit HFIC and the first signal pin IF1 of the intermediate-frequency integrated circuit IFIC, the second signal pin IF2 of the high-frequency integrated circuit HFIC and the second signal pin IF2 of the intermediate-frequency integrated circuit IFIC, the instruction data pin CTRL_DATA of the high-frequency integrated circuit HFIC and the instruction data pin CTRL_DATA of the intermediate-frequency integrated circuit IFIC, and the echo clock pin CTRL_CLK of the high-frequency integrated circuit HFIC and the echo clock pin CTRL_CLK of the intermediate-frequency integrated circuit IFIC, are all transmitted through one hardware line. In addition, the reference clock pin CLK_REF of the high-frequency integrated circuit HFIC and the reference clock pin CLK_REF of the intermediate-frequency integrated circuit IFIC each are transmitted through one hardware line. Therefore, based on pin designs of the high-frequency integrated circuit HFIC and the intermediate-frequency integrated circuit IFIC, for both of the high-frequency integrated circuit and the intermediate-frequency integrated circuit, at least five hardware lines are needed to provide various needed signals for the high-frequency integrated circuit and the intermediate-frequency integrated circuit.

However, a plurality of hardware lines occupy a large quantity of hardware cabling resources. For an electronic device having a small size such as a mobile phone, hardware cabling resources are limited. In addition, on some 5G high-frequency devices, the high-frequency integrated circuit HFIC and the intermediate-frequency integrated circuit IFIC are far away from each other on hardware, and are even disposed on different circuit boards. Therefore, a customized flat cable is needed for connection. Excessive hardware lines limit design of the flat cable and a hardware connector.

To resolve a problem that a large quantity of hardware lines are needed for transmission between the high-frequency integrated circuit HFIC and the intermediate-frequency integrated circuit IFIC in the wireless communication system 150, this application further provides a wireless communication system 150. The wireless communication system 150 may be applied to the electronic device 100. The following describes, by using several specific embodiments, the wireless communication system 150 provided in this application as an example.

Embodiment 1

Figure 7:
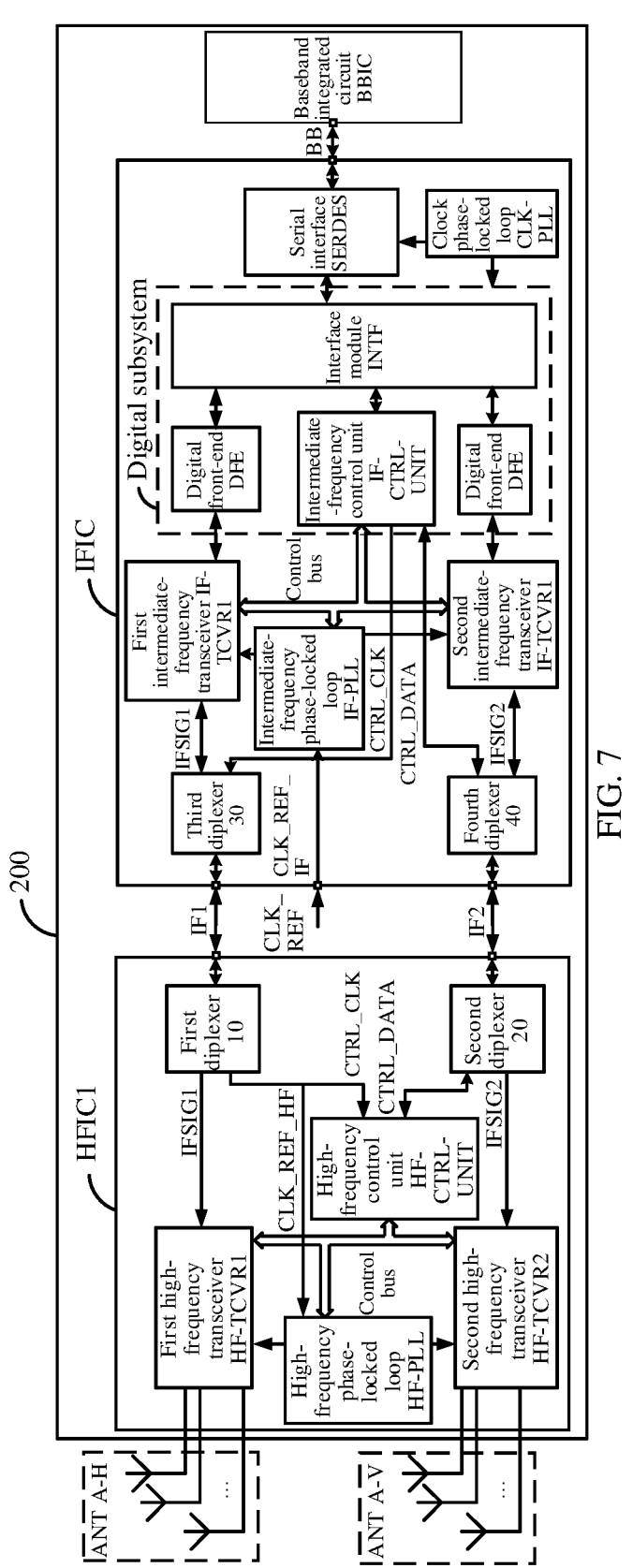
FIG. 7 is a schematic diagram of a structure of a circuit board and a wireless communication system according to an embodiment of this application.

As shown in FIG. 7, the wireless communication system 150 includes a first high-frequency integrated circuit HFIC1, an intermediate-frequency integrated circuit IFIC, and an antenna array ANT-array. The first high-frequency integrated circuit HFIC1 is coupled between the antenna array ANT-array and the intermediate-frequency integrated circuit IFIC. The wireless communication system 150 further includes a baseband integrated circuit BBIC. The intermediate-frequency integrated circuit IFIC is coupled between the first high-frequency integrated circuit HFIC1 and the baseband integrated circuit BBIC.

For the baseband integrated circuit BBIC and the antenna array ANT-array, refer to the related descriptions. Details are not described in Embodiment 1.

It should be understood that the wireless communication system 150 provided in this application may separately work in a transmitting mode and a receiving mode. In the transmitting mode, a communication signal is sent from the baseband integrated circuit BBIC to the intermediate-frequency integrated circuit IFIC, sent from the intermediate-frequency integrated circuit IFIC to the first high-frequency integrated circuit HFIC1, and then transmitted via the antenna array ANT-array. In the receiving mode, after receiving a communication signal, the antenna array ANT-array sends the communication signal to the first high-frequency integrated circuit HFIC1. Next, the communication signal is sent from the first high-frequency integrated circuit HFIC1 to the intermediate-frequency integrated circuit IFIC, and then sent to the baseband integrated circuit BBIC.

Figure 8A:
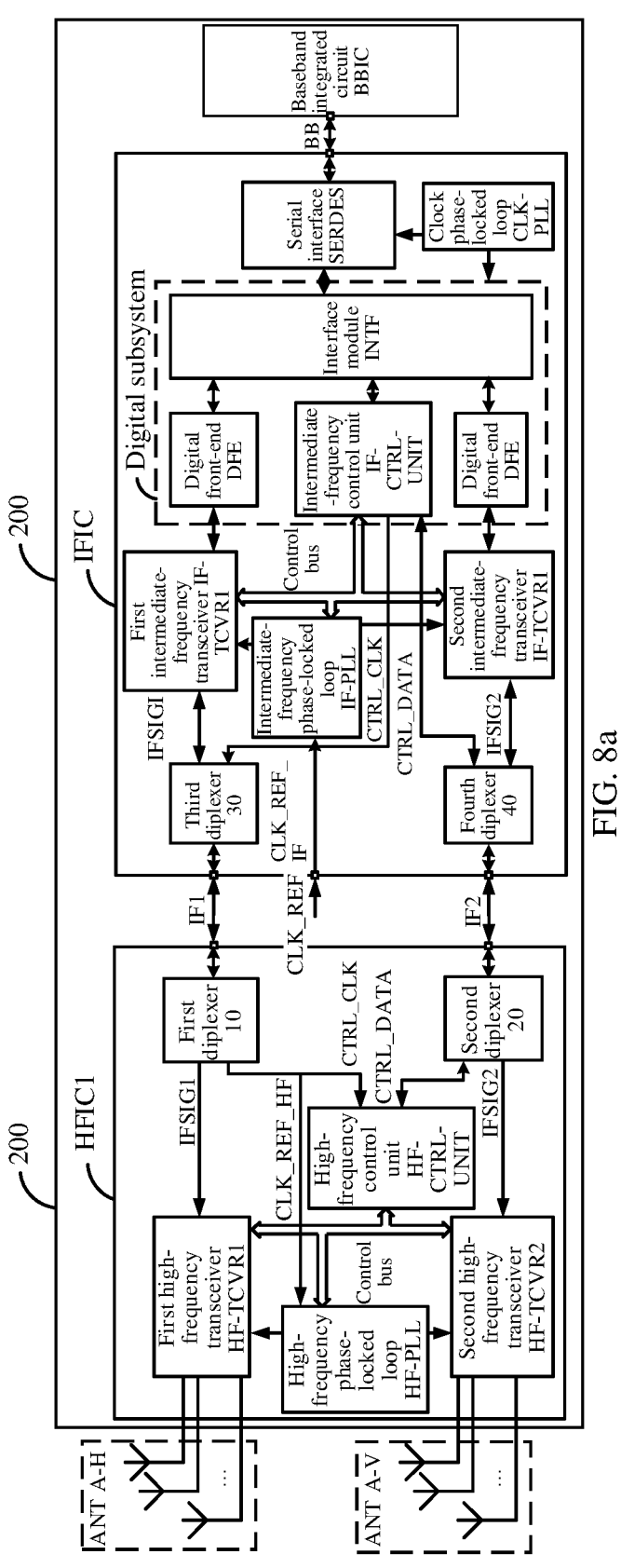
FIG. 8a is a schematic diagram of a structure of a circuit board and a wireless communication system according to another embodiment of this application.
Figure 8B:
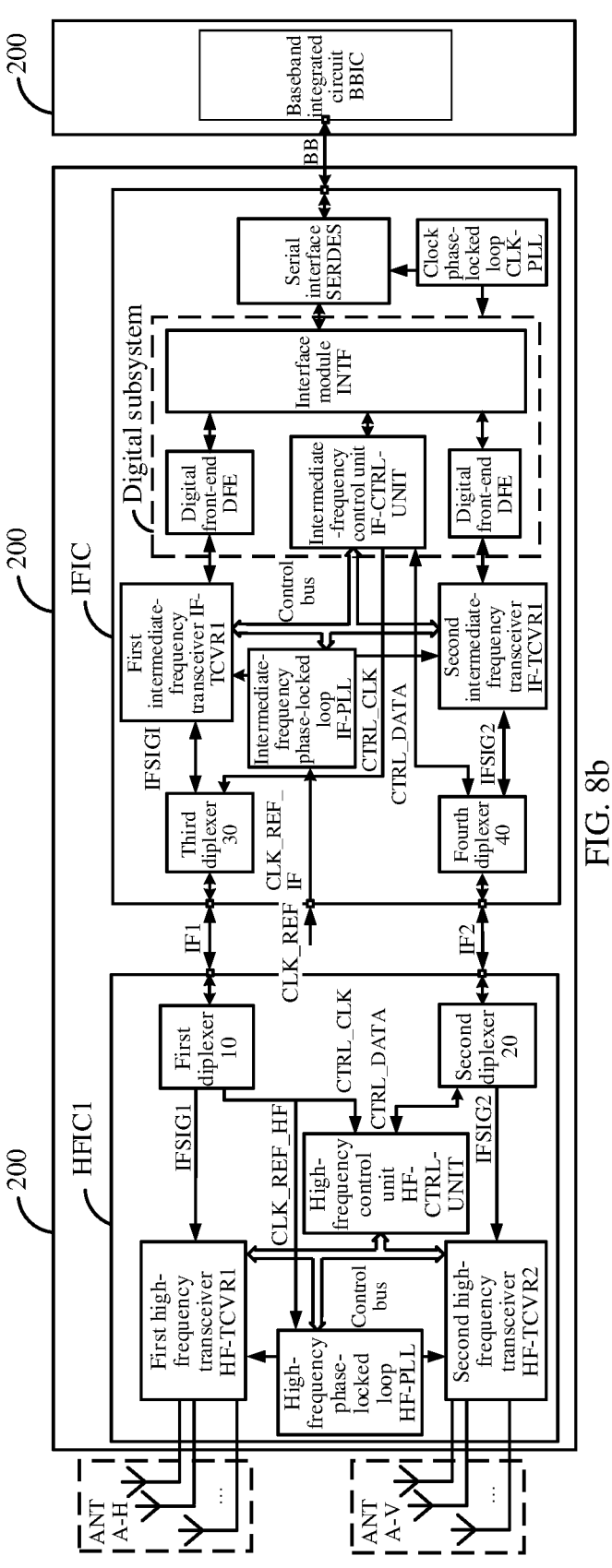
FIG. 8b is a schematic diagram of a structure of a circuit board and a wireless communication system according to still another embodiment of this application.

In some examples, as shown in FIG. 7, the first high-frequency integrated circuit HFIC1, the intermediate-frequency integrated circuit IFIC, and the baseband integrated circuit BBIC may be integrated on one circuit board 200 (where the circuit board 200 may be, for example, a printed circuit board). In some other examples, as shown in FIG. 8a, any two of the first high-frequency integrated circuit HFIC1, the intermediate-frequency integrated circuit IFIC, and the baseband integrated circuit BBIC are integrated on one circuit board 200, and another one is integrated on the other circuit board 200. In FIG. 8a, an example in which the intermediate-frequency integrated circuit IFIC and the baseband integrated circuit BBIC are integrated on one circuit board 200, and the first high-frequency integrated circuit HFIC1 is integrated on the other circuit board 200 is used for illustration. In still some other examples, as shown in FIG. 8*b*, the first high-frequency integrated circuit HFIC1, the intermediate-frequency integrated circuit IFIC, and the baseband integrated circuit BBIC each are integrated on one circuit board 200.

Figure 9:
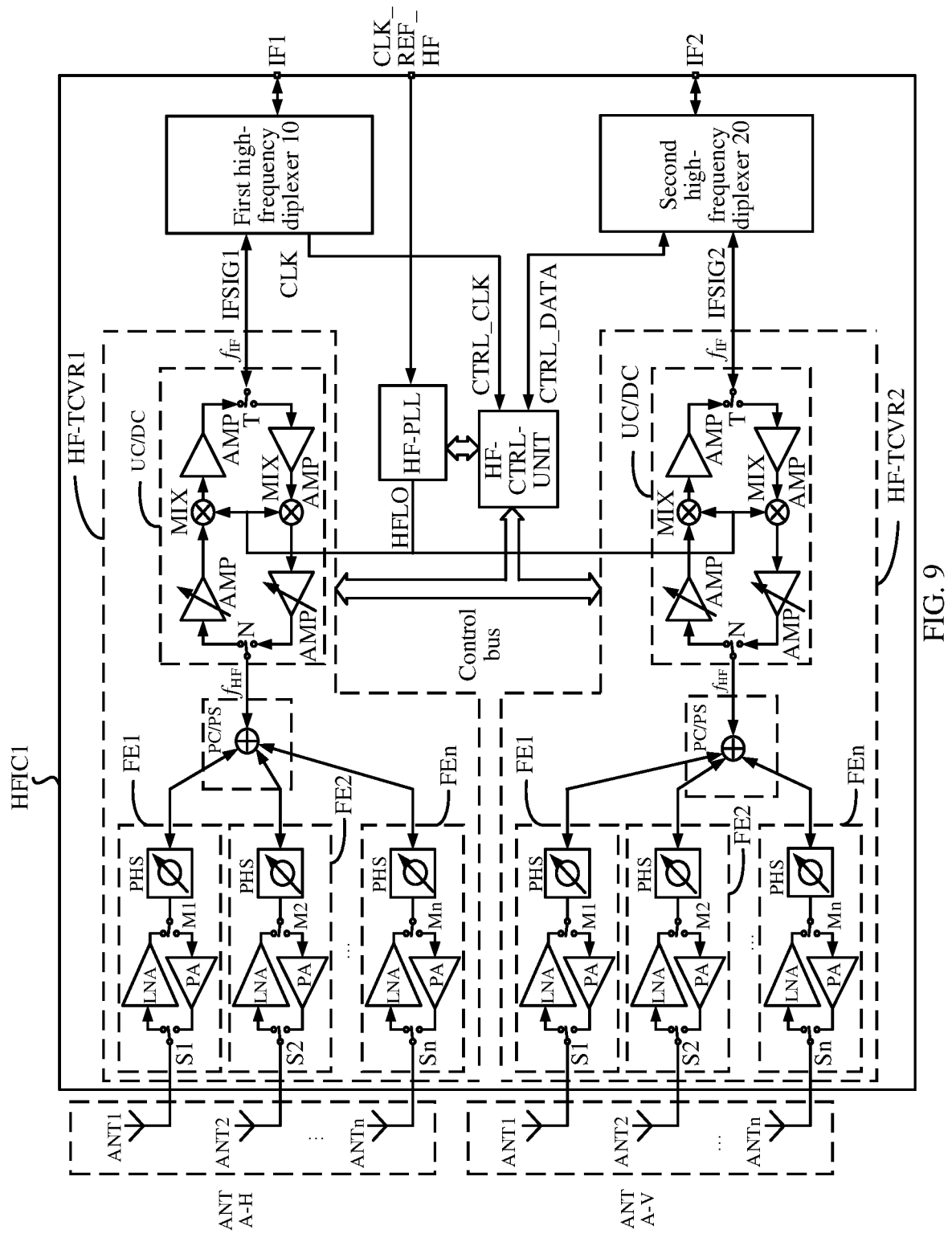
FIG. 9 is a schematic diagram of a structure of a high-frequency integrated circuit according to another embodi-ment of this application.

As shown in FIG. 9, the first high-frequency integrated circuit HFIC1 includes a first high-frequency transceiver HF-TCVR1, a second high-frequency transceiver HF-TCVR2, a high-frequency phase-locked loop HF-PLL, and a high-frequency control unit HF-CTRL-UNIT. The high-frequency phase-locked loop HF-PLL is separately coupled to the first high-frequency transceiver HF-TCVR1 and the second high-frequency transceiver HF-TCVR2.

It should be noted that, for structures of the first high-frequency transceiver HF-TCVR1 and the second high-frequency transceiver HF-TCVR2, refer to the related descriptions of the high-frequency transceiver HF-TCVR. FIG. 9 shows specific structures of the first high-frequency transceiver HF-TCVR1 and the second high-frequency transceiver HF-TCVR2. For a structure of the high-frequency phase-locked loop HF-PLL, refer to the related descriptions of the high-frequency phase-locked loop HF-PLL. For a structure of the high-frequency control unit HF-CTRL-UNIT, refer to the related descriptions of the high-frequency control unit HF-CTRL-UNIT. Details are not described herein again.

Herein, the first high-frequency transceiver HF-TCVR1 and the second high-frequency transceiver HF-TCVR2 may be configured to receive or transmit the communication signal. The communication signal is usually an intermediate-frequency IF signal, and a frequency band of the communication signal may be, for example, 7 GHz to 15 GHz. The high-frequency control unit HF-CTRL-UNIT is configured to receive or transmit a control signal. The control signal may include, for example, an instruction data signal CTRL_DATA and an echo clock signal CTRL_CLK. The control signal is usually a low-frequency signal, and a frequency band of the control signal may be, for example, 100 MHz to 500 MHz. In some examples, a frequency of the instruction data signal CTRL_DATA and/or a frequency of the echo clock signal CTRL_CLK are/is one of 245.76 Mbps, 307.2 Mbps, and 491.52 Mbps. When the frequency of the instruction data signal CTRL_DATA and/or the frequency of the echo clock signal CTRL_CLK are/is one of 245.76 Mbps, 307.2 Mbps, and 491.52 Mbps, for a 5G NR system, a related clock frequency defined in a protocol may be directly used to reduce difficulty of the wireless communication system.

On this basis, still refer to FIG. 9. The first high-frequency integrated circuit HFIC1 further includes a first diplexer 10 and a second diplexer 20. The first high-frequency transceiver HF-TCVR1 is coupled to the first diplexer 10, and the second high-frequency transceiver HF-TCVR2 is coupled to the second diplexer 20. The high-frequency control unit HF-CTRL-UNIT is separately coupled to the first diplexer 10 and the second diplexer 20. The echo clock signal CTRL_CLK is transmitted between the high-frequency control unit HF-CTRL-UNIT and the first diplexer 10, and the instruction data signal CTRL_DATA is transmitted between the high-frequency control unit HF-CTRL-UNIT and the second diplexer 20.

Both the first diplexer 10 and the second diplexer 20 include a first distribution port, a second distribution port, and a combination port. The first distribution port of the first diplexer 10 is coupled to the first high-frequency transceiver HF-TCVR1, and the second distribution port is coupled to the high-frequency control unit HF-CTRL-UNIT. The first distribution port of the second diplexer 20 is coupled to the second high-frequency transceiver HF-TCVR2, and the second distribution port is coupled to the high-frequency control unit HF-CTRL-UNIT.

Figure 10:
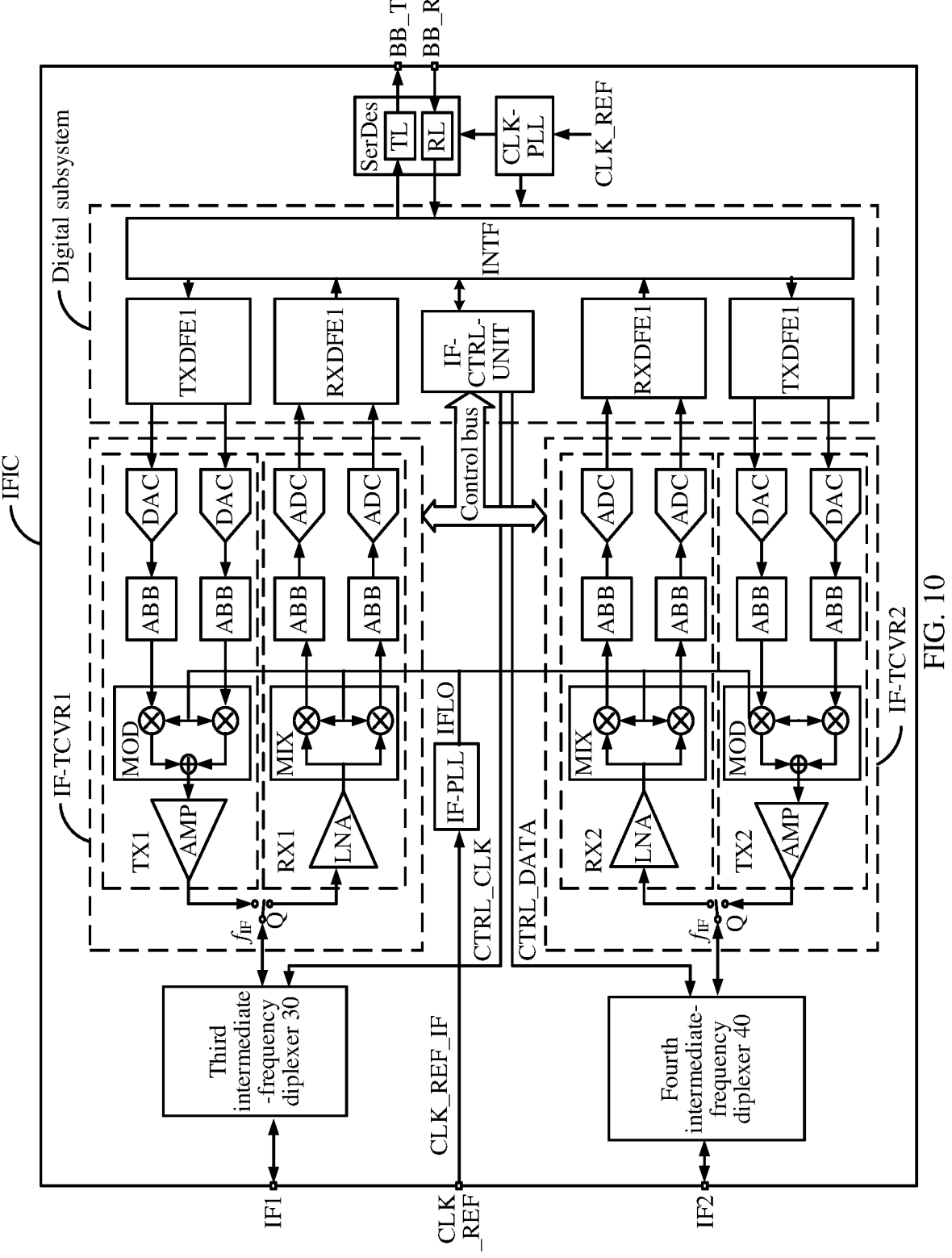
FIG. 10 is a schematic diagram of a structure of an intermediate-frequency integrated circuit according to another embodiment of this application.

As shown in FIG. 10, the intermediate-frequency integrated circuit IFIC includes a first intermediate-frequency transceiver IF-TCVR1, a second intermediate-frequency transceiver IF-TCVR2, an intermediate-frequency phase-locked loop IF-PLL, and a digital subsystem. The intermediate-frequency phase-locked loop IF-PLL is separately coupled to the first intermediate-frequency transceiver IF-TCVR1 and the second intermediate-frequency transceiver IF-TCVR2. The digital subsystem includes an intermediate-frequency control unit IF-CTRL-UNIT, a digital front-end DFE, and an interface module INTF.

It should be noted that, for structures of the first intermediate-frequency transceiver IF-TCVR1 and the second intermediate-frequency transceiver IF-TCVR2, refer to the related descriptions of the intermediate-frequency transceiver IF-TCVR. FIG. 10 shows specific structures of the first intermediate-frequency transceiver IF-TCVR1 and the second intermediate-frequency transceiver IF-TCVR2. For specific structures of the intermediate-frequency phase-locked loop IF-PLL and the digital subsystem, refer to the related descriptions. Details are not described herein again.

Herein, the first intermediate-frequency transceiver IF-TCVR1 and the second intermediate-frequency transceiver IF-TCVR2 may be configured to receive or transmit a communication signal. For details about the communication signal, refer to the related descriptions of the first high-frequency transceiver HF-TCVR1 and the second high-frequency transceiver HF-TCVR2. The intermediate-frequency control unit IF-CTRL-UNIT is configured to receive or transmit a control signal. For details about the control signal, refer to the related descriptions of the high-frequency control unit HF-CTRL-UNIT.

On this basis, still refer to FIG. 10. The intermediate-frequency integrated circuit IFIC further includes a third diplexer 30 and a fourth diplexer 40. The first intermediate-frequency transceiver IF-TCVR1 is coupled to the third diplexer 30, and the second intermediate-frequency transceiver IF-TCVR2 is coupled to the fourth diplexer 40. The intermediate-frequency control unit IF-CTRL-UNIT is separately coupled to the third diplexer 30 and the fourth diplexer 40. The echo clock signal CTRL_CLK is transmitted between the intermediate-frequency control unit IF-CTRL-UNIT and the third diplexer 30, and the instruction data signal CTRL_DATA is transmitted between the intermediate-frequency control unit and the fourth diplexer.

Both the third diplexer 30 and the fourth diplexer 40 include a first distribution port, a second distribution port, and a combination port. The first distribution port of the third diplexer 30 is coupled to the first intermediate-frequency transceiver IF-TCVR1, and the second distribution port is coupled to the intermediate-frequency control unit IF-CTRL-UNIT. The first distribution port of the fourth diplexer 40 is coupled to the second intermediate-frequency transceiver IF-TCVR2, and the second distribution port is coupled to the intermediate-frequency control unit IF-CTRL-UNIT.

Based on the structures of the first high-frequency integrated circuit HFIC1 and the intermediate-frequency integrated circuit IFIC, the first diplexer 10 of the first high-frequency integrated circuit HFIC1 is coupled to the third diplexer 30 of the intermediate-frequency integrated circuit IFIC, and the second diplexer 20 of the first high-frequency integrated circuit HFIC1 is coupled to the fourth diplexer 40 of the intermediate-frequency integrated circuit IFIC, so that coupling between the first high-frequency integrated circuit HFIC1 and the intermediate-frequency integrated circuit IFIC can be implemented.

It should be understood that, that "the first diplexer 10 is coupled to the third diplexer 30, and the second diplexer 20 is coupled to the fourth diplexer 40" means that the combination port of the first diplexer 10 is coupled to the combination port of the third diplexer 30, and the combination port of the second diplexer 20 is coupled to the combination port of the fourth diplexer 40.

In some examples, the wireless communication system 150 further includes a hardware line. For example, the hardware line may be a cable, for example, a coaxial cable, or a cable disposed in a circuit board. The cable disposed in the circuit board may be a cable disposed in a PCB, or may be a cable disposed in an FPC. The first diplexer 10 and the third diplexer 30 may be coupled through one hardware line, and the second diplexer 20 and the fourth diplexer 40 may be coupled through one hardware line. In FIG. 7, the first diplexer 10 and the third diplexer 30 are coupled through a hardware line IF1, and the second diplexer 20 and the fourth diplexer 40 are coupled through a hardware line IF2.

It should be noted that, in this application, if the hardware line is used to transmit a differential signal, one hardware line includes a pair of differential lines, in other words, includes two lines.

The first high-frequency transceiver HF-TCVR1 is coupled to the first diplexer 10, the first intermediate-frequency transceiver IF-TCVR1 is coupled to the third diplexer 30, and the first diplexer 10 is coupled to the third diplexer 30. Therefore, a first communication signal IFSIG1 may be transmitted between the first high-frequency transceiver HF-TCVR1 and the first intermediate-frequency transceiver IF-TCVR1 via the first diplexer 10 and the third diplexer 30. Correspondingly, the second high-frequency transceiver HF-TCVR2 is coupled to the second diplexer 20, the second intermediate-frequency transceiver IF-TCVR2 is coupled to the fourth diplexer 40, and the second diplexer 20 is coupled to the fourth diplexer 40. Therefore, a second communication signal IFSIG2 may be transmitted between the second high-frequency transceiver HF-TCVR2 and the second intermediate-frequency transceiver IF-TCVR2 via the second diplexer 20 and the fourth diplexer 40.

Herein, the first communication signal IFSIG1 and the second communication signal IFSIG2 may be the same, or may be different.

It should be understood that, both the first communication signal IFSIG1 and the second communication signal IFSIG2 may be transmitted bidirectionally between the first high-frequency integrated circuit HFIC1 and the intermediate-frequency integrated circuit IFIC. The first communication signal IFSIG1 is used as an example, in the receiving mode, the first communication signal IFSIG1 may be transmitted by the first high-frequency transceiver HF-TCVR1 of the first high-frequency integrated circuit HFIC1 to the first intermediate-frequency transceiver IF-TCVR1 via the first diplexer 10 and the third diplexer 30. In the transmitting mode, the first communication signal IFSIG1 may be transmitted by the first intermediate-frequency transceiver IF-TCVR1 of the intermediate-frequency integrated circuit IFIC to the first high-frequency transceiver HF-TCVR1 via the third diplexer 30 and the first diplexer 10. For a transmission path of the second communication signal IFSIG2, refer to that of the first communication signal IFSIG1. Details are not described herein again. In addition, a transmission direction of the first communication signal IFSIG1 may be the same as or different from a transmission direction of the second communication signal IFSIG2.

The high-frequency control unit HF-CTRL-UNIT is separately coupled to the first diplexer 10 and the second diplexer 20, and the intermediate-frequency control unit IF-CTRL-UNIT is separately coupled to the third diplexer 30 and the fourth diplexer 40. In addition, the first diplexer 10 is coupled to the third diplexer 30, and the second diplexer 20 is coupled to the fourth diplexer 40. Therefore, the control signal may be transmitted between the high-frequency control unit HF-CTRL-UNIT and the intermediate-frequency control unit IF-CTRL-UNIT. The control signal includes the instruction data signal CTRL_DATA and the echo clock signal CTRL_CLK. A phase of the instruction data signal CTRL_DATA is synchronized with a phase of the echo clock signal CTRL_CLK, and a frequency of the instruction data signal CTRL_DATA and a frequency of the echo clock signal CTRL_CLK are in a co-frequency or a frequency multiplication relationship.

It should be understood that the echo clock signal CTRL_CLK is used as an echo clock signal CTRL_CLK of the instruction data signal CTRL_DATA. Phase synchronization between the instruction data signal CTRL_DATA and the echo clock signal CTRL_CLK means that the instruction data signal CTRL_DATA is sent out on a rising edge and/or a falling edge of the echo clock signal CTRL_CLK.

Herein, the instruction data signal CTRL_DATA may be sent out on the rising edge of the echo clock signal CTRL_CLK, or the instruction data signal CTRL_DATA may be sent out on the falling edge of the echo clock signal CTRL_CLK. Certainly, the instruction data signal CTRL_DATA may further be sent out on both the rising edge and the falling edge of the echo clock signal CTRL_CLK.

Figures 11, 12:
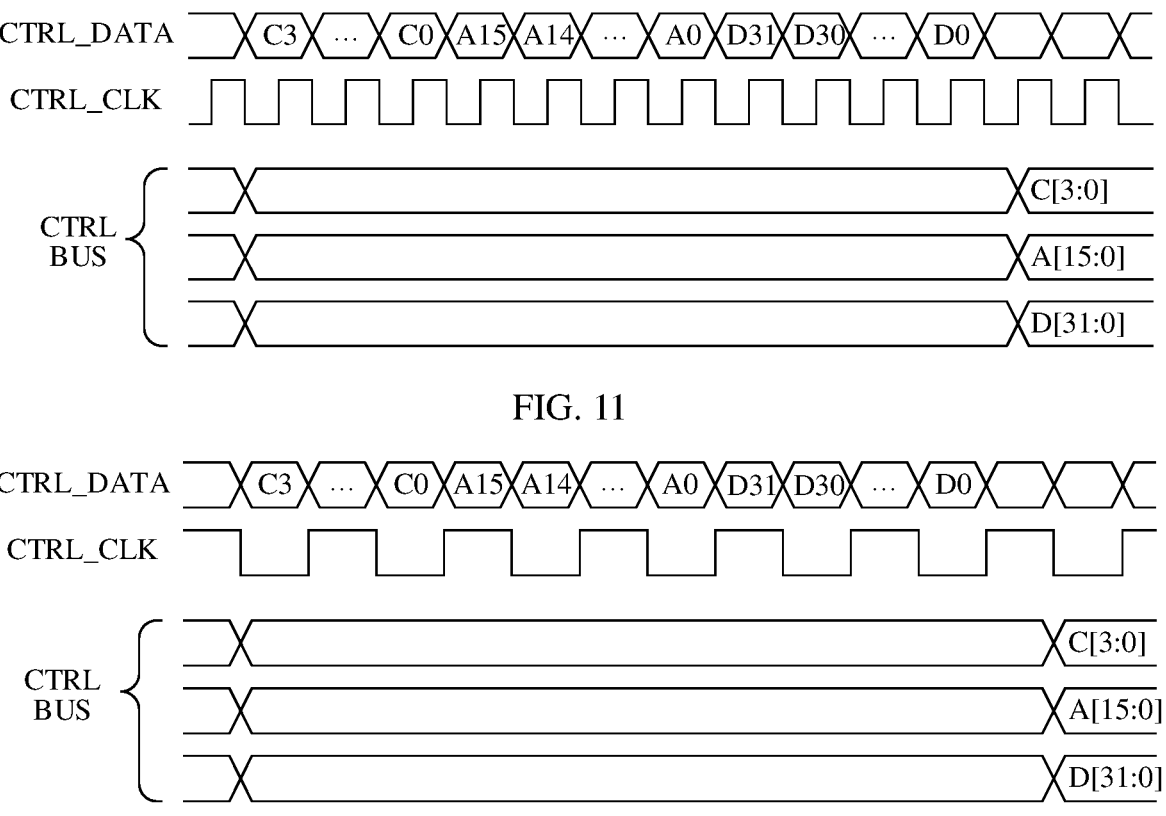
FIG. 11 is a schematic diagram of a structure of a control signal according to an embodiment of this application.
FIG. 12 is a schematic diagram of a structure of a control signal according to another embodiment of this application.

FIG. 11 and FIG. 12 each show an example of a typical structure of a control signal according to this application. CTRL_DATA is an instruction data signal, and the instruction data signal CTRL_DATA may include, for example, an instruction type, an address bit, and a data bit. Refer to FIG. 11 and FIG. 12, C3, . . . , and Co are instruction types, for example, a read or write operation, A15, . . . , and A0 are 16-bit address bits, and D31, . . . , and Do are 32-bit data bits. CTRL_CLK is an echo clock signal of the instruction data signal, so that instruction data can be correctly processed at an instruction receiving end, for example, an intermediate-frequency control unit.

Herein, in some examples, the frequency of the echo clock signal CTRL_CLK and the frequency of the instruction data signal CTRL_DATA may be in the co-frequency relationship. In other words, as shown in FIG. 11, one piece of instruction data is sent in each clock cycle of the echo clock signal CTRL_CLK. This format shown in FIG. 11 may also be referred to as a single data rate (SDR).

In some other examples, the frequency of the echo clock signal CTRL_CLK and the frequency of the instruction data signal CTRL_DATA may be in a frequency multiplication relationship. For example, as shown in FIG. 12, the instruction data may be sent separately on the rising edge and the falling edge of the echo clock signal CTRL_CLK. In other words, 2-bit instruction data is sent in each clock cycle of the echo clock signal CTRL_CLK. This format shown in FIG. 12 may also be referred to as a double data rate (DDR).

In the high-frequency control unit HF-CTRL-UNIT, instruction data sent in a serial manner is converted into a parallel format by using the echo clock signal CTRL_CLK, and then sent to each functional module through a control bus CTRL BUS of the high-frequency integrated circuit HFIC.

It should be noted that a format of the control signal may be designed based on actual requirements. In addition, a specific format of the instruction data signal in the control signal is not limited in this application. The instruction data signal includes but is not limited to the instruction type, the address bit, and the data bit, and may be designed based on requirements. In this application, a specified control signal includes one instruction data signal CTRL_DATA and one echo clock signal CTRL_CLK. It should be understood that the control signal includes but is not limited to the instruction data signal CTRL_DATA and the echo clock signal CTRL_CLK, and may further include another signal.

On this basis, the echo clock signal CTRL_CLK in the control signal is transmitted between the high-frequency control unit HF-CTRL-UNIT and the intermediate-frequency control unit IF-CTRL-UNIT via the first diplexer 10 and the third diplexer 30. The instruction data signal CTRL_DATA in the control signal is transmitted between the high-frequency control unit HF-CTRL-UNIT and the intermediate-frequency control unit IF-CTRL-UNIT via the second diplexer 20 and the fourth diplexer 40.

Herein, the instruction data signal CTRL_DATA may be transmitted bidirectionally between the first high-frequency integrated circuit HFIC1 and the intermediate-frequency integrated circuit IFIC. In the receiving mode, the instruction data signal CTRL_DATA may be transmitted by the high-frequency control unit HF-CTRL-UNIT of the first high-frequency integrated circuit HFIC1 to the intermediate-frequency control unit IF-CTRL-UNIT via the second diplexer 20 and the fourth diplexer 40. In the transmitting mode, the instruction data signal CTRL_DATA may be transmitted by the intermediate-frequency control unit IF-CTRL-UNIT of the intermediate-frequency integrated circuit IFIC to the high-frequency control unit HF-CTRL-UNIT via the fourth diplexer 40 and the second diplexer 20.

Similarly, the echo clock signal CTRL_CLK may be transmitted bidirectionally between the first high-frequency integrated circuit HFIC1 and the intermediate-frequency integrated circuit IFIC. The echo clock signal CTRL_CLK may be transmitted by the high-frequency control unit HF-CTRL-UNIT of the first high-frequency integrated circuit HFIC1 to the intermediate-frequency control unit IF-CTRL-UNIT via the first diplexer 10 and the third diplexer 30. The echo clock signal CTRL_CLK may alternatively be transmitted by the intermediate-frequency control unit IF-CTRL-UNIT of the intermediate-frequency integrated circuit IFIC to the high-frequency control unit HF-CTRL-UNIT via the third diplexer 30 and the first diplexer 10. In addition, a transmission direction of the instruction data signal CTRL_DATA may be the same as or different from a transmission direction of the echo clock signal CTRL_CLK. In addition, transmission directions of the first communication signal IFSIG1, the second communication signal IFSIG2, the instruction data signal CTRL_DATA, and the echo clock signal CTRL_CLK may be the same, or may be different.

Generally, the echo clock signal CTRL_CLK is generated by a primary controller of an upper-layer system, and the primary controller is generally integrated in the baseband integrated circuit BBIC or the intermediate-frequency integrated circuit IFIC. Therefore, in some examples, as shown in FIG. 7, the intermediate-frequency control unit IF-CTRL-UNIT transmits the echo clock signal CTRL_CLK to the high-frequency control unit HF-CTRL-UNIT via the third diplexer 30 and the first diplexer 10, so that the echo clock signal CTRL_CLK is used as an echo clock signal CTRL_CLK of the high-frequency control unit HF-CTRL-UNIT.

For example, in a transmitting direction, the intermediate-frequency integrated circuit IFIC integrates the third diplexer 30 and the fourth diplexer 40. The third diplexer 30 multiplexes the first communication signal IFSIG1 of the first intermediate-frequency transceiver IF-TCVR1 and the echo clock signal CTRL_CLK in the control signal to one hardware line IF1. The fourth diplexer 40 multiplexes the second communication signal IFSIG2 of the second intermediate-frequency transceiver IF-TCVR2 and the instruction data signal CTRL_DATA in the control signal to one hardware line IF2. The control signal and the two communication signals are separately multiplexed to two hardware lines via the third diplexer 30 and the fourth diplexer 40.

Similarly, the first high-frequency integrated circuit HFIC1 integrates the first diplexer 10 and the second diplexer 20. The first diplexer 10 is coupled to the hardware line IF1, and decomposes the first communication signal IFSIG1 carried on the hardware line IF1 and the echo clock signal CTRL_CLK in the control signal into two lines. The first communication signal IFSIG1 is sent to the first high-frequency transceiver HF-TCVR1, and the echo clock signal CTRL_CLK is sent to the high-frequency control unit HF-CTRL-UNIT. The second diplexer 20 is coupled to the hardware line IF2, and decomposes the second communication signal IFSIG2 carried on the hardware line IF2 and the instruction data signal CTRL_DATA in the control signal into two lines. The second communication signal IFSIG2 is sent to the second high-frequency transceiver HF-TCVR2, and the instruction data signal CTRL_DATA is sent to the high-frequency control unit HF-CTRL-UNIT for processing.

In Embodiment 1, the first high-frequency integrated circuit HFIC1 includes the first diplexer 10, and the first diplexer 10 is separately coupled to the first high-frequency transceiver HF-TCVR1 and the high-frequency control unit HF-CTRL-UNIT. The intermediate-frequency integrated circuit IFIC includes the third diplexer 30, and the third diplexer 30 is separately coupled to the first intermediate-frequency transceiver IF-TCVR1 and the intermediate-frequency control unit IF-CTRL-UNIT. In addition, the first diplexer 10 and the third diplexer 30 are coupled through one hardware line IF1. Therefore, through the one hardware line IF1, the first communication signal IFSIG1 may be transmitted between the first high-frequency transceiver HF-TCVR1 and the first intermediate-frequency transceiver IF-TCVR1, and the echo clock signal CTRL_CLK may also be transmitted between the high-frequency control unit HF-CTRL-UNIT and the intermediate-frequency control unit IF-CTRL-UNIT. Similarly, the first high-frequency integrated circuit HFIC1 further includes the second diplexer 20, and the second diplexer 20 is separately coupled to the second high-frequency transceiver HF-TCVR2 and the high-frequency control unit HF-CTRL-UNIT. The intermediate-frequency integrated circuit IFIC further includes the fourth diplexer 40, and the fourth diplexer 40 is separately coupled to the second intermediate-frequency transceiver IF-TCVR2 and the intermediate-frequency control unit IF-CTRL-UNIT. In addition, the second diplexer 20 and the fourth diplexer 40 are coupled through one hardware line IF2. Therefore, through the one hardware line IF2, the second communication signal IFSIG2 may be transmitted between the second high-frequency transceiver HF-TCVR2 and the second intermediate-frequency transceiver IF-TCVR2, and the instruction data signal CTRL_DATA may also be transmitted between the high-frequency control unit HF-CTRL-UNIT and the intermediate-frequency control unit IF-CTRL-UNIT.

It can be learned from the foregoing descriptions that, in Embodiment 1, the first communication signal IFSIG1 and the echo clock signal CTRL_CLK may be transmitted between the first high-frequency integrated circuit HFIC1 and the intermediate-frequency integrated circuit IFIC through one hardware line IF1, and the second communication signal IFSIG2 and the instruction data signal CTRL_DATA may be transmitted between the first high-frequency integrated circuit HFIC1 and the intermediate-frequency integrated circuit IFIC through one hardware line IF2. In other words, in Embodiment 1, two hardware lines are needed between the first high-frequency integrated circuit HFIC1 and the intermediate-frequency integrated circuit IFIC to implement transmission of the first communication signal IFSIG1, the second communication signal IFSIG2, the echo clock signal CTRL_CLK, and the instruction data signal CTRL_DATA. In comparison with that the first communication signal IFSIG1 between the first high-frequency transceiver HF-TCVR1 and the first intermediate-frequency transceiver IF-TCVR1 is transmitted through one hardware line, and the second communication signal IFSIG2 between the second high-frequency transceiver HF-TCVR2 and the second intermediate-frequency transceiver IF-TCVR2 is transmitted through one hardware line, the echo clock signal CTRL_CLK and the instruction data signal CTRL_DATA between the high-frequency control unit HF-CTRL-UNIT and the intermediate-frequency control unit IF-CTRL-UNIT each are transmitted through one hardware line. In other words, four hardware lines are needed between the first high-frequency integrated circuit HFIC1 and the intermediate-frequency integrated circuit IFIC to transmit the first communication signal IFSIG1, the second communication signal IFSIG2, the echo clock signal CTRL_CLK, and the instruction data signal CTRL_DATA respectively. Therefore, in Embodiment 1, a quantity of hardware lines can be reduced, and hardware cabling resources can be reduced.

The phase of the instruction data signal CTRL_DATA is synchronized with the phase of the echo clock signal CTRL_CLK, and the frequency of the instruction data signal CTRL_DATA and the frequency of the echo clock signal CTRL_CLK are in the co-frequency or frequency multiplication relationship. Therefore, compared with a signal without the relationship, the instruction data signal CTRL_DATA and the echo clock signal CTRL_CLK do not interfere with each other, and harmonic distortion generated by the instruction data signal CTRL_DATA and harmonic distortion generated by the echo clock signal CTRL_CLK are the same, so that interference to the first high-frequency integrated circuit HFIC1 and interference to the intermediate-frequency integrated circuit IFIC are the same. In this way, anti-interference design difficulty of the wireless communication system can be reduced. In addition, in comparison with a signal that is of another system and that is subject to an additional limitation, for example, a local-frequency signal whose frequency changes with that of a radio frequency carrier signal, selection of the echo clock signal CTRL_CLK is more flexible, so that the control signal can stably work at a more optimized frequency. In this way, design difficulty of the wireless communication system can be reduced.

Figure 13:
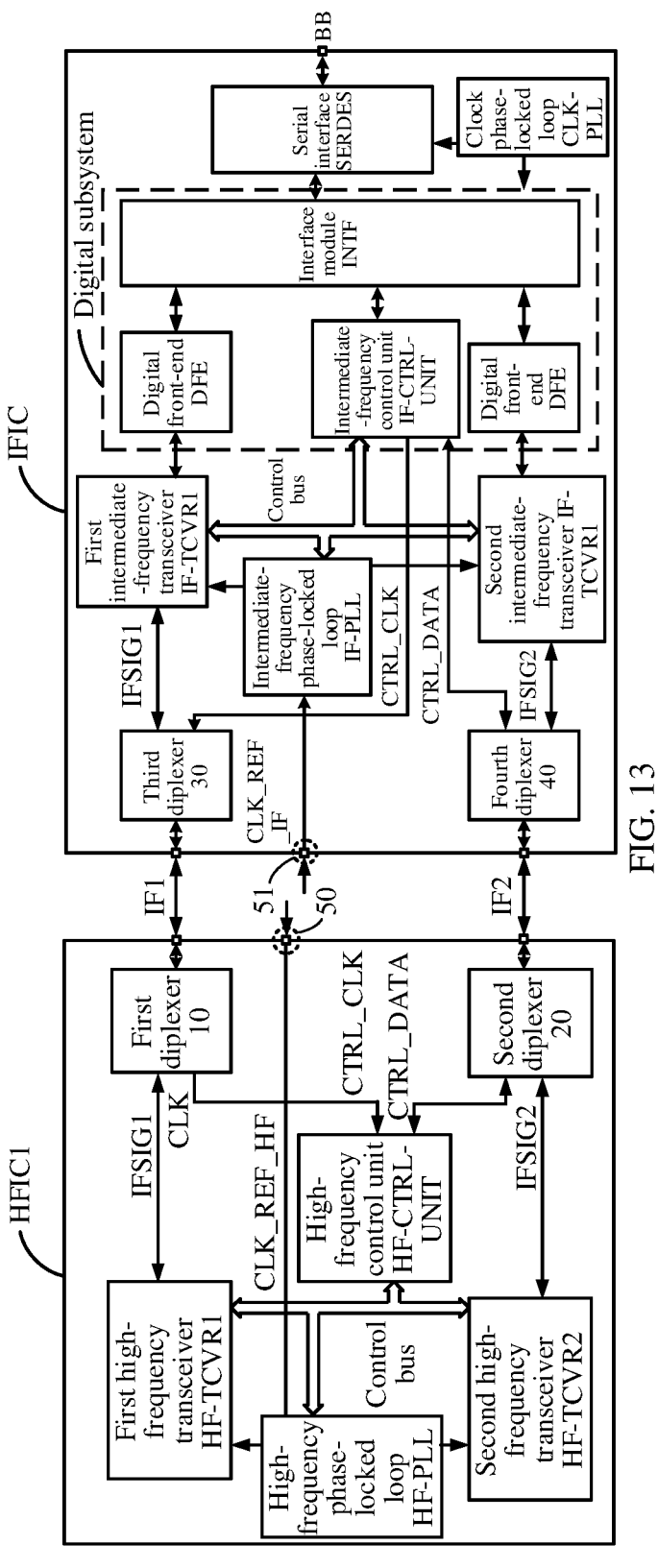
FIG. 13 is a schematic diagram of a structure of coupling a high-frequency integrated circuit and an intermediate-frequency integrated circuit according to an embodiment of this application.

It may be understood that the first high-frequency integrated circuit HFIC1 and the intermediate-frequency integrated circuit IFIC each have an independent reference clock signal. In some examples, as shown in FIG. 13, the first high-frequency integrated circuit HFIC1 further includes a high-frequency pin 50. The high-frequency pin 50 is configured to receive a first reference clock signal CLK_REF_HF. The intermediate-frequency integrated circuit IFIC further includes an intermediate-frequency pin 51. The intermediate-frequency pin 51 is configured to receive a second reference clock signal CLK_REF_IF. Herein, the first reference clock signal CLK_REF_HF and the second reference clock signal CLK_REF_IF may be the same, or may be different. It is considered that the first high-frequency integrated circuit HFIC1 and the intermediate-frequency integrated circuit IFIC are in the same wireless communication system 150. Therefore, in some examples, the first reference clock signal CLK_REF_HF of the first high-frequency integrated circuit HFIC1 and the second reference clock signal CLK_REF_HF of the intermediate-frequency integrated circuit IFIC are the same.

For the same wireless communication system 150, reference clock signals of the first high-frequency integrated circuit HFIC1 and the intermediate-frequency integrated circuit IFIC usually have a same source. For example, a dedicated clock chip may provide the first reference clock signal CLK_REF_HF for the first high-frequency integrated circuit HFIC1, and provide the second reference clock signal CLK_REF_IF for the intermediate-frequency integrated circuit IFIC. In this case, the clock chip is separately coupled to the high-frequency pin 50 and the intermediate-frequency pin 51 through two hardware lines. Based on this, for both the first high-frequency integrated circuit HFIC1 and the intermediate-frequency integrated circuit IFIC, at least three hardware lines are needed to provide various types of needed signals for the first high-frequency integrated circuit HFIC1 and the intermediate-frequency integrated circuit IFIC.

Based on the foregoing descriptions, when the first high-frequency integrated circuit HFIC1 includes the high-frequency pin 50, the high-frequency pin 50 may be coupled to the high-frequency phase-locked loop HF-PLL, and the first reference clock signal CLK_REF_HF received by the high-frequency pin 50 is used to provide a reference clock signal for the high-frequency phase-locked loop HF-PLL. Similarly, when the intermediate-frequency integrated circuit IFIC includes the intermediate-frequency pin 51, the intermediate-frequency pin 51 is coupled to the intermediate-frequency phase-locked loop IF-PLL, and the second reference clock signal CLK_REF_IF received by the intermediate-frequency pin 51 is used to provide a second reference clock signal for the intermediate-frequency phase-locked loop IF-PLL.

To further reduce the quantity of hardware lines, in some examples, the high-frequency pin 50 may not be disposed in the first high-frequency integrated circuit HFIC1, and the first reference clock signal CLK_REF_HF needed by the high-frequency phase-locked loop HF-PLL may be implemented by multiplexing the echo clock signal CTRL_CLK. Specifically, as shown in FIG. 7, the first diplexer 10 is further coupled to the high-frequency phase-locked loop HF-PLL. The intermediate-frequency control unit IF-CTRL-UNIT further transmits the echo clock signal CTRL_CLK to the high-frequency phase-locked loop HF-PLL via the third diplexer 30 and the first diplexer 10, to provide the first reference clock signal CLK_REF_HF for the high-frequency phase-locked loop HF-PLL.

After the intermediate-frequency control unit IF-CTRL-UNIT transmits the echo clock signal CTRL_CLK to the first diplexer 10 via the third diplexer 30, the first diplexer 10 may transmit the echo clock signal CTRL_CLK to the high-frequency control unit HF-CTRL-UNIT, so that the echo clock signal CTRL_CLK is used as the echo clock signal CTRL_CLK of the high-frequency control unit HF-CTRL-UNIT. In addition, the first diplexer 10 may transmit the echo clock signal CTRL_CLK to the high-frequency phase-locked loop HF-PLL, so that the echo clock signal CTRL_CLK is multiplexed as the first reference clock signal CLK_REF_HF of the high-frequency phase-locked loop HF-PLL. Therefore, the high-frequency pin 50 for receiving the first reference clock signal CLK_REF_HF does not need to be disposed in the first high-frequency integrated circuit HFIC1, and the hardware line coupled to the high-frequency pin 50 does not need to be disposed. In this way, the quantity of hardware lines coupled to the first high-frequency integrated circuit HFIC1 is further reduced, and the first high-frequency integrated circuit HFIC1 can be provided with various needed signals through at least two hardware lines.

Figure 14:
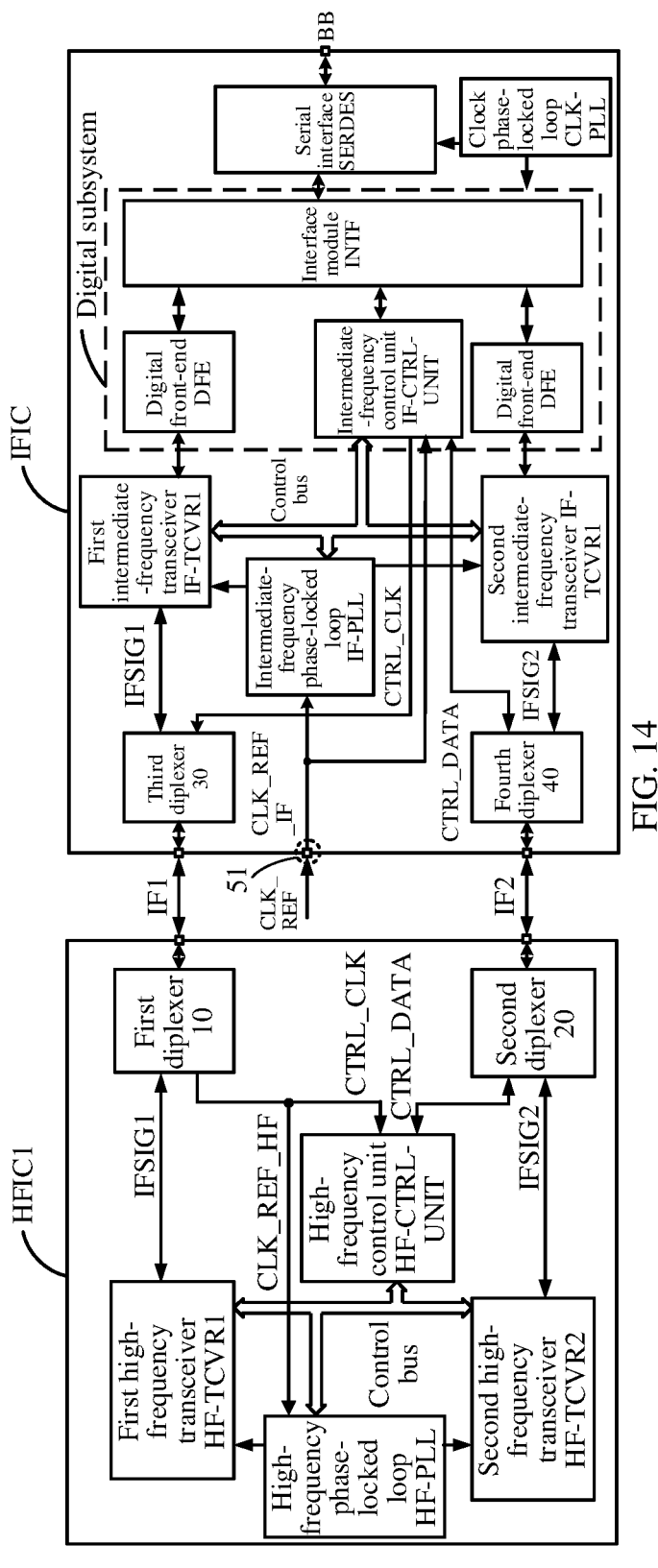
FIG. 14 is a schematic diagram of a structure of coupling a high-frequency integrated circuit and an intermediate-frequency integrated circuit according to another embodi-ment of this application.

It should be noted that, in addition to a case in which the echo clock signal CTRL_CLK may be generated by the primary controller of the upper-layer system, in some examples, as shown in FIG. 14, the echo clock signal CTRL_CLK transmitted by the intermediate-frequency control unit IF-CTRL-UNIT is generated based on the second reference clock signal CLK_REF_IF received by the intermediate-frequency pin 51. In other words, the second reference clock signal CLK_REF_IF received by the intermediate-frequency pin 51 may be first transmitted to the intermediate-frequency control unit IF-CTRL-UNIT, and the intermediate-frequency control unit IF-CTRL-UNIT processes the signal and then generates the echo clock signal CTRL_CLK.

Figure 15:
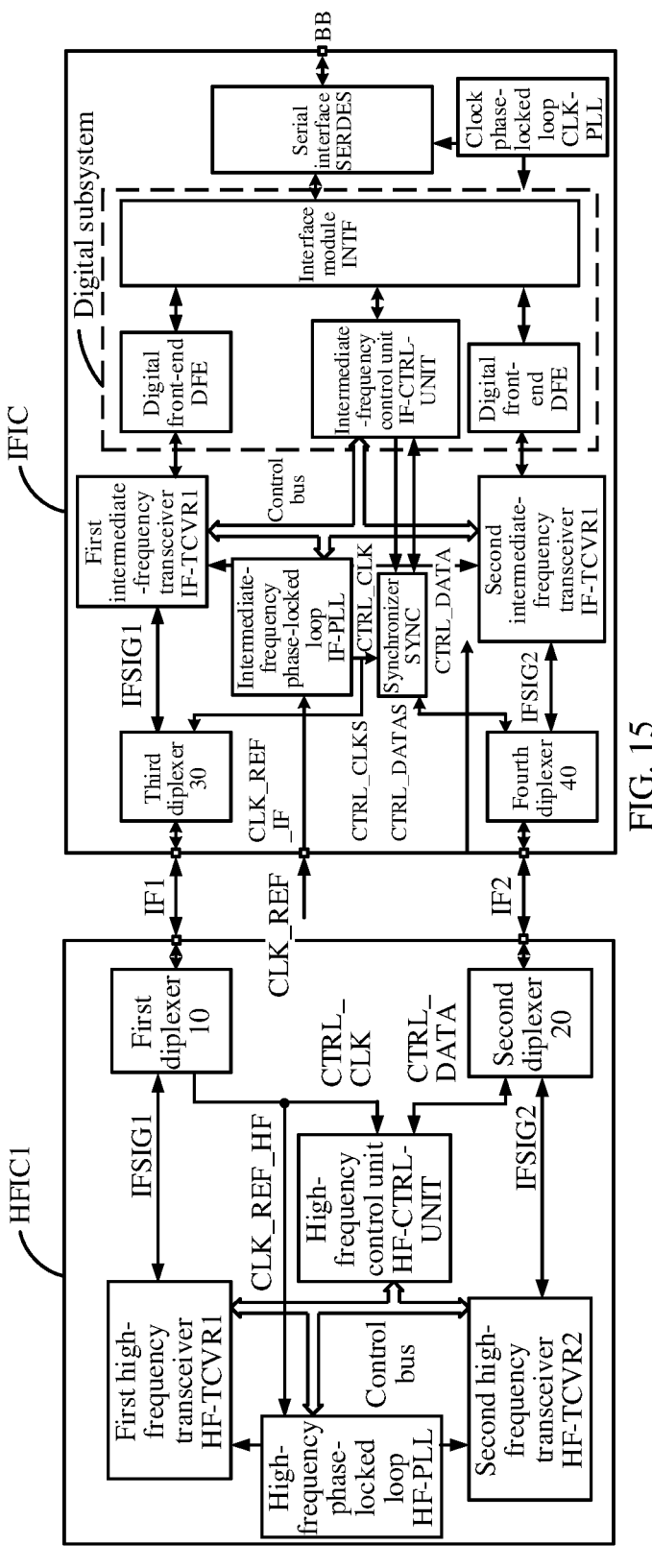
FIG. 15 is a schematic diagram of a structure of coupling a high-frequency integrated circuit and an intermediate-frequency integrated circuit according to still another embodiment of this application.

It is considered that the instruction data signal CTRL_DATA and the echo clock signal CTRL_CLK are inverted in a transmission process. To improve quality of the echo clock signal CTRL_CLK transmitted between the first high-frequency integrated circuit HFIC1 and the intermediate-frequency integrated circuit IFIC, in some examples, as shown in FIG. 15, the intermediate-frequency integrated circuit IFIC further includes a synchronizer SYNC. The synchronizer SYNC is configured to synchronize the instruction data signal CTRL_DATA and the echo clock signal CTRL_CLK. "Synchronization" means that the instruction data signal CTRL_DATA is sent out on the rising edge or falling edge of the echo clock signal CTRL_CLK. The synchronizer SYNC is coupled to the third diplexer 30, the fourth diplexer 40, and the intermediate-frequency control unit IF-CTRL-UNIT. The echo clock signal CTRL_CLK is transmitted between the high-frequency control unit HF-CTRL-UNIT and the intermediate-frequency control unit IF-CTRL-UNIT via the first diplexer 10, the third diplexer 30, and the synchronizer SYNC. The instruction data signal CTRL_DATA is transmitted between the high-frequency control unit HF-CTRL-UNIT and the intermediate-frequency control unit IF-CTRL-UNIT via the second diplexer 20, the fourth diplexer 40, and the synchronizer SYNC.

Herein, the echo clock signal CTRL_CLK and the instruction data signal CTRL_DATA may be transmitted by the intermediate-frequency control unit IF-CTRL-UNIT to the high-frequency control unit HF-CTRL-UNIT, or may be transmitted by the high-frequency control unit HF-CTRL-UNIT to the intermediate-frequency control unit IF-CTRL-UNIT. For example, the echo clock signal CTRL_CLK and the instruction data signal CTRL_DATA are transmitted by the intermediate-frequency control unit IF-CTRL-UNIT to the high-frequency control unit HF-CTRL-UNIT. After the intermediate-frequency control unit IF-CTRL-UNIT transmits the echo clock signal CTRL_CLK to the synchronizer SYNC, the synchronizer SYNC processes the signal CTRL_CLK and converts the signal CTRL_CLK into a new echo clock signal CTRL_CLKS, and then the new echo clock signal CTRL_CLKS is transmitted to the third diplexer 30. Compared with the quality of the echo clock signal CTRL_CLK, quality of the new echo clock signal CTRL_CLKS is greatly improved.

The following uses the first diplexer 10 as an example to describe structures of the first diplexer 10, the second diplexer 20, the third diplexer 30, and the fourth diplexer 40. For the structures of the second diplexer 20, the third diplexer 30, and the fourth diplexer 40, refer to the first diplexer 10. Details are not described in Embodiment 1 again.

It may be understood that the first diplexer 10 may include a functional module having two independent frequency selection characteristics. The functional module may be, for example, a filter. For example, the following provides two optional implementations of the first diplexer 10.

Figure 16:
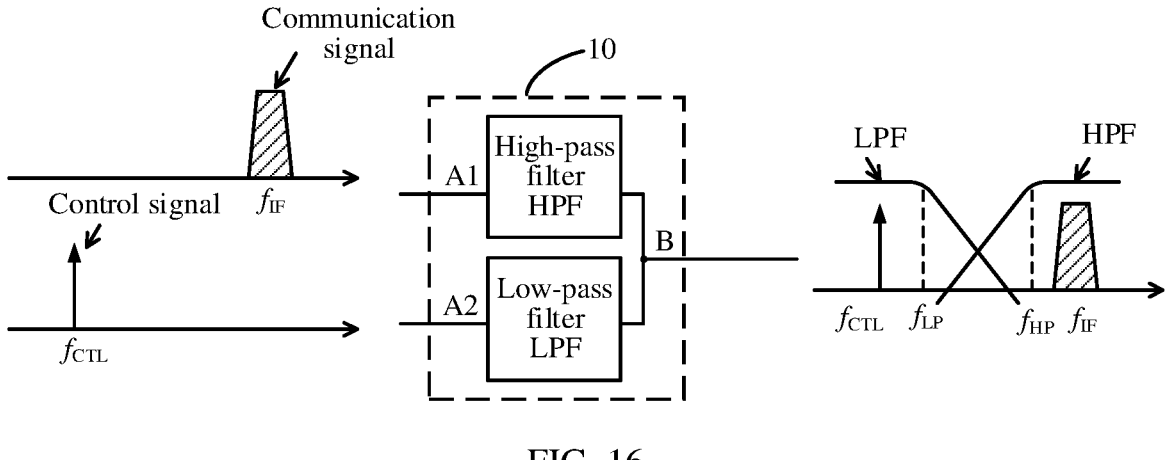
FIG. 16 is a schematic diagram of a structure of a first diplexer according to an embodiment of this application.

In a first optional implementation, as shown in FIG. 16, the first diplexer 10 includes a high-pass filter (HPF) and a low-pass filter (LPF). Both the high-pass filter HPF and the low-pass filter LPF are dual-port components. The high-pass filter HPF includes a first end A1 and a second end B, and the low-pass filter LPF includes a first end A2 and a second end B. In addition, both the high-pass filter HPF and the low-pass filter LPF are bidirectional components. The high-pass filter HPF is used as an example, a signal may flow from the first end A1 to the second end B, or may flow from the second end B to the first end A1. Regardless of whether the signal flows from the first end A1 to the second end B or from the second end B to the first end A1, the signal experiences a same signal processing characteristic in the high-pass filter HPF.

A function of the high-pass filter HPF is to suppress a signal whose frequency is lower than a high-pass angle frequency from passing, and enable a signal whose frequency is greater than the high-pass angle frequency to pass normally. In other words, the high-pass filter HPF allows a signal whose frequency is greater than a first frequency $f_{HP}$ to pass. Herein, the first frequency $f_{HP}$ may be set based on requirements. In some examples, a range of the first frequency $f_{HP}$ is 7 GHz to 15 GHz. A function of the low-pass filter LPF is to suppress a signal whose frequency is greater than a low-pass angle frequency from passing, and enable a signal whose frequency is less than the low-pass angle frequency to pass normally. In other words, the low-pass filter LPF allows a signal whose frequency is less than a second frequency $f_{LP}$ to pass. The first frequency $f_{HP}$ is greater than the second frequency $f_{LP}$. Herein, the second frequency $f_{LP}$ may be set based on requirements. In some examples, a range of the second frequency $f_{LP}$ is 100 MHz to 500 MHz. A frequency band of the communication signal may be 7 GHz to 15 GHz, and a frequency band of the control signal may be 100 MHz to 500 MHz. Therefore, from a spectrum perspective, an intermediate-frequency communication signal may pass through the high-pass filter HPF, but may be blocked by the low-pass filter LPF. A low-frequency control signal such as the instruction data signal CTRL_DATA and the echo clock signal CTRL_CLK may pass through the low-pass filter LPF, but may be blocked by the high-pass filter HPF.

The first end A1 of the high-pass filter HPF is coupled to the first high-frequency transceiver HF-TCVR1, the first end A2 of the low-pass filter LPF is coupled to the high-frequency control unit HF-CTRL-UNIT, and the first end A2 of the low-pass filter LPF may further be coupled to the high-frequency phase-locked loop HF-PLL. The second end B of the high-pass filter HPF and the second end B of the low-pass filter LPF are coupled, and both are coupled to the combination port of the third diplexer 30. The first end A1 of the high-pass filter HPF is configured to serve as the first distribution port of the first diplexer 10, and the first end A2 of the low-pass filter LPF is configured to serve as the second distribution port of the first diplexer 10. The second end B of the high-pass filter HPF and the second end B of the low-pass filter LPF are coupled for serving as the combination port of the first diplexer 10.

Refer to FIG. 16. In the first diplexer 10, the second end B of the high-pass filter HPF is coupled to the second end B of the low-pass filter LPF, and the first end A1 of the high-pass filter HPF is separated from the first end A2 of the low-pass filter LPF. At the second end B, two signals are fused on a same line, but the two signals are separated from each other from a frequency domain perspective. Due to frequency selection characteristics of the high-pass filter HPF and the low-pass filter LPF, only signals in respective passbands of the high-pass filter HPF and the low-pass filter LPF can be seen at the first end A1 and the first end A2. In other words, only the intermediate-frequency communication signal can be seen at the first end A1 of the high-pass filter HPF, and the control signal (where the control signal includes the instruction data signal CTRL_DATA and the echo clock signal CTRL_CLK) is blocked. Similarly, at the first end A2 of the low-pass filter LPF, only the control signal can be seen, and the intermediate-frequency communication signal is blocked.

Figure 17A:
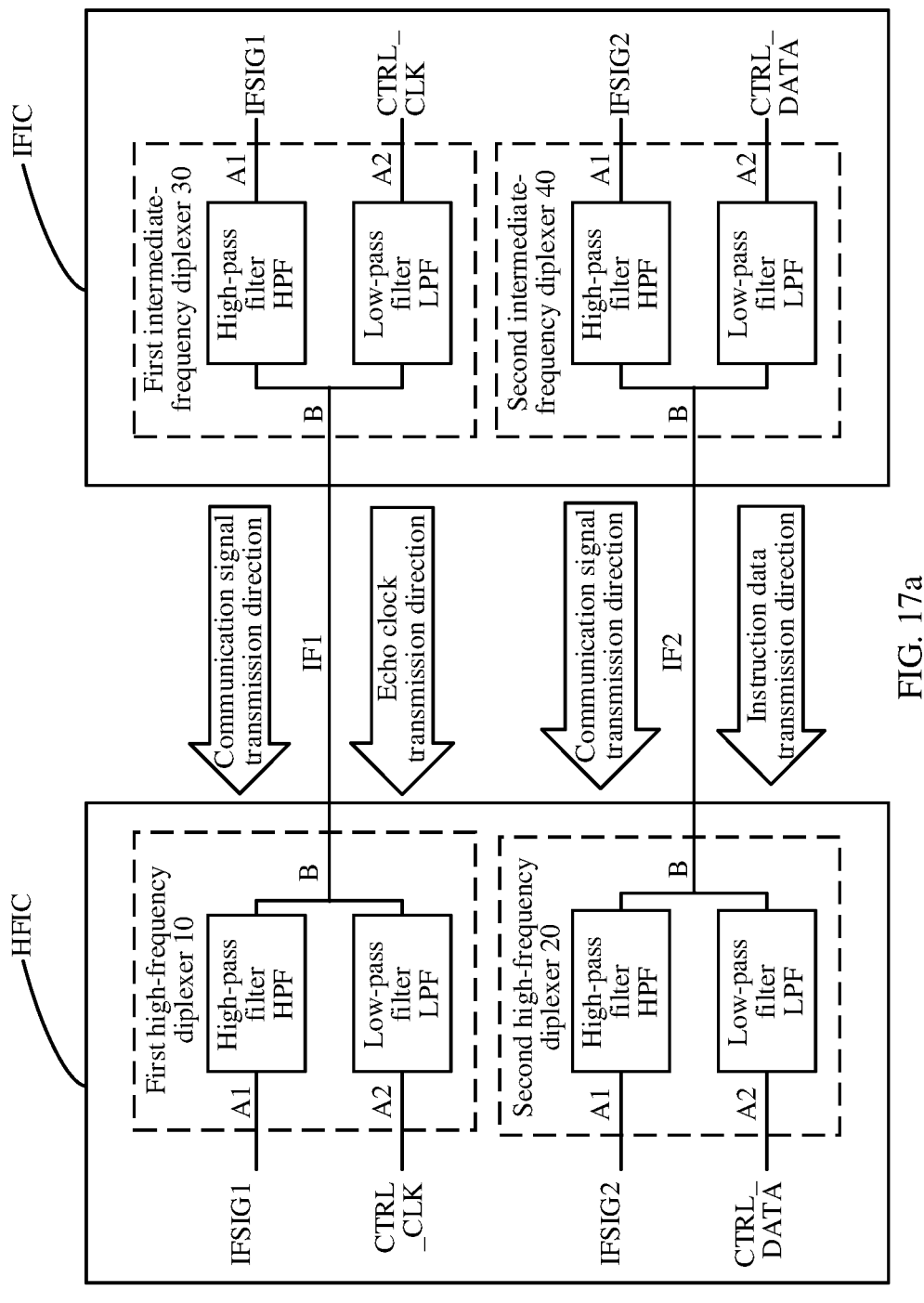
FIG. 17a is a schematic diagram of a structure of signal transmission between a high-frequency integrated circuit and an intermediate-frequency integrated circuit according to an embodiment of this application.
Figure 17B:
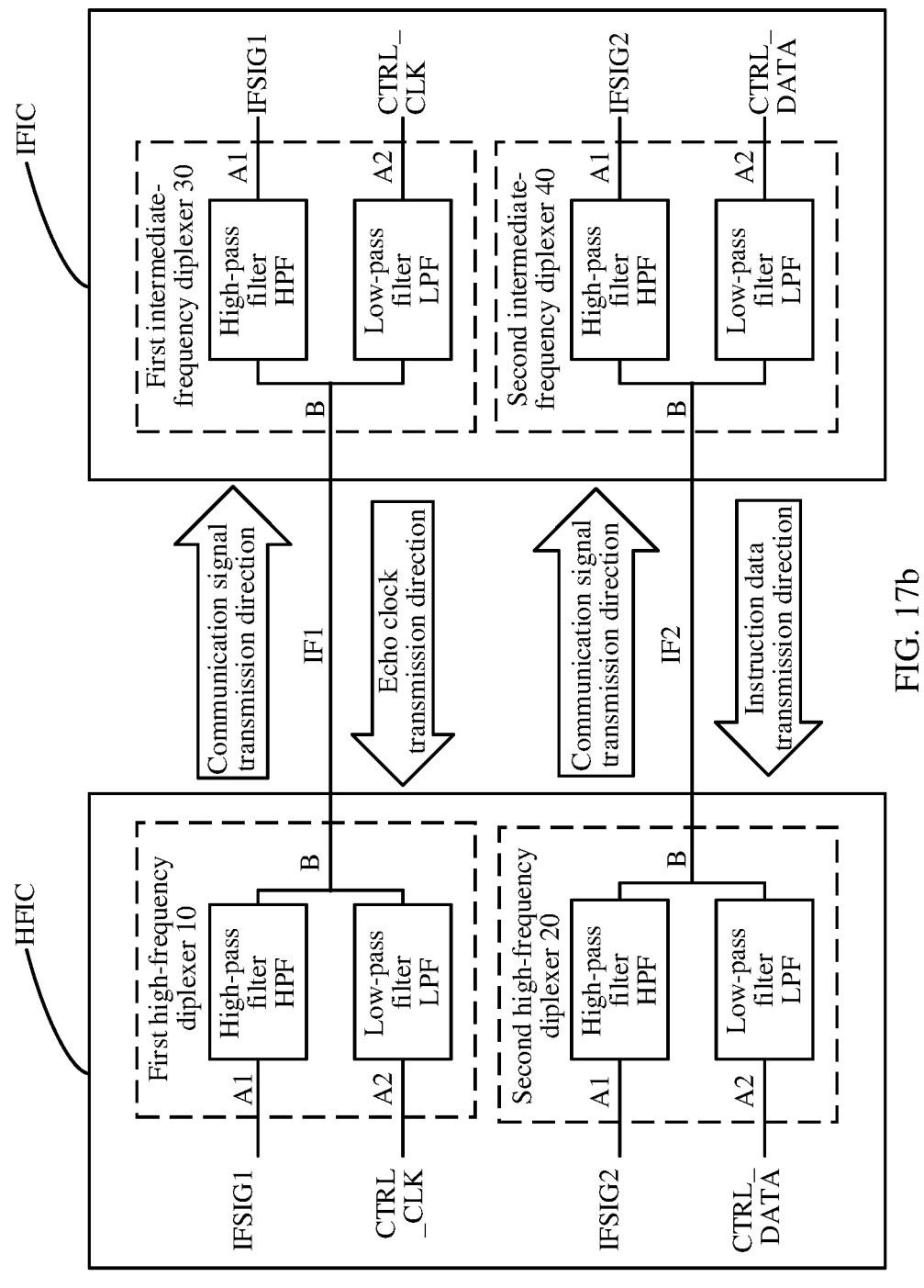
FIG. 17b is a schematic diagram of a structure of signal transmission between a high-frequency integrated circuit and an intermediate-frequency integrated circuit according to another embodiment of this application.

For example, the communication signal is sent from the intermediate-frequency integrated circuit IFIC to the first high-frequency integrated circuit HFIC1. In this case, when the wireless communication system 150 works in the transmitting mode, to be specific, when an entire communication link works in the transmitting mode, as shown in FIG. 17a, the communication signal and the control signal are multiplexed in the intermediate-frequency integrated circuit IFIC via the third diplexer 30 and the fourth diplexer 40. Then, in the first high-frequency integrated circuit HFIC1, the communication signal and the control signal are demultiplexed to different modules of the first high-frequency integrated circuit HFIC1 via the first diplexer 10 and the second diplexer 20. The diplexer is a bidirectional component, and can support signal transmission in different directions. Therefore, on the contrary, when the wireless communication system 150 works in the receiving mode, to be specific, when the entire communication link works in the receiving mode, as shown in FIG. 17b, the intermediate-frequency communication signal IFSIG1 output by the first high-frequency transceiver HF-TCVR1 is multiplexed to the hardware line IF1 via the first diplexer 10 of the first high-frequency integrated circuit HFIC1. In the intermediate-frequency integrated circuit IFIC, the signal on the hardware line IF1 is further split into an intermediate-frequency communication signal IFSIG1 via the third diplexer 30, and is sent to the first intermediate-frequency transceiver IF-TCVR1. In addition, the control signal, for example, the echo clock signal CTRL_CLK, generated by the intermediate-frequency control unit IF-CTRL-UNIT is still sent from the intermediate-frequency integrated circuit IFIC to the first high-frequency integrated circuit HFIC1.

The transmission direction is different from that of the intermediate-frequency communication signal IFSIG1. The second high-frequency transceiver HF-TCVR2 is similar to the first high-frequency transceiver HF-TCVR1. For details, refer to the first high-frequency transceiver HF-TCVR1. Details are not described herein again. In FIG. 17a, transmission directions of the communication signals IFSIG1 and IFSIG2 are the same as that of the instruction data signal CTRL_DATA. In FIG. 17b, transmission directions of the communication signals IFSIG1 and IFSIG2 are opposite to that of the instruction data signal CTRL_DATA.

In an actual high-frequency communication system, in the transmitting direction, the first intermediate-frequency transceiver IF-TCVR1 and the second intermediate-frequency transceiver IF-TCVR2 may generate harmonic distortion (HD). This may cause interference to out-of-band communication. It can be seen from the figure on the left side of FIG. 18 that, a frequency located at a position of an $n^{th}$ harmonic distortion component (HDn) may fall outside a communication frequency band, and spurious interference is formed. In this case, interference to another user or another communication system is caused.

Figure 18:
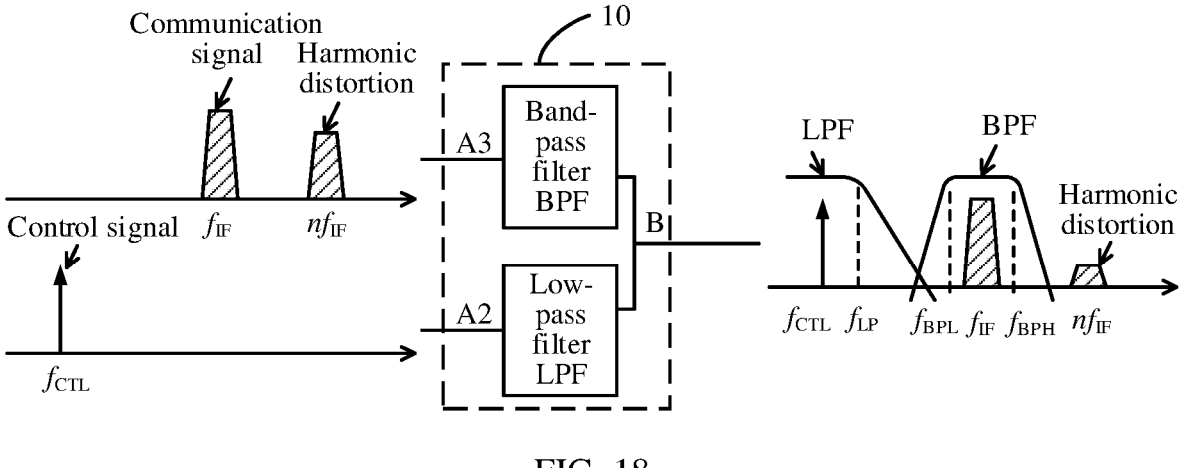
FIG. 18 is a schematic diagram of a structure of a first diplexer according to another embodiment of this applica-tion.

To resolve the problem, in a second optional implementation, as shown in FIG. 18, the first diplexer 10 includes a band-pass filter (BPF) and a low-pass filter LPF. For the low-pass filter LPF, refer to related descriptions in the first optional implementation. The band-pass filter BPF is similar to the high-pass filter HPF, and a difference lies in that the band-pass filter BPF can filter out harmonic distortion in addition to a control signal. In other words, the band-pass filter BPF allows a signal whose frequency is greater than a third frequency $f_{BPL}$ and less than a fourth frequency $f_{BPH}$ to pass. The third frequency $f_{BPL}$ and the fourth frequency $f_{BPH}$ are greater than the second frequency fir. To filter out harmonic distortion, when the band-pass filter BPF is designed, the fourth frequency $f_{BPH}$ should be less than a frequency of the harmonic distortion. In this case, the harmonic distortion is filtered out by the band-pass filter BPF. It may be understood that, in the band-pass filter BPF, the third frequency $f_{BPL}$ and the fourth frequency $f_{BPH}$ are determined by a center frequency of the band-pass filter BPF and a bandwidth of the band-pass filter BPF. For example, a range of the center frequency of the band-pass filter BPF may be 7 GHz to 15 GHZ, and a range of the bandwidth of the band-pass filter BPF may be 0.5 GHz to 5 GHz. If the center frequency of the band-pass filter BPF is 7 GHz to 15 GHz, and the bandwidth of the band-pass filter BPF is 0.5 GHZ, it may be obtained that the third frequency $f_{BPL}$ is 6.75 GHZ, and the fourth frequency $f_{BPH}$ is 7.25 GHz. Similarly, the band-pass filter BPF is also a dual-port component, including a first end A3 and a second end B. The band-pass filter BPF is also a bidirectional component, and a signal may flow from the first end A3 to the second end B, or may flow from the second end B to the first end A3.

The first end A3 of the band-pass filter BPF is coupled to the first high-frequency transceiver HF-TCVR1, a first end A2 of the low-pass filter LPF is coupled to the high-frequency control unit HF-CTRL-UNIT, and the first end A2 of the low-pass filter LPF may further be coupled to the high-frequency phase-locked loop HF-PLL. The second end B of the band-pass filter BPF and a second end B of the low-pass filter LPF are coupled, and both are further coupled to the combination port of the third diplexer 30. The first end A3 of the band-pass filter BPF is configured to serve as the first distribution port of the first diplexer 10, and the first end A2 of the low-pass filter LPF is configured to serve as the second distribution port of the first diplexer 10. The second end B of the band-pass filter BPF and the second end B of the low-pass filter LPF are coupled for serving as the combination port of the first diplexer 10.

In FIG. 18, an example in which a signal is transmitted from the first end A3 and the first end A2 to the second end B is used. It can be learned from FIG. 18 that, after a communication signal and harmonic distortion pass through the band-pass filter BPF, the harmonic distortion is completely or partially filtered out, so that interference of the harmonic distortion to the communication signal can be suppressed.

Embodiment 2

A difference between Embodiment 2 and Embodiment 1 lies in that, in Embodiment 1, the wireless communication system 150 includes one high-frequency integrated circuit HFIC, for example, the first high-frequency integrated circuit HFIC1. One high-frequency integrated circuit HFIC and one intermediate-frequency integrated circuit IFIC are interconnected, to support 5G NR high-frequency communication. In Embodiment 2, a wireless communication system 150 includes a plurality of high-frequency integrated circuits HFICs, for example, a first high-frequency integrated circuit HFIC1, a second high-frequency integrated circuit HFIC2, and a third high-frequency integrated circuit HFIC3. The plurality of high-frequency integrated circuits HFICs and one intermediate-frequency integrated circuit IFIC are interconnected, to support 5G NR high-frequency communication.

Figure 19:
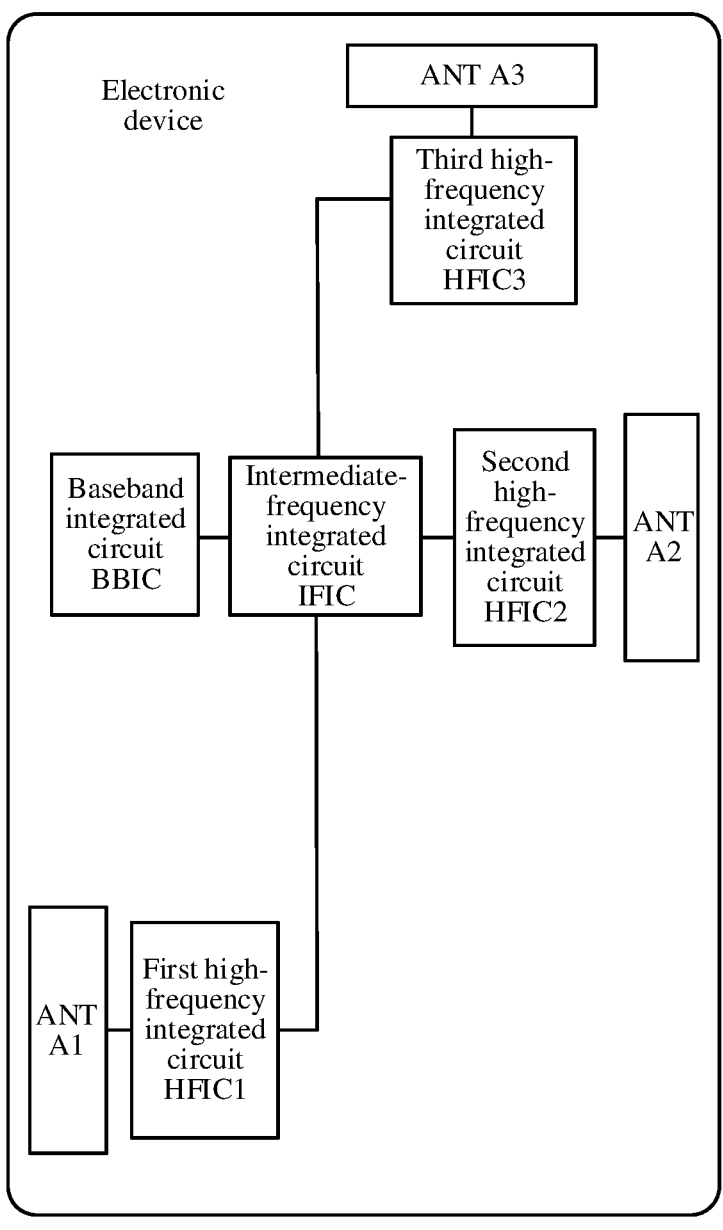
FIG. 19 is a schematic diagram of a structure of an electronic device according to another embodiment of this application.

For an actual electronic device, especially a handheld electronic device, for example, a mobile phone, a plurality of antenna arrays are usually designed on the electronic device, to ensure that in various postures, the electronic device always has one antenna array ANT-array that can establish effective communication within a field of view angle of a base station. As shown in FIG. 19, for example, three different antenna arrays ANT-array1 (ANT-A1), ANT-array2 (ANT-A2), and ANT-array3 (ANT-A3) are designed for the electronic device, and are located in different positions of the electronic device respectively. In this type of electronic device, three antenna arrays ANT-arrays do not work simultaneously. Therefore, a plurality of antenna arrays ANT-arrays may share one baseband integrated circuit BBIC and one intermediate-frequency integrated circuit IFIC. However, a high-frequency signal with a carrier frequency greater than 24 GHz needs to be transmitted between a high-frequency integrated circuit HFIC and an antenna array ANT-array, and this is not suitable for long-distance cabling. Therefore, in engineering practice, a high-frequency integrated circuit HFIC is generally tightly coupled to an antenna array ANT-array. To be specific, the three antenna arrays ANT-A1, ANT-A2, and ANT-A3 each need one corresponding high-frequency integrated circuit HFIC.

In Embodiment 2, for an application scenario of the electronic device provided above, as shown in FIG. 19, in Embodiment 2, one intermediate-frequency integrated circuit IFIC may work with a maximum of m (where m is greater than 1, and m is a positive integer) high-frequency integrated circuits HFICs. In this way, a maximum of m antenna arrays ANT-arrays can be integrated on the electronic device. In FIG. 19, an example in which one intermediate-frequency integrated circuit IFIC works with three high-frequency integrated circuits, namely, the first high-frequency integrated circuit HFIC1, the second high-frequency integrated circuit HFIC2, and the third high-frequency integrated circuit HFIC3 is used for illustration.

Figure 20A:
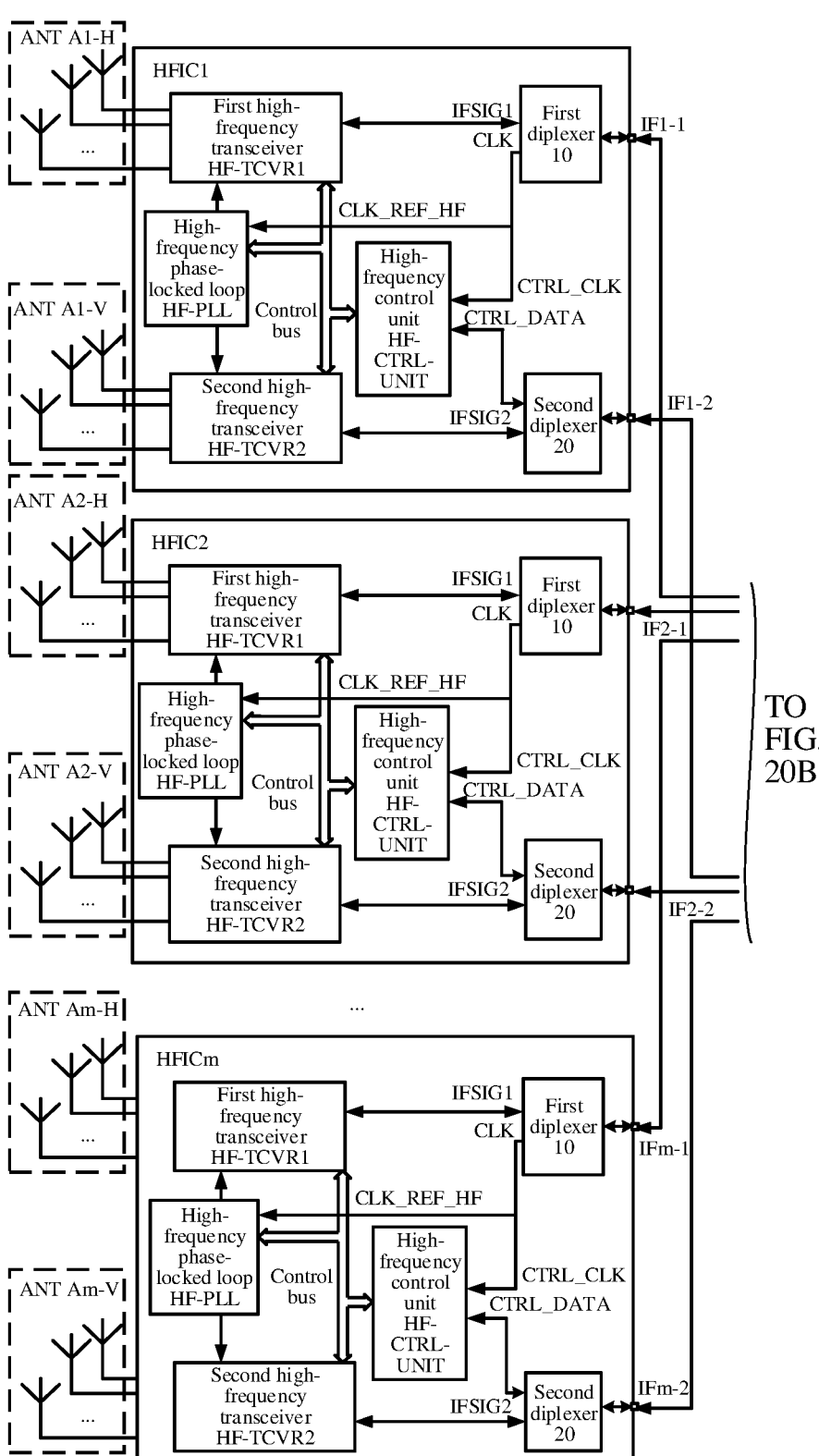
FIG. 20A and FIG. 20B are a schematic diagram of a structure of coupling an intermediate-frequency integrated circuit and a plurality of high-frequency integrated circuits according to an embodiment of this application.
Figure 20B:
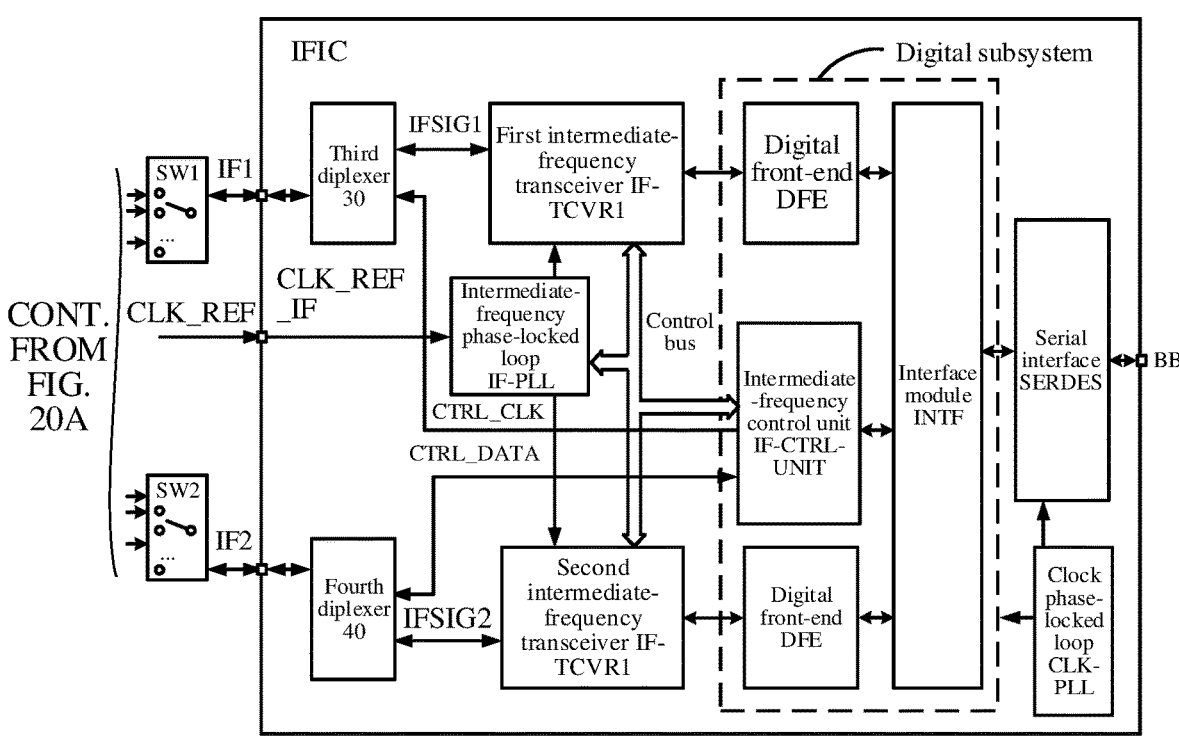

Based on the foregoing application scenario, the wireless communication system 150 provided in Embodiment 2 is based on the wireless communication system 150 provided in Embodiment 1. As shown in FIG. 20A and FIG. 20B, the wireless communication system 150 further includes the second high-frequency integrated circuit HFIC2, a first multi-way switch SW1, a second multi-way switch SW2, and an antenna array ANT-array coupled to the second high-frequency integrated circuit HFIC2. For parts that are the same in Embodiment 2 and Embodiment 1, for example, for the first high-frequency integrated circuit HFIC1, the intermediate-frequency integrated circuit IFIC, the baseband integrated circuit BBIC, and an antenna array ANT-array coupled to the first high-frequency integrated circuit HFIC1, refer to Embodiment 1. Details are not described in Embodiment 2. Only parts that are different from those in Embodiment 1 are described in Embodiment 2.

In Embodiment 2, a structure of the second high-frequency integrated circuit HFIC2 is the same as or similar to the structure of the first high-frequency integrated circuit HFIC1. The second high-frequency integrated circuit HFIC2 includes a first high-frequency transceiver HF-TCVR1, a second high-frequency transceiver HF-TCVR2, a high-frequency phase-locked loop HF-PLL, a high-frequency control unit HF-CTRL-UNIT, a first diplexer 10, and a second diplexer 20.

It should be noted that, for structures and connection relationships of the first high-frequency transceiver HF-TCVR1, the second high-frequency transceiver HF-TCVR2, the high-frequency phase-locked loop HF-PLL, the high-frequency control unit HF-CTRL-UNIT, the first diplexer 10 and the second diplexer 20 in the second high-frequency integrated circuit HFIC2, refer to related descriptions of the first high-frequency transceiver HF-TCVR1, the second high-frequency transceiver HF-TCVR2, the high-frequency phase-locked loop HF-PLL, the high-frequency control unit HF-CTRL-UNIT, the first diplexer 10, and the second diplexer 20 in the first high-frequency integrated circuit HFIC1 in Embodiment 1. Details are not described herein again. In addition, for a structure of the antenna array ANT-array coupled to the second high-frequency integrated circuit HFIC2, refer to related descriptions of the antenna array ANT-array coupled to the first high-frequency integrated circuit HFIC1 in Embodiment 1. Details are not described herein again.

Refer to FIG. 20A and FIG. 20B. A third diplexer 30 is separately coupled to a first diplexer 10 of the first high-frequency integrated circuit HFIC1 and the first diplexer 10 of the second high-frequency integrated circuit HFIC2 via the first multi-way switch SW1. The first multi-way switch SW1 is configured to control the third diplexer 30 to be conducted with the first diplexer 10 of the first high-frequency integrated circuit HFIC1 or the first diplexer 10 of the second high-frequency integrated circuit HFIC2.

A fourth diplexer 40 is separately coupled to a second diplexer 20 of the first high-frequency integrated circuit HFIC1 and the second diplexer 20 of the second high-frequency integrated circuit HFIC2 via the second multi-way switch SW2. The second multi-way switch SW2 is configured to control the fourth diplexer 40 to be conducted with the second diplexer 20 of the first high-frequency integrated circuit HFIC1 or the second diplexer 20 of the second high-frequency integrated circuit HFIC2.

Herein, the first multi-way switch SW1 and the second multi-way switch SW2 may be used as one component and integrated on the intermediate-frequency integrated circuit IFIC. Alternatively, the first multi-way switch SW1 and the second multi-way switch SW2 each may be disposed as one independent component.

The first multi-way switch SW1 and the second multi-way switch SW2 are configured to control the intermediate-frequency integrated circuit IFIC to be conductively connected to only one high-frequency integrated circuit HFIC at each specific moment via the first multi-way switch SW1 and the second multi-way switch SW2. A connection between the intermediate-frequency integrated circuit IFIC and another high-frequency integrated circuit HFIC is disconnected via the first multi-way switch SW1 and the second multi-way switch SW2. When the intermediate-frequency integrated circuit IFIC is connected to one high-frequency integrated circuit HFIC, a working manner of the intermediate-frequency integrated circuit IFIC is the same as the working manner described in Embodiment 1. For the working manner, refer to Embodiment 1. Details are not described herein again. For example, the intermediate-frequency integrated circuit IFIC is conducted with the first high-frequency integrated circuit HFIC1 via the first multi-way switch SW1 and the second multi-way switch SW2. The intermediate-frequency integrated circuit IFIC is disconnected from the second high-frequency integrated circuit HFIC2 via the first multi-way switch SW1 and the second multi-way switch SW2.

Based on the foregoing descriptions, in Embodiment 2, in addition to the first high-frequency integrated circuit HFIC1 and the second high-frequency integrated circuit HFIC2, the wireless communication system 150 may further include one or more other high-frequency integrated circuits HFICs. In FIG. 20A and FIG. 20B, an example in which the wireless communication system 150 includes m high-frequency integrated circuits HFICs is used for illustration. For structures and connection relationships of other high-frequency integrated circuits HFICs, for example, the third high-frequency integrated circuit HFIC3, . . . , and an $m^{th}$ high-frequency integrated circuit HFICm, refer to the second high-frequency integrated circuit HFIC2. Details are not described herein again. In FIG. 20A and FIG. 20B, the intermediate-frequency integrated circuit IFIC is separately split into a plurality of hardware lines (for example, IF1-1, IF1-2, IF2-1, IF2-2, . . . , IFm-1, IFm-2) via the first multi-way switch SW1 and the second multi-way switch SW2, and the hardware lines are connected to a plurality of high-frequency integrated circuits (for example, HFIC1, HFIC2, . . . , HFICm) respectively.

Embodiment 2 has same technical effects as Embodiment 1. For the technical effects, refer to Embodiment 1. Details are not described herein again. On this basis, in Embodiment 2, one intermediate-frequency integrated circuit IFIC works with the maximum of m high-frequency integrated circuits HFICs. In other words, the maximum of m antenna arrays can be integrated on the electronic device.

Embodiment 3

A difference between Embodiment 3 and Embodiment 1 lies in that, in Embodiment 1, the wireless communication system 150 includes one high-frequency integrated circuit HFIC, and in Embodiment 3, a wireless communication system 150 includes a plurality of high-frequency integrated circuits HFICs. A difference between Embodiment 3 and Embodiment 2 lies in that, in Embodiment 2, the plurality of high-frequency integrated circuits HFICs do not work simultaneously, and only one high-frequency integrated circuit HFIC works at each moment. In other words, at each moment, the intermediate-frequency integrated circuit IFIC communicates with only one HFIC. However, in Embodiment 3, a plurality of high-frequency integrated circuits HFICs work simultaneously. In other words, at each moment, an intermediate-frequency integrated circuit IFIC communicates with the plurality of high-frequency integrated circuits HFICs simultaneously.

In 5G NR high-frequency applications, a phased array technology is widely used. To be specific, an antenna array ANT-array is used to improve an antenna gain in a specific direction, that is, a beamforming technology. Theoretically, a larger scale of the antenna array ANT-array, in other words, a larger quantity of antenna elements ANTs, indicates better beamforming performance. However, in this case, a high-frequency integrated circuit HFIC coupled to an antenna element ANT is limited by costs, power consumption, and implementation complexity, and a quantity of high-frequency channels that can be provided on one high-frequency integrated circuit HFIC is limited. Therefore, when a wireless communication system needs a large-scale antenna array ANT-array, it is usually impossible to support the antenna array ANT-array via one high-frequency integrated circuit HFIC.

Figure 21:
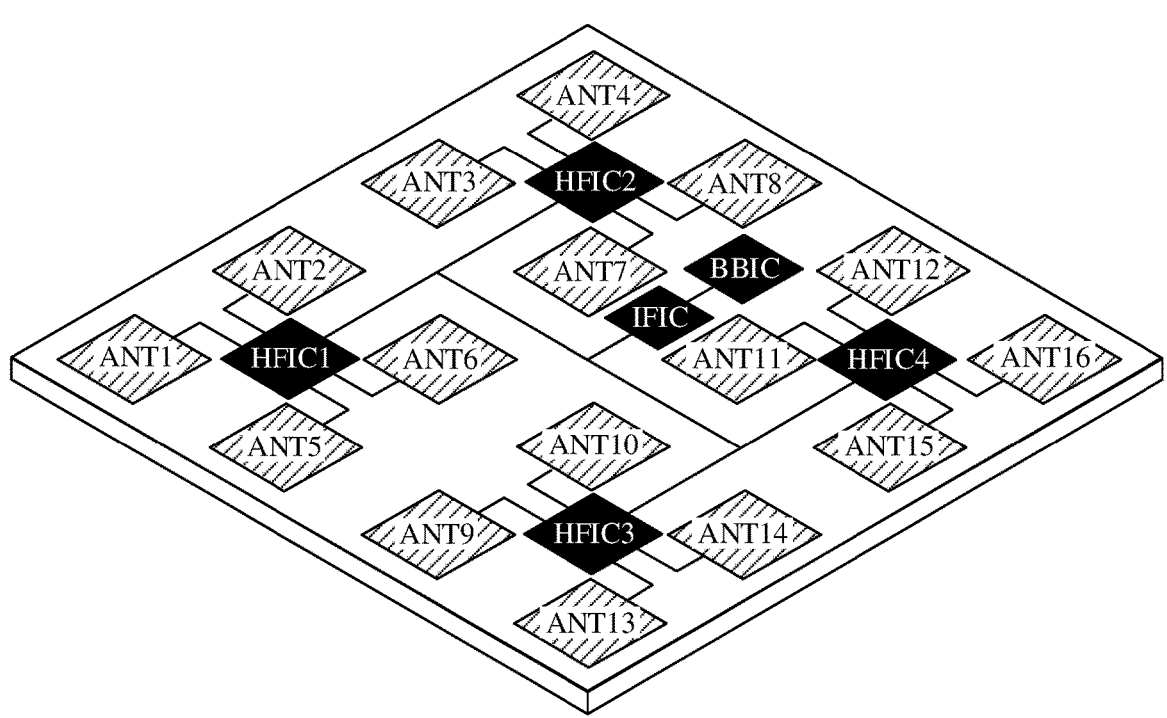
FIG. 21 is a schematic diagram of a structure of coupling a high-frequency integrated circuit and a plurality of antenna arrays according to an embodiment of this application.

To resolve a conflict between a requirement of the wireless communication system and a capability of the high-frequency integrated circuit HFIC, a method of splicing a plurality of high-frequency integrated circuits HFIC may be used to implement extension of an antenna array ANT-array. As shown in FIG. 21, each high-frequency integrated circuit HFIC is connected to four antenna arrays ANT-As, to form one 2×2 scale antenna array ANT. Each antenna array ANT includes a horizontally polarized antenna array ANT A-H and a vertically polarized antenna array ANT A-V. When the wireless communication system 150 includes four high-frequency integrated circuits HFICs, four same 2×2 scale antenna arrays ANT-As may form one 4×4 scale antenna array. In the extended array, the four high-frequency integrated circuits HFICs work simultaneously, and the intermediate-frequency integrated circuit IFIC needs to communicate with the four high-frequency integrated circuits HFICs simultaneously.

Figure 22A:
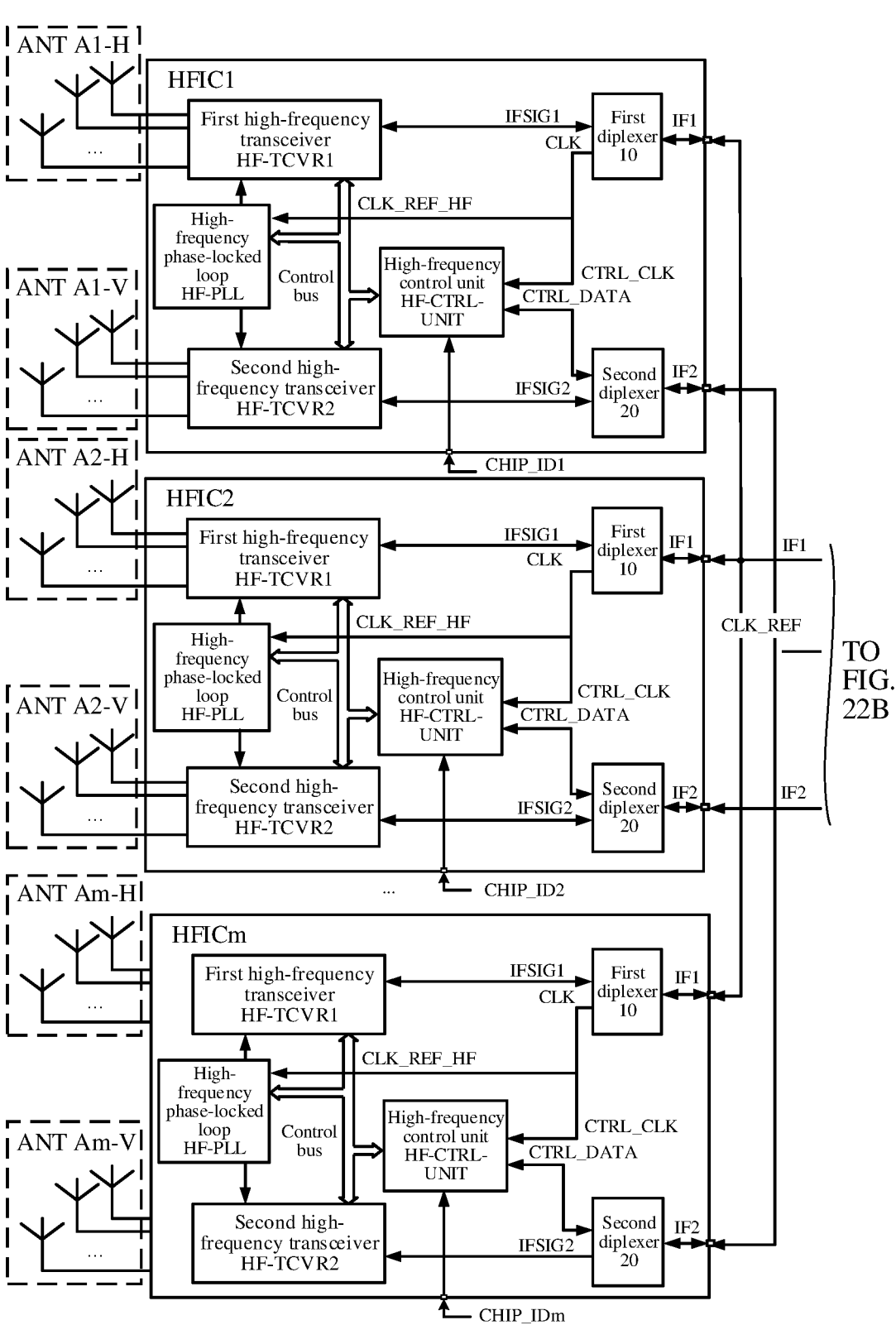
FIG. 22A and FIG. 22B are a schematic diagram of another structure of coupling an intermediate-frequency integrated circuit and a plurality of high-frequency integrated circuits according to an embodiment of this application.
Figure 22B:
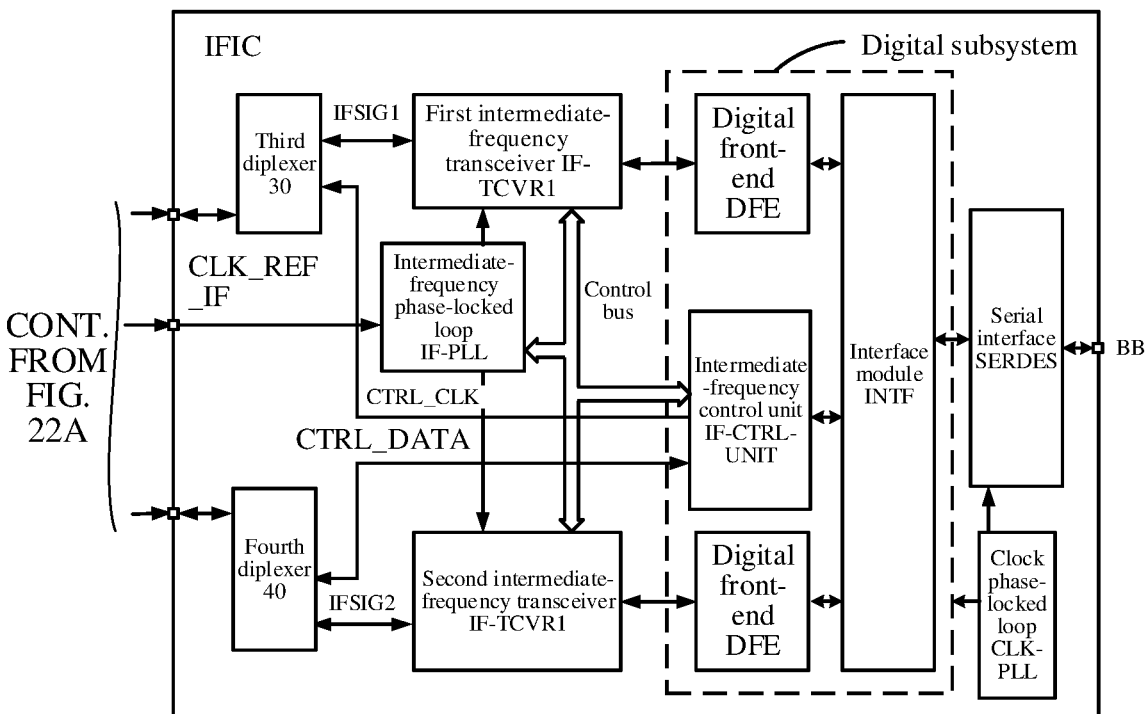

Based on the foregoing application scenario, the wireless communication system 150 provided in Embodiment 3 is based on the wireless communication system 150 provided in Embodiment 1. As shown in FIG. 22A and FIG. 22B, the wireless communication system 150 further includes a second high-frequency integrated circuit HFIC2 and an antenna array ANT-array coupled to the second high-frequency integrated circuit HFIC2. For parts that are the same in Embodiment 3 and Embodiment 1, for example, for a first high-frequency integrated circuit HFIC1, the intermediate-frequency integrated circuit IFIC, the baseband integrated circuit BBIC, and an antenna array ANT-array coupled to the first high-frequency integrated circuit HFIC1, refer to Embodiment 1. Details are not described in Embodiment 3. Only parts that are different from those in Embodiment 1 are described in Embodiment 3.

In Embodiment 3, a structure of the second high-frequency integrated circuit HFIC2 is the same as or similar to the structure of the first high-frequency integrated circuit HFIC2. The second high-frequency integrated circuit HFIC2 includes a first high-frequency transceiver HF-TCVR1, a second high-frequency transceiver HF-TCVR2, a high-frequency phase-locked loop HF-PLL, a high-frequency control unit HF-CTRL-UNIT, a first diplexer 10, and a second diplexer 20.

It should be noted that, for structures and connection relationships of the first high-frequency transceiver HF-TCVR1, the second high-frequency transceiver HF-TCVR2, the high-frequency phase-locked loop HF-PLL, the high-frequency control unit HF-CTRL-UNIT, the first diplexer 10 and the second diplexer 20 in the second high-frequency integrated circuit HFIC2, refer to related descriptions of the first high-frequency transceiver HF-TCVR1, the second high-frequency transceiver HF-TCVR2, the high-frequency phase-locked loop HF-PLL, the high-frequency control unit HF-CTRL-UNIT, the first diplexer 10, and the second diplexer 20 in the first high-frequency integrated circuit HFIC1 in Embodiment 1. Details are not described herein again. In addition, for a structure of the antenna array ANT-array coupled to the second high-frequency integrated circuit HFIC2, refer to related descriptions in Embodiment 1. Details are not described herein again.

Refer to FIG. 22A and FIG. 22B. A third diplexer 30 is separately coupled to a first diplexer 10 of the first high-frequency integrated circuit HFIC1 and the first diplexer 10 of the second high-frequency integrated circuit HFIC2, and a fourth diplexer 40 is separately coupled to a second diplexer 20 of the first high-frequency integrated circuit HFIC1 and the second diplexer 20 of the second high-frequency integrated circuit HFIC2.

In Embodiment 3, if the third diplexer 30 is coupled to m first diplexers 10 simultaneously, and the fourth diplexer 40 is coupled to m second diplexers 20 simultaneously, and each first high-frequency transceiver HF-TCVR1 and each second high-frequency transceiver HF-TCVR2 are coupled to n antenna elements ANTs, an m×n scale antenna array ANT-array may be implemented in each polarization direction. For a communication signal IFSIG, in a transmitting mode, after a signal output by the intermediate-frequency integrated circuit IFIC is split into m signals, the m signals are simultaneously sent to m high-frequency integrated circuits HFICs via the m first diplexers 10 and the m second diplexers 20. The m signals are processed in the high-frequency integrated circuit HFIC, and processed m signals are sent to an antenna array ANT-array. In a receiving mode, signals received by m high-frequency integrated circuits HFICs are combined via the third diplexer 30 and the fourth diplexer 40, and combined signals are sent to one intermediate-frequency integrated circuit IFIC.

In Embodiment 3, the communication signal IFSIG and a control signal are multiplexed to a same hardware line. FIG. 22A and FIG. 22B are used as an example, the control signal is sent from the intermediate-frequency integrated circuit IFIC to the m high-frequency integrated circuits HFICs simultaneously. Instruction data signals CTRL_DATA in the control signal needed by the high-frequency integrated circuits HFICs may be different. Therefore, instruction data signals CTRL_DATA in the control signal simultaneously sent to the m high-frequency integrated circuits HFICs need to be distinguished. In some examples, the high-frequency integrated circuits HFICs may be distinguished by using different chip numbers CHIP_IDs. The chip number CHIP_ID may be implemented, for example, by using a hardware pin. Specifically, as shown in FIG. 22A and FIG. 22B, both the first high-frequency integrated circuit HFIC1 and the second high-frequency integrated circuit HFIC2 include at least one addressing pin. During hardware design, the addressing pin is configured to receive a high electrical level or a low electrical level, to distinguish between a chip number CHIP_ID of the first high-frequency integrated circuit HFIC1 and a chip number CHIP_ID of the second high-frequency integrated circuit HFIC2. It is assumed that an addressing pin of a high-frequency integrated circuit has k bits, and in this case, chip numbers CHIP_IDs of 2k different high-frequency integrated circuits can be distinguished.

When a specific control signal is generated in the intermediate-frequency integrated circuit IFIC, a chip number CHIP_ID of a target high-frequency integrated circuit corresponding to the control signal is embedded into an instruction data signal CTRL_DATA. When the control signal is simultaneously sent to the m high-frequency integrated circuits HFICs, a high-frequency controller of the high-frequency integrated circuit HFIC parses an instruction data signal CTRL_DATA, and extracts carried target chip number CHIP_ID information from the instruction data signal CTRL_DATA. When an extracted target chip number CHIP_ID is consistent with a chip number CHIP_ID code of the current chip, it is considered that the instruction data signal is sent to the current high-frequency integrated circuit HFIC. When an extracted target chip number CHIP_ID is not consistent with a chip number CHIP_ID code of the current chip, it may be considered that the instruction data signal is sent to another high-frequency integrated circuit HFIC, and the current high-frequency integrated circuit HFIC may ignore the instruction data signal.

For example, the wireless communication system 150 includes a first high-frequency integrated circuit HFIC1, a second high-frequency integrated circuit HFIC2, and a third high-frequency integrated circuit HFIC3. The three high-frequency integrated circuits each include a first addressing pin and a second addressing pin. During hardware design, both the first addressing pin and the second addressing pin of the first high-frequency integrated circuit HFIC1 may be pulled to a high potential "1", both the first addressing pin and the second addressing pin of the second high-frequency integrated circuit HFIC2 may be pulled to a low potential "o", the first addressing pin of the third high-frequency integrated circuit HFIC3 may be pulled to the high potential "1", and the second addressing pin of the third high-frequency integrated circuit HFIC3 may be pulled to the low potential "o", so that different chip numbers CHIP_IDs may be implemented for the first high-frequency integrated circuit HFIC1, the second high-frequency integrated circuit HFIC2, and the third high-frequency integrated circuit HFIC3. When the instruction data signal CTRL_DATA in the control signal is sent from the intermediate-frequency integrated circuit IFIC to the first high-frequency integrated circuit HFIC1, the second high-frequency integrated circuit HFIC2, and the third high-frequency integrated circuit HFIC3, target chip number CHIP_ID information carried in the instruction data signal CTRL_DATA is compared with chip numbers CHIP_IDs of the first high-frequency integrated circuit HFIC1, the second high-frequency integrated circuit HFIC2, and the third high-frequency integrated circuit HFIC3. If the target chip number CHIP_ID information is consistent with the chip numbers CHIP_IDs of the first high-frequency integrated circuit HFIC1, the second high-frequency integrated circuit HFIC2, and the third high-frequency integrated circuit HFIC3, the instruction data signal CTRL_DATA is sent to the high-frequency integrated circuit HFICs. For example, if the target chip number CHIP_ID information carried in the instruction data signal CTRL_DATA is "11", the instruction data signal CTRL_DATA is sent to the first high-frequency integrated circuit HFIC1.

Based on the foregoing descriptions, in Embodiment 3, in addition to the first high-frequency integrated circuit HFIC1 and the second high-frequency integrated circuit HFIC2, the wireless communication system 150 may further include one or more other high-frequency integrated circuits HFICs. In FIG. 22A and FIG. 22B, an example in which the wireless communication system 150 includes m high-frequency integrated circuits HFICs is used for illustration. For structures and connection relationships of other high-frequency integrated circuits HFICs, for example, the third high-frequency integrated circuit HFIC3, . . . , and an m$^{th}$ high-frequency integrated circuit HFICm, refer to the second high-frequency integrated circuit HFIC2. Details are not described herein again.

Embodiment 3 has same technical effects as Embodiment 1. For the technical effects, refer to Embodiment 1. Details are not described herein again. On this basis, the large-scale antenna array may be implemented in Embodiment 3.

Embodiment 4

An embodiment of this application further provides a wireless communication system 150. The wireless communication system 150 includes a first high-frequency integrated circuit HFIC1, an intermediate-frequency integrated circuit IFIC, and an antenna array ANT-array. The first high-frequency integrated circuit HFIC1 is coupled between the antenna array ANT-array and the intermediate-frequency integrated circuit IFIC. The wireless communication system 150 further includes a baseband integrated circuit BBIC. The intermediate-frequency integrated circuit IFIC is coupled between the first high-frequency integrated circuit HFIC1 and the baseband integrated circuit BBIC.

For the baseband integrated circuit BBIC and the antenna array ANT-array, refer to the related descriptions. Details are not described in Embodiment 4.

Figure 23:
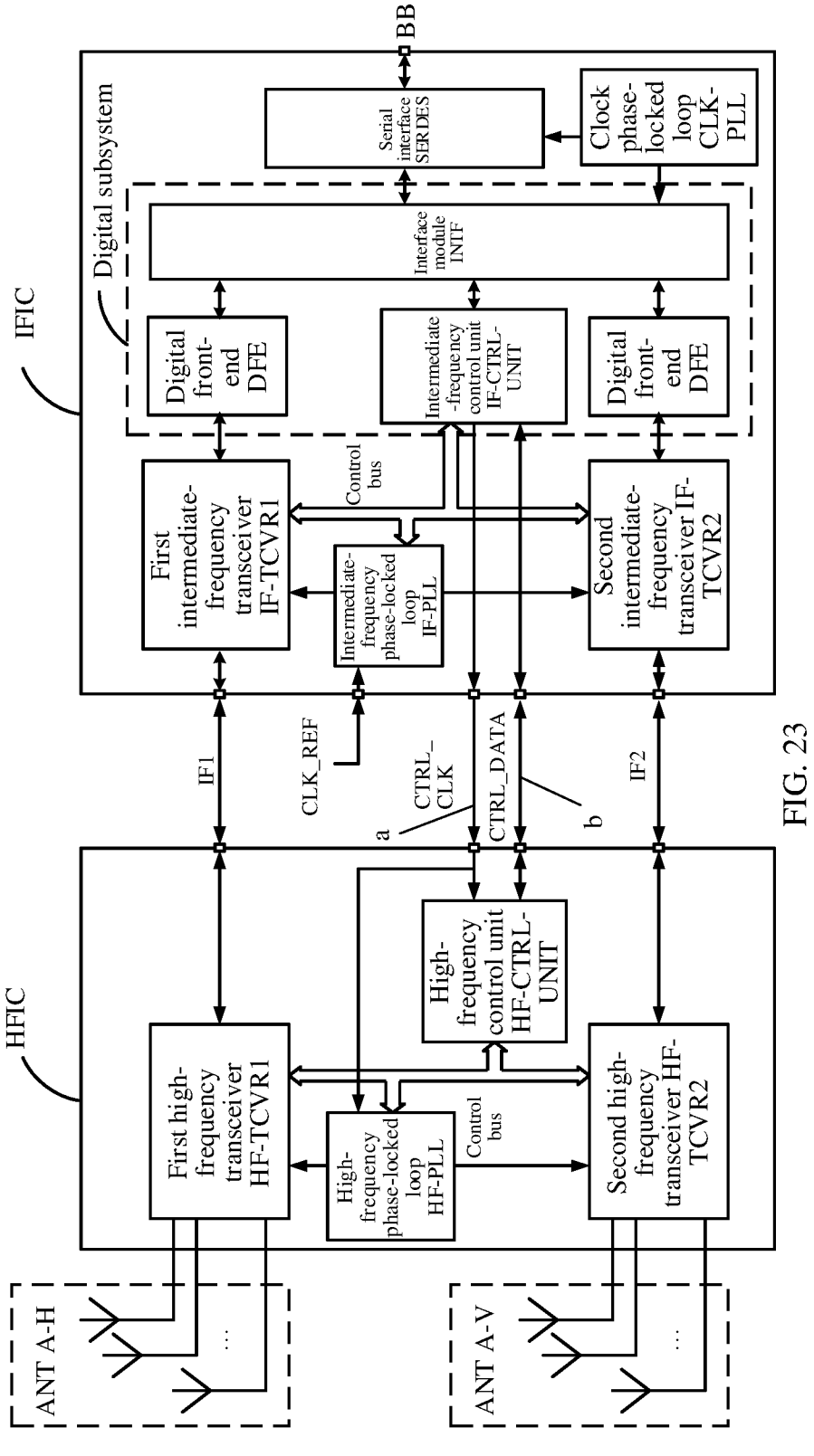
FIG. 23 is a schematic diagram of a structure of signal transmission between a high-frequency integrated circuit and an intermediate-frequency integrated circuit according to another embodiment of this application.

As shown in FIG. 23, in Embodiment 4, the first high-frequency integrated circuit HFIC1 includes a first high-frequency transceiver HF-TCVR1, a second high-frequency transceiver HF-TCVR2, a high-frequency phase-locked loop HF-PLL, and a high-frequency control unit HF-CTRL-UNIT. The high-frequency phase-locked loop HF-PLL is separately coupled to the first high-frequency transceiver HF-TCVR1 and the second high-frequency transceiver HF-TCVR2. The intermediate-frequency integrated circuit IFIC includes a first intermediate-frequency transceiver IF-TCVR1, a second intermediate-frequency transceiver IF-TCVR2, an intermediate-frequency phase-locked loop IF-PLL, and an intermediate-frequency control unit IF-CTRL-UNIT. The intermediate-frequency phase-locked loop IF-PLL is separately coupled to the first intermediate-frequency transceiver IF-TCVR1 and the second intermediate-frequency transceiver IF-TCVR2. A control signal is transmitted between the high-frequency control unit HF-CTRL-UNIT and the intermediate-frequency control unit IF-CTRL-UNIT. The control signal includes an instruction data signal CTRL_DATA and an echo clock signal CTRL_CLK. The instruction data signal CTRL_DATA is transmitted between the high-frequency control unit HF-CTRL-UNIT and the intermediate-frequency control unit IF-CTRL-UNIT through a first hardware line a, and the echo clock signal CTRL_CLK is transmitted through a second hardware line b. The intermediate-frequency control unit IF-CTRL-UNIT further transmits the echo clock signal CTRL_CLK to the high-frequency phase-locked loop HF-PLL through the second hardware line b, to provide a first reference clock signal CLK_REF_HF for the high-frequency phase-locked loop HF-PLL.

For the first high-frequency transceiver HF-TCVR1, the second high-frequency transceiver HF-TCVR2, the high-frequency phase-locked loop HF-PLL, the high-frequency control unit HF-CTRL-UNIT, the first intermediate-frequency transceiver IF-TCVR1, the second intermediate-frequency transceiver IF-TCVR2, the intermediate-frequency phase-locked loop IF-PLL, and the intermediate-frequency control unit IF-CTRL-UNIT, refer to the foregoing descriptions. Details are not described herein again.

In Embodiment 4, the intermediate-frequency control unit IF-CTRL-UNIT further transmits the echo clock signal CTRL_CLK to the high-frequency phase-locked loop HF-PLL through the second hardware line b, to provide the first reference clock signal CLK_REF_HF for the high-frequency phase-locked loop HF-PLL. Therefore, no separate hardware line is needed to provide the first reference clock signal CLK_REF_HF for the high-frequency phase-locked loop HF-PLL. In comparison with that the first reference clock signal CLK_REF_HF is transmitted through one separate hardware line, one hardware line may be reduced in the wireless communication system 150 provided in Embodiment 4.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A system, comprising:
   a first high-frequency integrated circuit;
   an intermediate-frequency integrated circuit; and
   an antenna array;
   wherein the first high-frequency integrated circuit is coupled between the antenna array and the intermediate-frequency integrated circuit;
   wherein the first high-frequency integrated circuit comprises:
      a first high-frequency transceiver, a second high-frequency transceiver, a high-frequency phase-locked loop, a high-frequency controller, a first diplexer, and a second diplexer, wherein the first high-frequency transceiver is coupled to the first diplexer, the second high-frequency transceiver is coupled to the second diplexer, the high-frequency phase-locked loop is separately coupled to the first high-frequency transceiver and the second high-frequency transceiver, and the high-frequency controller is separately coupled to the first diplexer and the second diplexer;
   wherein the intermediate-frequency integrated circuit comprises:
      a first intermediate-frequency transceiver, a second intermediate-frequency transceiver, an intermediate-frequency phase-locked loop, an intermediate-frequency controller, a third diplexer, and a fourth diplexer, wherein the first intermediate-frequency transceiver is coupled to the third diplexer, the second intermediate-frequency transceiver is coupled to the fourth diplexer, the intermediate-frequency phase-locked loop is separately coupled to the first intermediate-frequency transceiver and the second intermediate-frequency transceiver, and the intermediate-frequency controller is separately coupled to the third diplexer and the fourth diplexer; and wherein the first diplexer is coupled to the third diplexer, and the second diplexer is coupled to the fourth diplexer; and wherein a control signal is transmitted between the high-frequency controller and the intermediate-frequency controller, wherein the control signal comprises an instruction data signal and an echo clock signal, a phase of the instruction data signal is synchronized with a phase of the echo clock signal, and a frequency of the instruction data signal and a frequency of the echo clock signal are in a co-frequency relationship or a frequency multiplication relationship; and wherein the echo clock signal is transmitted between the high-frequency controller and the intermediate-frequency controller via the first diplexer and the third diplexer, and the instruction data signal is transmitted between the high-frequency controller and the intermediate-frequency controller via the second diplexer and the fourth diplexer.

2. The system according to claim 1, wherein the instruction data signal is sent out on a rising edge or a falling edge of the echo clock signal.

3. The system according to claim 1, wherein the intermediate-frequency controller transmits the echo clock signal to the high-frequency controller via the third diplexer and the first diplexer.

4. The system according to claim 3, wherein the first diplexer is further coupled to the high-frequency phase-locked loop; and wherein the intermediate-frequency controller further transmits the echo clock signal to the high-frequency phase-locked loop via the third diplexer and the first diplexer, to provide a first reference clock signal for the high-frequency phase-locked loop.

5. The system according to claim 1, wherein the intermediate-frequency integrated circuit further comprises an intermediate-frequency pin, and the intermediate-frequency pin is configured to receive a second reference clock signal.

6. The system according to claim 5, wherein the intermediate-frequency pin is coupled to the intermediate-frequency phase-locked loop, and the second reference clock signal received by the intermediate-frequency pin provides the second reference clock signal for the intermediate-frequency phase-locked loop.

7. The system according to claim 5, wherein the echo clock signal transmitted by the intermediate-frequency controller is generated based on the second reference clock signal received by the intermediate-frequency pin.

8. The system according to claim 1, wherein the intermediate-frequency integrated circuit further comprises a synchronizer, configured to synchronize the instruction data signal and the echo clock signal;

wherein the synchronizer is coupled to the third diplexer, the fourth diplexer, and the intermediate-frequency controller, and the echo clock signal is transmitted between the high-frequency controller and the intermediate-frequency controller via the first diplexer, the third diplexer, and the synchronizer; and wherein the instruction data signal is transmitted between the high-frequency controller and the intermediate-frequency controller via the second diplexer, the fourth diplexer, and the synchronizer.

9. The system according to claim 1, further comprising:

a second high-frequency integrated circuit, comprising: a third high-frequency transceiver, a fourth high-frequency transceiver, a second high-frequency phase-locked loop, a second high-frequency controller, a fifth diplexer, and a sixth diplexer; and wherein the sixth diplexer is separately coupled to the first diplexer of the first high-frequency integrated circuit and the fifth diplexer of the second high-frequency integrated circuit, and the fourth diplexer is separately coupled to the second diplexer of the first high-frequency integrated circuit and the sixth diplexer of the second high-frequency integrated circuit.

10. The system according to claim 9, wherein both the first high-frequency integrated circuit and the second high-frequency integrated circuit comprise at least one addressing pin, and each addressing pin is configured to receive a high electrical level or a low electrical level, to distinguish between a chip code of the first high-frequency integrated circuit and a chip code of the second high-frequency integrated circuit.

11. The system according to claim 1, further comprising:

a second high-frequency integrated circuit, a first multi-way switch, and a second multi-way switch; and wherein the second high-frequency integrated circuit comprises: a third high-frequency transceiver, a fourth high-frequency transceiver, a second high-frequency phase-locked loop, a second high-frequency controller, a fifth diplexer, and a sixth diplexer;

wherein the third diplexer is separately coupled to the first diplexer of the first high-frequency integrated circuit and the fifth diplexer of the second high-frequency integrated circuit via the first multi-way switch, and the first multi-way switch is configured to control the third diplexer to be conducted with the first diplexer of the first high-frequency integrated circuit or the fifth diplexer of the second high-frequency integrated circuit; and wherein the fourth diplexer is separately coupled to the second diplexer of the first high-frequency integrated circuit and the sixth diplexer of the second high-frequency integrated circuit via the second multi-way switch, and the second multi-way switch is configured to control the fourth diplexer to be conducted with the second diplexer of the first high-frequency integrated circuit or the sixth diplexer of the second high-frequency integrated circuit.

12. The system according to claim 1, wherein the first diplexer comprises a high-pass filter and a low-pass filter, and both the high-pass filter and the low-pass filter comprise a respective first end and a respective second end;

wherein the first end of the high-pass filter is coupled to the first high-frequency transceiver, and the first end of the low-pass filter is coupled to the high-frequency controller;

wherein both the second end of the high-pass filter and the second end of the low-pass filter are coupled to a combination port of the third diplexer; and wherein the high-pass filter allows a signal whose frequency is greater than a first frequency to pass, the low-pass filter allows a signal whose frequency is less than a second frequency to pass, and the first frequency is greater than the second frequency.

13. The system according to claim 1, wherein the first diplexer comprises a band-pass filter and a low-pass filter, and both the band-pass filter and the low-pass filter comprise a respective first end and a respective second end;

wherein the first end of the band-pass filter is coupled to the first high-frequency transceiver, and the first end of the low-pass filter is coupled to the high-frequency controller;

wherein both the second end of the band-pass filter and the second end of the low-pass filter are coupled to a combination port of the third diplexer; and wherein the band-pass filter allows a signal whose frequency is greater than a third frequency and less than a fourth frequency to pass, the low-pass filter allows a signal whose frequency is less than a second frequency to pass, and the third frequency and the fourth frequency are greater than the second frequency.

14. The system according to claim 13, wherein the second frequency ranges from 100 MHz to 500 MHz.

15. The system according to claim 1, wherein the frequency of the instruction data signal or the frequency of the echo clock signal is one of 245.76 Mbps, 307.2 Mbps, or 491.52 Mbps.

16. The system according to claim 1, further comprising:

a first hardware line and a second hardware line; and wherein the first diplexer and the third diplexer are coupled through the first hardware line, and the second diplexer and the fourth diplexer are coupled through the second hardware line; and wherein the first hardware line or the second hardware line is a cable or a cable disposed in a circuit board.

17. An electronic device, comprising:

a circuit board; and a system, comprising:

a first high-frequency integrated circuit;

an intermediate-frequency integrated circuit; and an antenna array;

wherein the first high-frequency integrated circuit is coupled between the antenna array and the intermediate-frequency integrated circuit;

wherein the first high-frequency integrated circuit comprises:

a first high-frequency transceiver, a second high-frequency transceiver, a high-frequency phase-locked loop, a high-frequency controller, a first diplexer, and a second diplexer, wherein the first high-frequency transceiver is coupled to the first diplexer, the second high-frequency transceiver is coupled to the second diplexer, the high-frequency phase-locked loop is separately coupled to the first high-frequency transceiver and the second high-frequency transceiver, and the high-frequency controller is separately coupled to the first diplexer and the second diplexer;

wherein the intermediate-frequency integrated circuit comprises:

a first intermediate-frequency transceiver, a second intermediate-frequency transceiver, an intermediate-frequency phase-locked loop, an intermediate-frequency controller, a third diplexer, and a fourth diplexer, wherein the first intermediate-frequency transceiver is coupled to the third diplexer, the second intermediate-frequency transceiver is coupled to the fourth diplexer, the intermediate-frequency phase-locked loop is separately coupled to the first intermediate-frequency transceiver and the second intermediate-frequency transceiver, and the intermediate-frequency controller is separately coupled to the third diplexer and the fourth diplexer; and wherein the first diplexer is coupled to the third diplexer, and the second diplexer is coupled to the fourth diplexer; and wherein a control signal is transmitted between the high-frequency controller and the intermediate-frequency controller, wherein the control signal comprises an instruction data signal and an echo clock signal, a phase of the instruction data signal is synchronized with a phase of the echo clock signal, and a frequency of the instruction data signal and a frequency of the echo clock signal are in a co-frequency relationship or a frequency multiplication relationship; and wherein the echo clock signal is transmitted between the high-frequency controller and the intermediate-frequency controller via the first diplexer and the third diplexer, and the instruction data signal is transmitted between the high-frequency controller and the intermediate-frequency controller via the second diplexer and the fourth diplexer.

18. The electronic device according to claim 17, wherein the instruction data signal is sent out on a rising edge or a falling edge of the echo clock signal.

19. The electronic device according to claim 17, wherein the intermediate-frequency controller transmits the echo clock signal to the high-frequency controller via the third diplexer and the first diplexer.

20. The electronic device according to claim 19, wherein the first diplexer is further coupled to the high-frequency phase-locked loop; and wherein the intermediate-frequency controller further transmits the echo clock signal to the high-frequency phase-locked loop via the third diplexer and the first diplexer, to provide a first reference clock signal for the high-frequency phase-locked loop.

* * * * *